(12) United States Patent
Ishimaru

(10) Patent No.: US 6,790,155 B2
(45) Date of Patent: Sep. 14, 2004

(54) SPEED CHANGE GEAR FOR AUTOMATIC TRANSMISSION

(75) Inventor: Wataru Ishimaru, Kanagawa (JP)

(73) Assignee: Jatco LTD, Fuji (JP)

(*) Notice: Subject to any disclaimer, the term of this patent is extended or adjusted under 35 U.S.C. 154(b) by 0 days.

(21) Appl. No.: 10/619,724

(22) Filed: Jul. 16, 2003

(65) Prior Publication Data

US 2004/0014553 A1 Jan. 22, 2004

(30) Foreign Application Priority Data

Jul. 16, 2002 (JP) ........................................ 2002-207285

(51) Int. Cl.[7] .............................................. F16H 3/62
(52) U.S. Cl. ........................ 475/275; 475/271; 475/276
(58) Field of Search ................................. 475/271, 275, 475/276

(56) References Cited

U.S. PATENT DOCUMENTS

| | | | | |
|---|---|---|---|---|
| 3,381,546 A | * | 5/1968 | Holl | 475/279 |
| 3,722,323 A | * | 3/1973 | Welch | 475/55 |
| 3,815,445 A | * | 6/1974 | Gorrell et al. | 475/286 |
| 3,863,524 A | * | 2/1975 | Mori et al. | 475/57 |
| 4,483,212 A | * | 11/1984 | Ohtsuka | 475/54 |
| 5,106,352 A | | 4/1992 | Lepelletier | |
| 5,133,697 A | * | 7/1992 | Hattori | 475/276 |
| 6,558,287 B2 | * | 5/2003 | Hayabuchi et al. | 475/271 |
| 6,723,018 B2 | * | 4/2004 | Hayabuchi et al. | 475/276 |

FOREIGN PATENT DOCUMENTS

| | | | | | |
|---|---|---|---|---|---|
| JP | 02118240 A | * | 5/1990 | | F16H/3/66 |
| JP | 4-219553 A | | 8/1992 | | |

* cited by examiner

Primary Examiner—Charles A. Marmor
Assistant Examiner—David D. Le
(74) Attorney, Agent, or Firm—Foley & Lardner LLP

(57) ABSTRACT

A speed change gear for an automatic transmission includes: 1) an input portion for inputting a rotation from a power source; 2) an output portion disposed substantially coaxially with the input portion; 3) three planetary gear sets for providing a plurality of power conductive paths to an area defined between the input portion and the output portion; and 4) a first clutch, a second clutch, a third clutch, a first brake and a second brake selectively connected and disconnected in such a manner that the three planetary gear sets change a rotation from the input portion at a corresponding gear change ratio by selecting one of the power conductive paths. The three planetary gear sets is constituted of a speed reduction planetary gear set for continuously reducing the inputted rotation and outputting the thus reduced rotation, a double sun gear planetary gear set, and a single pinion planetary gear set.

14 Claims, 19 Drawing Sheets

| GEAR SHIFT | | FRICTION ELEMENT C1 | C2 | C3 | B1 | B2 | 5.5 | 6.0 | 6.5 | 7.0 |
|---|---|---|---|---|---|---|---|---|---|---|
| FORWARD | FIRST GEAR | ○ | | | ○ | | 4.060 | 4.260 | 4.583 | 4.782 |
| | SECOND GEAR | ○ | | | | ○ | 2.192 | 2.360 | 2.500 | 2.773 |
| | THIRD GEAR | ○ | ○ | | | | 1.538 | 1.600 | 1.677 | 1.818 |
| | FOURTH GEAR | ○ | | ○ | | | 1.153 | 1.164 | 1.170 | 1.205 |
| | FIFTH GEAR | | ○ | ○ | | | 0.891 | 0.870 | 0.862 | 0.824 |
| | SIXTH GEAR | | | ○ | | ○ | 0.741 | 0.714 | 0.714 | 0.678 |
| REVERSE GEAR | | | ○ | | ○ | | 4.396 | 4.000 | 4.167 | 3.828 |
| | | | | | | α1 | 0.350 | 0.375 | 0.400 | 0.450 |
| | | | | | | α2 | 0.350 | 0.400 | 0.400 | 0.475 |
| | | | | | | α3 | 0.425 | 0.475 | 0.500 | 0.525 |

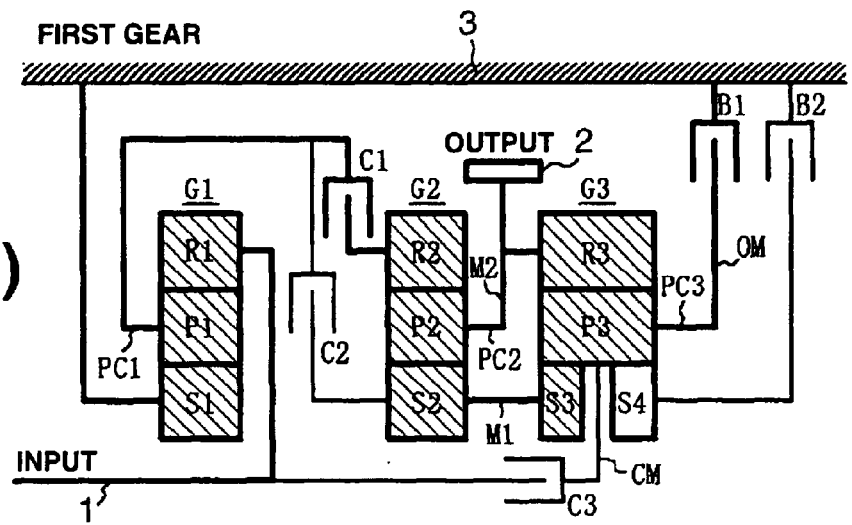
Fig. 4(a) FIRST GEAR
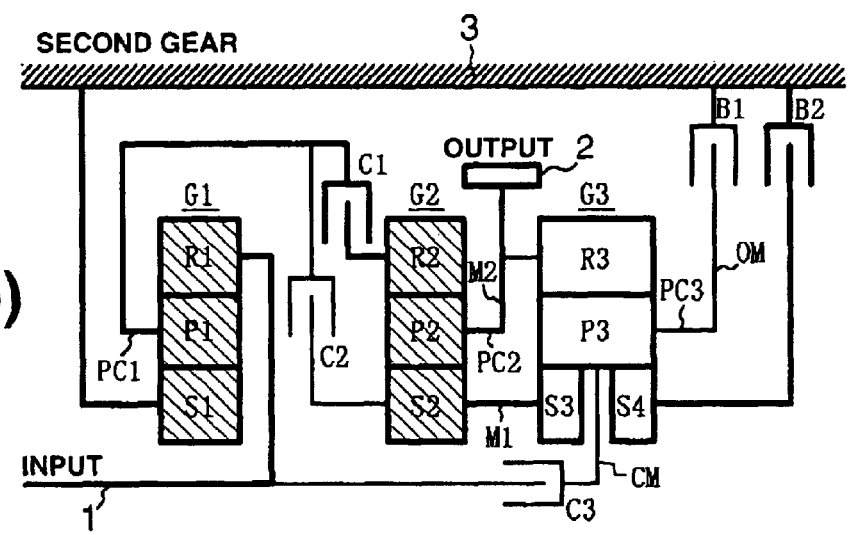
Fig. 4(b) SECOND GEAR
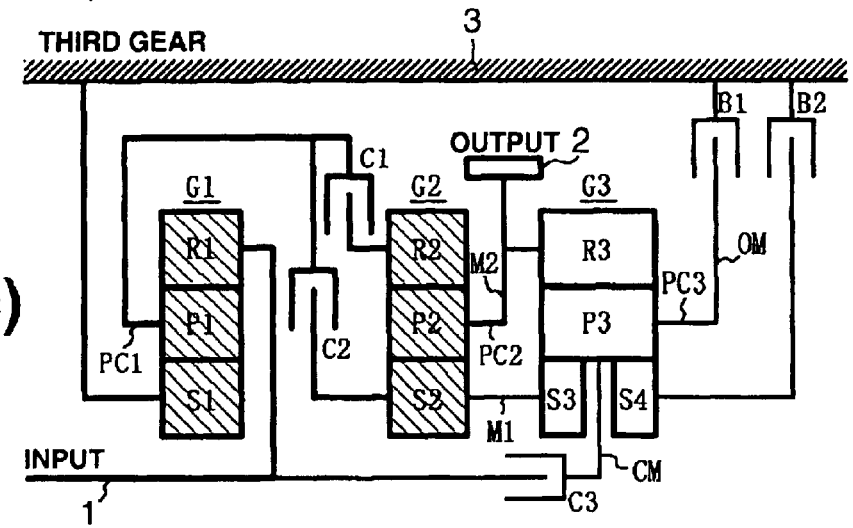
Fig. 4(c) THIRD GEAR

Fig. 11

| | | SIXTH GEAR | | | | | |
|---|---|---|---|---|---|---|---|
| | | RATIO COVERAGE: 1 | | | RATIO COVERAGE: 2 | | |
| | | RAVIGNEAUX COMPOUND PLANETARY GEAR TRAIN | ISHIMARU PLANETARY GEAR TRAIN | | RAVIGNEAUX COMPOUND PLANETARY GEAR TRAIN | ISHIMARU PLANETARY GEAR TRAIN | |
| | | | SPEED REDUCTION PLANETARY GEAR SET (DOUBLE PINION PLANETARY GEAR SET) | SPEED REDUCTION PLANETARY GEAR SET (SINGLE PINION PLANETARY GEAR SET) | | SPEED REDUCTION PLANETARY GEAR SET (DOUBLE PINION PLANETARY GEAR SET) | SPEED REDUCTION PLANETARY GEAR SET (SINGLE PINION PLANETARY GEAR SET) |
| PLANETARY GEAR RATIO | $\alpha 1$ | 0.575 | 0.350 | 0.550 | 0.650 | 0.425 | 0.625 |
| | $\alpha 2$ | 0.375 | 0.350 | 0.500 | 0.475 | 0.350 | 0.550 |
| | $\alpha 3$ | 0.350 | 0.500 | 0.375 | 0.350 | 0.500 | 0.350 |
| GEAR CHANGE RATIO | FIRST GEAR | 4.500 | 4.505 | 4.392 | 4.714 | 5.093 | 5.072 |
| | SECOND GEAR | 2.373 | 2.308 | 2.325 | 2.637 | 2.609 | 2.519 |
| | THIRD GEAR | 1.575 | 1.538 | 1.550 | 1.650 | 1.739 | 1.625 |
| | FOURTH GEAR | 1.146 | 1.136 | 1.148 | 1.160 | 1.170 | 1.141 |
| | FIFTH GEAR | 0.880 | 0.891 | 0.883 | 0.842 | 0.872 | 0.881 |
| | SIXTH GEAR | 0.727 | 0.741 | 0.727 | 0.678 | 0.741 | 0.741 |
| | REVERSE | 4.200 | 4.395 | 4.133 | 3.474 | 4.969 | 4.634 |
| INNER GEAR SHIFT RATIO | FIRST GEAR/ SECOND GEAR | 1.896 | 1.952 | 1.889 | 1.788 | 1.952 | 2.013 |
| | SECOND GEAR/ THIRD GEAR | 1.507 | 1.501 | 1.500 | 1.598 | 1.500 | 1.550 |
| | THIRD GEAR/ FOURTH GEAR | 1.374 | 1.354 | 1.356 | 1.422 | 1.488 | 1.424 |
| | FOURTH GEAR/ FIFTH GEAR | 1.302 | 1.275 | 1.294 | 1.378 | 1.342 | 1.295 |
| | FIFTH GEAR/ SIXTH GEAR | 1.210 | 1.202 | 1.215 | 1.242 | 1.177 | 1.189 |
| FORWARD TO REVERSE RATIO | REVERSE GEAR/ FIRST GEAR | 0.933 | 0.976 | 0.941 | 0.737 | 0.976 | 0.914 |
| TRANSMISSION EFFICIENCY | FIRST GEAR | 0.968 | 0.969 | 0.974 | 0.968 | 0.989 | 0.974 |
| | SECOND GEAR | 0.950 | 0.968 | 0.972 | 0.952 | 0.968 | 0.972 |
| | THIRD GEAR | 0.993 | 0.988 | 0.993 | 0.993 | 0.988 | 0.993 |
| | FOURTH GEAR | 0.982 | 0.987 | 0.989 | 0.983 | 0.988 | 0.989 |
| | FIFTH GEAR | 0.989 | 0.988 | 0.989 | 0.989 | 0.989 | 0.990 |
| | SIXTH GEAR | 0.993 | 0.993 | 0.993 | 0.993 | 0.993 | 0.993 |
| | SEVENTH GEAR | | | | | | |
| | REVERSE | 0.978 | 0.973 | 0.978 | 0.978 | 0.973 | 0.978 |
| ENGAGEMENT ELEMENT TORQUE DISTRIBUTION | C1 | 1.575 | 1.203 | 1.550 | 1.650 | 1.175 | 1.625 |
| | C2 | 1.575 | 1.538 | 1.550 | 1.650 | 1.739 | 1.625 |
| | C3 | 1.209 | 1.538 | 1.214 | 1.243 | 1.739 | 1.190 |
| | B1 | 5.775 | 0.769 | 5.683 | 5.124 | 0.909 | 6.268 |
| | B2 | 0.798 | 5.934 | 0.775 | 0.987 | 6.708 | 0.894 |
| | TOTAL | 10.932 | 10.982 | 10.772 | 10.654 | 12.270 | 11.602 |
| NUMBER OF ENGAGEMENT ELEMENTS INCREASED WITH OWC (ONE WAY CLUTCH) | OWC1 | 0 | 0 | 0 | 0 | 0 | 0 |
| | OWC2 | 1 | 1 | 1 | 1 | 1 | 1 |
| | OWC3 | 2 | 2 | 2 | 2 | 2 | 2 |
| RATIO COVERAGE | MINIMUM | 4.81 | 5.08 | 4.81 | 4.81 | 5.08 | 4.81 |
| | MAXIMUM | 7.20 | 9.02 | 7.80 | 7.20 | 9.02 | 7.80 |
| DIRECT DRIVE MODE | | NOT AVAILABLE | NOT AVAILABLE | NOT AVAILABLE | NOT AVAILABLE | NOT AVAILABLE | NOT AVAILABLE |
| SEVENTH GEAR RATIO | | AVAILABLE | AVAILABLE | AVAILABLE | AVAILABLE | AVAILABLE | AVAILABLE |

SPEED CHANGE GEAR FOR AUTOMATIC TRANSMISSION

BACKGROUND OF THE INVENTION

1. Field of the Invention

The present invention relates to a speed change gear for an automatic transmission for achieving at least six forward gears and one reverse gear, which speed change gear is constituted of an input portion, three planetary gear sets, three clutches, two brakes and an output portion. Hereinabove, the at least six forward gears and one reverse gear are achieved by properly engaging and disengaging the three clutches and the two brakes.

2. Description of the Related Art

U.S. Pat. No. 5,106,352 {equivalent of Japanese Patent Unexamined Publication No. Heisei 4 (1992)-219553} discloses a conventional speed change gear for an automatic transmission, which speed change gear is constituted of an input shaft, one single pinion planetary gear set, a Simpson planetary gear train (combination of two single pinion planetary gear sets), three clutches, two brakes, and an output shaft. The conventional speed change gear for an automatic transmission according to U.S. Pat. No. 5,106,352 {equivalent of Japanese Patent Unexamined Publication No. Heisei 4 (1992)-219553} achieves six forward gears and one reverse gear by properly engaging and disengaging gear change elements, namely, the three clutches and the two brakes.

The speed change gear for the automatic transmission having the one single pinion planetary gear set and the Simpson planetary gear train as described above has the following feature (1) and feature (2):

(1) The first gear of the Simpson planetary gear train may cause a maximum torque. A torque flow at the first gear may be born via all members, which is advantageous in terms of strength.

(2) Compared with a sun gear input, the Simpson planetary gear train bringing about a ring gear input may cause about half tangent force, which is advantageous in terms of gear strength, gear life, carrier rigidity and the like.

Contrary to the above feature (1) and feature (2), the one single pinion planetary gear set and the Simpson planetary gear train according to U.S. Pat. No. 5,106,352 {equivalent of Japanese Patent Unexamined Publication No. Heisei 4 (1992)-219553} may also have the following problem (3) and problem (4):

(3) Obtaining an over drive O/D gear shift is supposed to make a carrier input to the Simpson planetary gear train. Making the input shaft and the output shaft substantially coaxial with each other, however, cannot form a carrier input path in the single pinion planetary gear set since the single pinion planetary gear set is constituted of limited three rotation members.

(4) Forming the carrier input path, therefore, needs to dispose the input shaft and the output shaft substantially in parallel on different axes, thus making the automatic transmission radially enlarged.

For solving the above problem (3) and problem (4), U.S. Pat. No. 5,106,352 {equivalent of Japanese Patent Unexamined Publication No. Heisei 4 (1992)-219553} further proposes a speed change gear using a Ravigneaux compound planetary gear train (double pinions each meshing with a sun gear) replacing the Simpson planetary gear train, as is seen in its FIG. 13, FIG. 14 and FIG. 15.

The speed change gear with the Ravigneaux compound planetary gear train may, however, cause the following problem (5), problem (6), problem (7) and problem (8), although all elements are disposed substantially coaxially (in other words, with parallel disposition of elements avoided):

(5) A double pinion planetary gear set on one side of the Ravigneaux compound planetary gear train may bear a maximum torque (at first gear) of the gear train, which is disadvantageous in terms of strength.

(6) A torque increased with the one single pinion planetary gear set (as a speed reduction gear) is to be inputted to the sun gear of the Ravigneaux compound planetary gear train may cause a greater tangent force than the ring gear input, which is disadvantageous in terms of the gear strength, the gear life, the carrier rigidity and the like.

(7) At the first gear, securing strength (gear strength and gear life) of the Ravigneaux compound planetary gear train and improving the carrier rigidity and the like need to enlarge the Ravigneaux compound planetary gear train, thus making the automatic transmission enlarged. In sum, the Ravigneaux compound planetary gear train's coaxial disposition of the elements (input shaft and output shaft) contributing to small speed change gear may be set off.

(8) Some gear shift(s) may cause a torque circulation to the Ravigneaux compound planetary gear train, thus lowering transmission efficiency leading to increase in fuel consumption.

In other words, the speed change gear having the one single pinion planetary gear set and the Ravigneaux compound planetary gear train may cancel the feature (1) and the feature (2) of the speed change gear having the one single pinion planetary gear set and the Simpson planetary gear train. In addition, the speed change gear having the one single pinion planetary gear set and the Ravigneaux compound planetary gear train having the problem (3) and the problem (4) may enlarge the automatic transmission.

En passant, U.S. Pat. No. 5,106,352 {equivalent of Japanese Patent Unexamined Publication No. Heisei 4 (1992)-219553} also discloses in FIG. 12 the single pinion planetary gear set reducing rotation of the great torque, which rotation is inputted to the ring gear of the Ravigneaux compound planetary gear train. In this case, however, the input portion and the output portion are disposed substantially in parallel, instead of substantially coaxially, thus enlarging the automatic transmission.

BRIEF SUMMARY OF THE INVENTION

It is an object of the present invention to provide a speed change gear for an automatic transmission.

It is another object of the present invention to provide an input portion and an output portion disposed substantially coaxially without using the Ravigneaux compound planetary gear train, with the feature (1) and the feature (2) obtained by the Simpson planetary gear train kept {more specifically, with the advantages (gear strength, gear life and the like) of the gear train kept}, with the problem (3) and the problem (4) (making the automatic transmission enlarged) solved, and with the problem (8) (torque circulation caused to the Ravigneaux compound planetary gear train, and increased fuel consumption) solved.

It is still another object of the present invention to provide the speed change gear for the automatic transmission with improved selectivity of gear ratios, as compared with the speed change gear using the Ravigneaux compound planetary gear train.

It is still another object of the present invention to provide the speed change gear for the automatic transmission which speed change gear can shorten a power conductive paths (including clutches) transmitting a great torque reduced in a first planetary gear set to a latter planetary gear set(s), can make component parts for the power transmission smaller and facilitate handling and mounting of the component parts, can keep the above feature (1) and feature (2), and can contribute to making the automatic transmission smaller.

According to an aspect of the present invention, there is provided a speed change gear for an automatic transmission, comprising:

1) an input portion for inputting a rotation from a power source;
2) an output portion disposed substantially coaxially with the input portion;
3) three planetary gear sets including a first planetary gear set, a second planetary gear set and a third planetary gear set for providing a plurality of power conductive paths to an area defined between the input portion and the output portion; and
4) a first clutch, a second clutch, a third clutch, a first brake and a second brake to be selectively connected and disconnected in such a manner that the three planetary gear sets change a rotation from the input portion at a corresponding gear change ratio by selecting one of the plurality of the power conductive paths, thereby outputting the thus changed rotation to the output portion, the first clutch, the second clutch, the third clutch, the first brake and the second brake making a combination of engagement and disengagement, the combination making a selection from at least six forward gears and one reverse gear.

One of the three planetary gear sets is a speed reduction planetary gear set for continuously reducing the inputted rotation and outputting the thus reduced rotation.

One of the remaining two planetary gear sets of the three planetary gear sets is a double sun gear planetary gear set which includes;

two sun gears, a common pinion meshing with the two sun gears in common, one ring gear meshing with the common pinion, and a planetary carrier for carrying the common pinion in such a manner that the common pinion rotates, the planetary carrier being adapted to input and output a rotation from between the two sun gears via a center member connected to a side member.

The other of the remaining two planetary gear sets of the three planetary gear sets is a single pinion planetary gear set which includes;

one sun gear, a pinion meshing with the one sun gear, one ring gear meshing with the pinion, and a planetary carrier for carrying the pinion in such a manner that the pinion rotates.

The speed change gear for the automatic transmission includes:

i) a first rotation member including one of the two sun gears of the double sun gear planetary gear set, and being adapted to be held stationary by the second brake;
ii) a second rotation member including the other of the two sun gears of the double sun gear planetary gear set, and receiving via the second clutch the reduced rotation from the speed reduction planetary gear set;
iii) a third rotation member including an element connected mutually to the double sun gear planetary gear set and the single pinion planetary gear set, and outputting the changed rotation to the output portion;
iv) a fourth rotation member receiving via the third clutch the inputted rotation, being adapted to be held stationary by the first brake and including an element in the double sun gear planetary gear set and the single pinion planetary gear set; and
v) a fifth rotation member receiving via the first clutch the outputted rotation from the speed reduction planetary gear set, and including an element in the corresponding one of the double sun gear planetary gear set and the single pinion planetary gear set.

One of the double sun gear planetary gear set and the single pinion planetary gear set which relates to the second rotation member and the fifth rotation member is disposed nearer to the speed reduction planetary gear set than the other of the double sun gear planetary gear set and the single pinion planetary gear set.

The other object(s) and feature(s) of the present invention will become understood from the following description with reference to the accompanying drawings.

BRIEF DESCRIPTION OF THE SEVERAL VIEWS OF THE DRAWINGS

FIG. 4 shows torque flow paths at each gear shift of the speed change gear according to the first embodiment, in which:

FIG. 4(a) is a typical skeleton diagram similar to that in FIG. 1 at a first gear, FIG. 4(b) is a typical skeleton diagram similar to that in FIG. 1 at a second gear, and FIG. 4(c) is a typical skeleton diagram similar to that in FIG. 1 at a third gear.

FIG. 5 shows torque flow paths at each gear shift of the speed change gear according to the first embodiment, in which:

FIG. 8 shows torque conductive paths, in which:

FIG. 10 explains that the speed change gear using the Simpson planetary gear train cannot achieve a carrier input for the over drive gear shift, as compared with the speed change gear under the present invention achieving the carrier input, in which:

FIG. 11 is a table showing comparison of performance between the speed change gear using the Ravigneaux compound planetary gear train and the speed change gear using the Ishimaru planetary gear train.

FIG. 12 is a view of a developed cross section showing an actual constitution of the speed change gear in FIG. 1 to FIG. 6, according to the first embodiment, in which:

the speed change gear has an input portion 1 and an output portion 2 reversed relative to those shown by the skeleton diagrams in FIG. 1, FIG. 4, FIG. 5 and FIG. 6.

Figure 13:
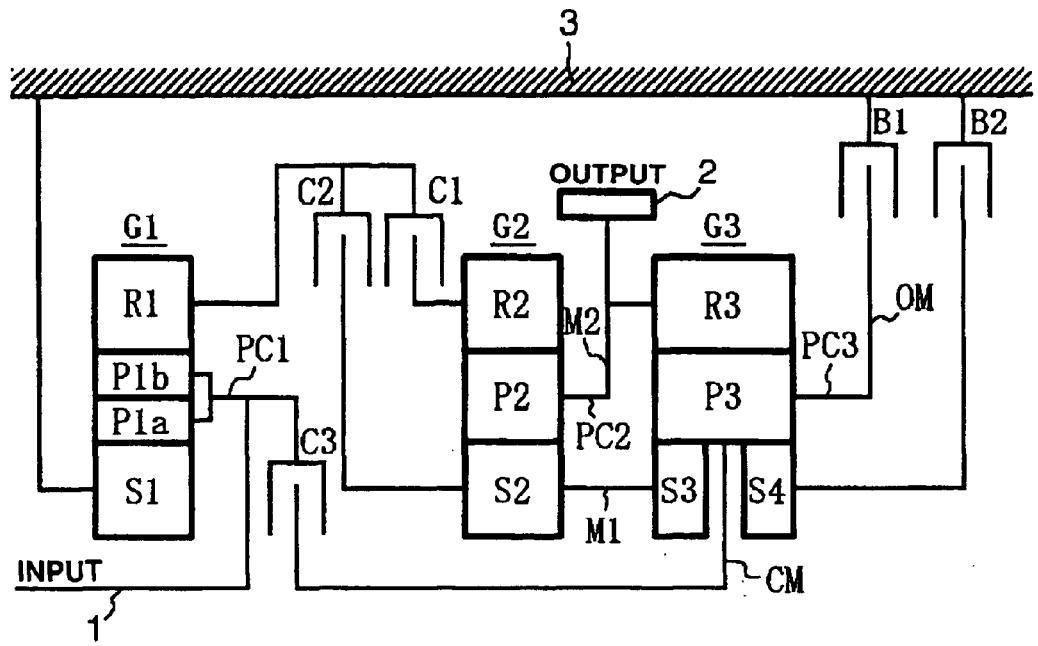

FIG. 13 is a typical skeleton diagram of a speed change gear for an automatic transmission, according to a second embodiment of the present invention.

Figure 14:
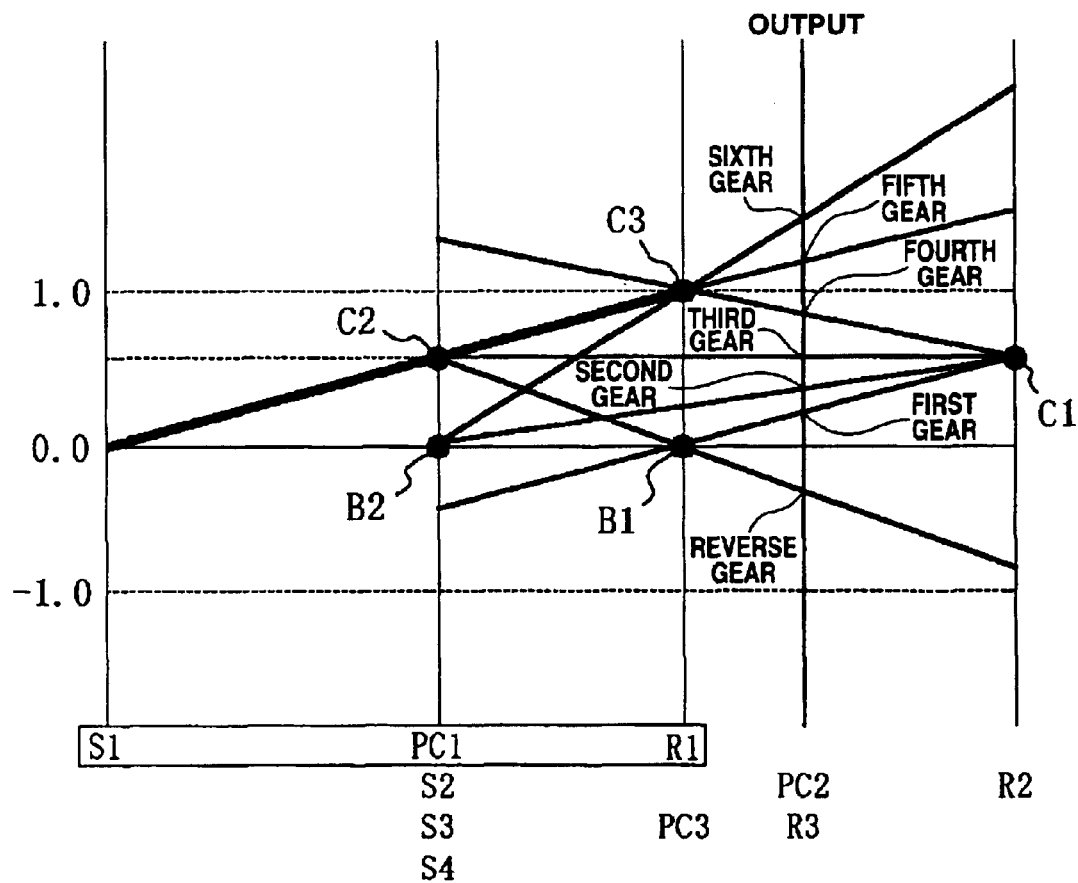

FIG. 14 is a common line diagram showing a rotation state at each gear shift of a rotation member of the speed change gear, according to the second embodiment.

Figure 15A:
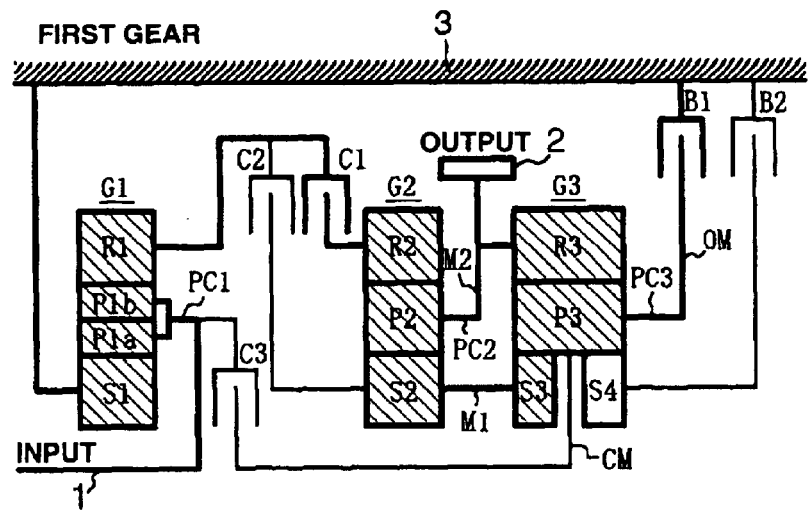
Figure 15B:
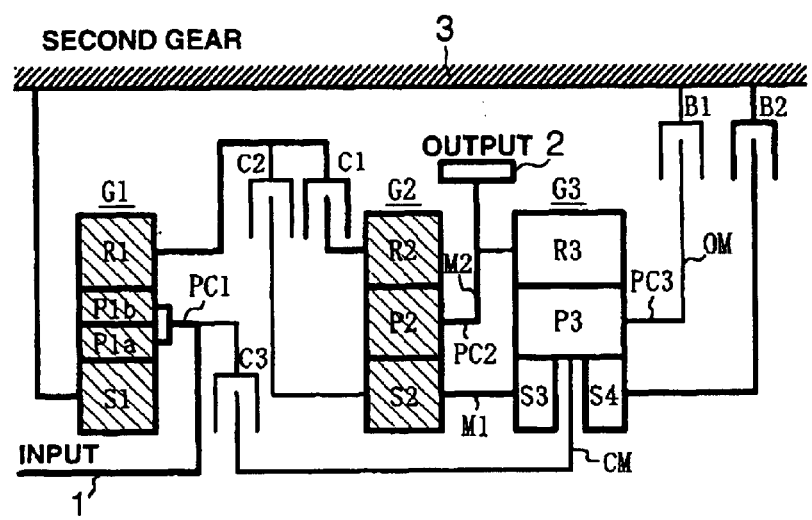
Figure 15C:
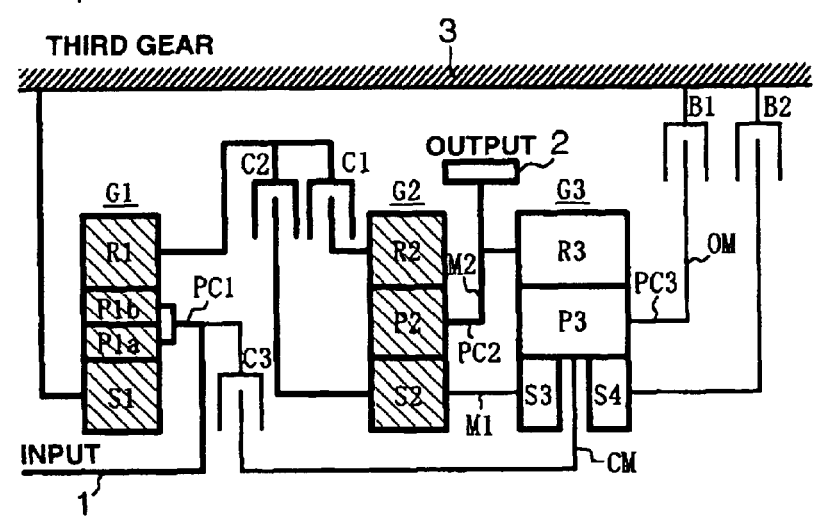

FIG. 15 shows torque flow paths at each gear shift of the speed change gear according to the second embodiment, in which:

FIG. 15(a) is a typical skeleton diagram similar to that in FIG. 13 at a first gear, FIG. 15(b) is a typical skeleton diagram similar to that in FIG. 13 at a second gear, and FIG. 15(c) is a typical skeleton diagram similar to that in FIG. 13 at a third gear.

Figure 16A:
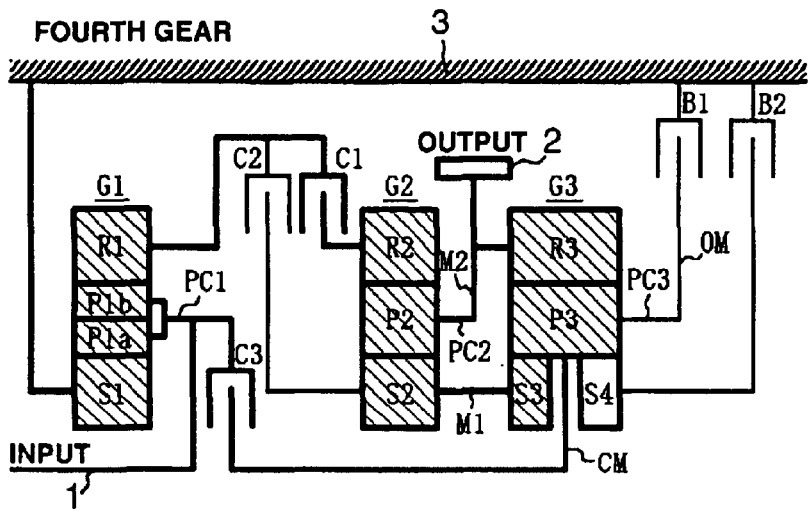
Figure 16B:
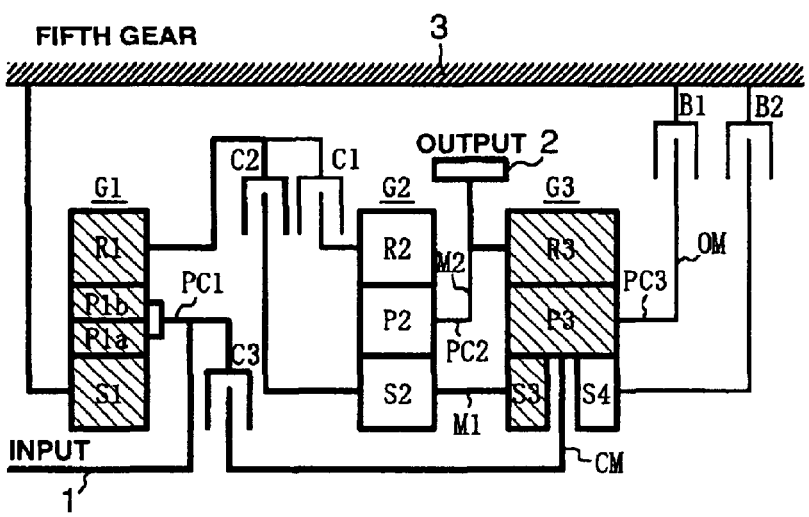
Figure 16C:
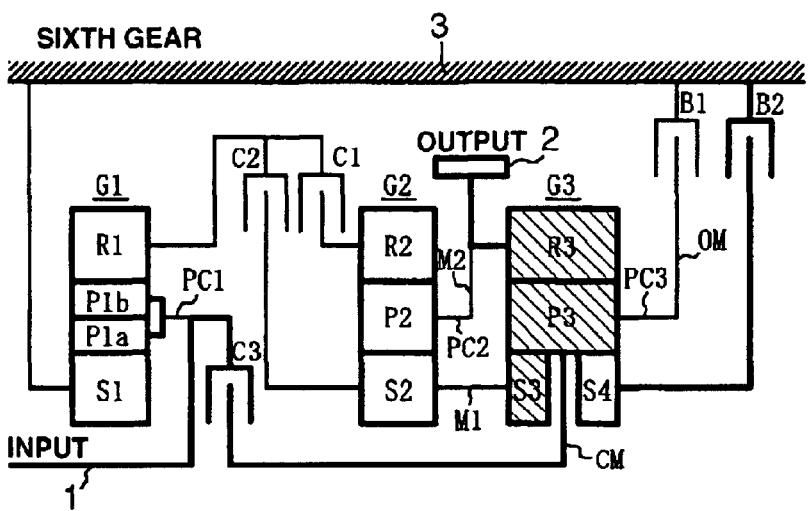

FIG. 16 shows torque flow paths at each gear shift of the speed change gear according to the second embodiment, in which:

FIG. 16(a) is a typical skeleton diagram similar to that in FIG. 13 at a fourth gear, FIG. 16(b) is a typical skeleton diagram similar to that in FIG. 13 at a fifth gear, and FIG. 16(c) is a typical skeleton diagram similar to that in FIG. 13 at a sixth gear.

Figure 17:
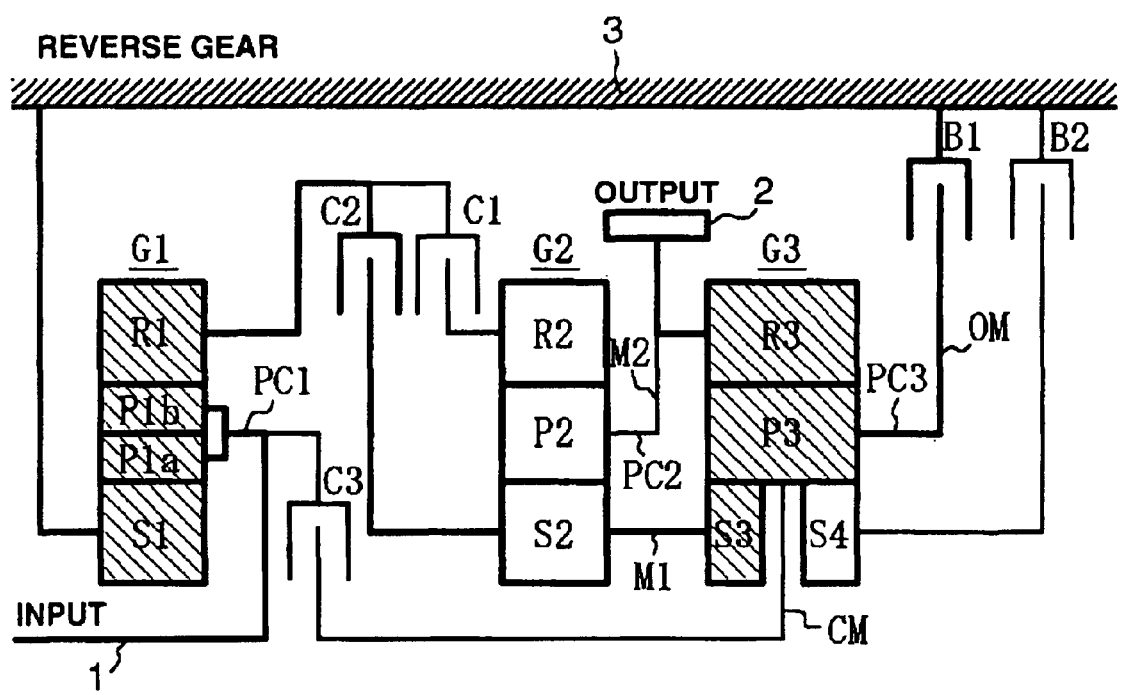

FIG. 17 shows torque flow paths at a reverse gear shift of the speed change gear according to the second embodiment, with a typical skeleton diagram similar to that in FIG. 13.

Figure 18:
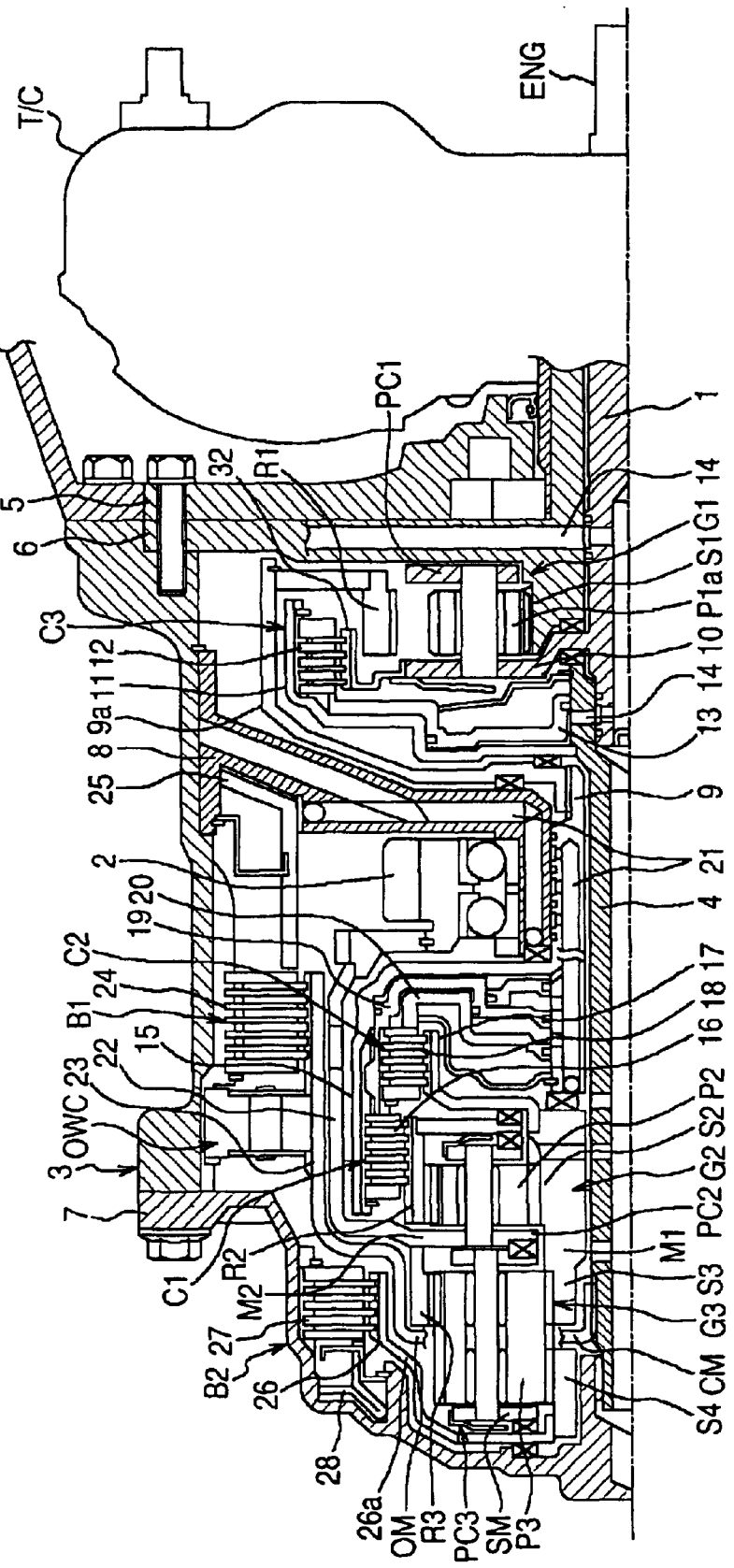

FIG. 18 is a view of a developed cross section showing an actual constitution of the speed change gear in FIG. 13 to FIG. 17, according to the second embodiment, in which:

the speed change gear has an input portion 1 and an output portion 2 reversed relative to those shown by the skeleton diagrams in FIG. 13, FIG. 15, FIG. 16 and FIG. 17.

Figure 19:
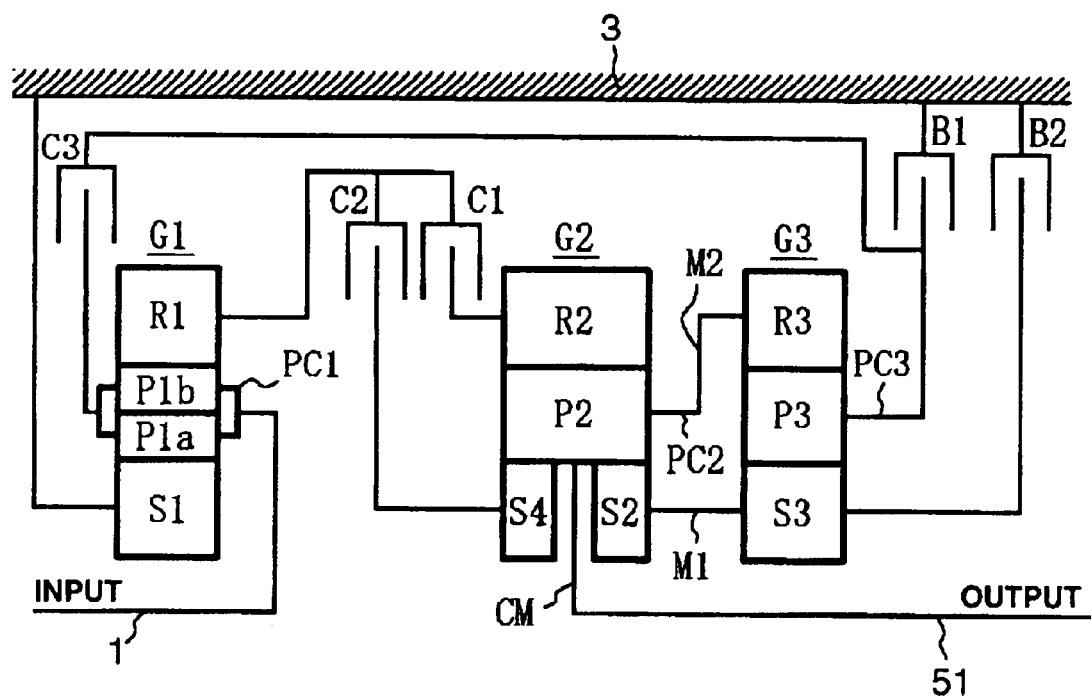

FIG. 19 is a typical skeleton diagram of a speed change gear for an automatic transmission, according to a third embodiment of the present invention.

Figure 20A:
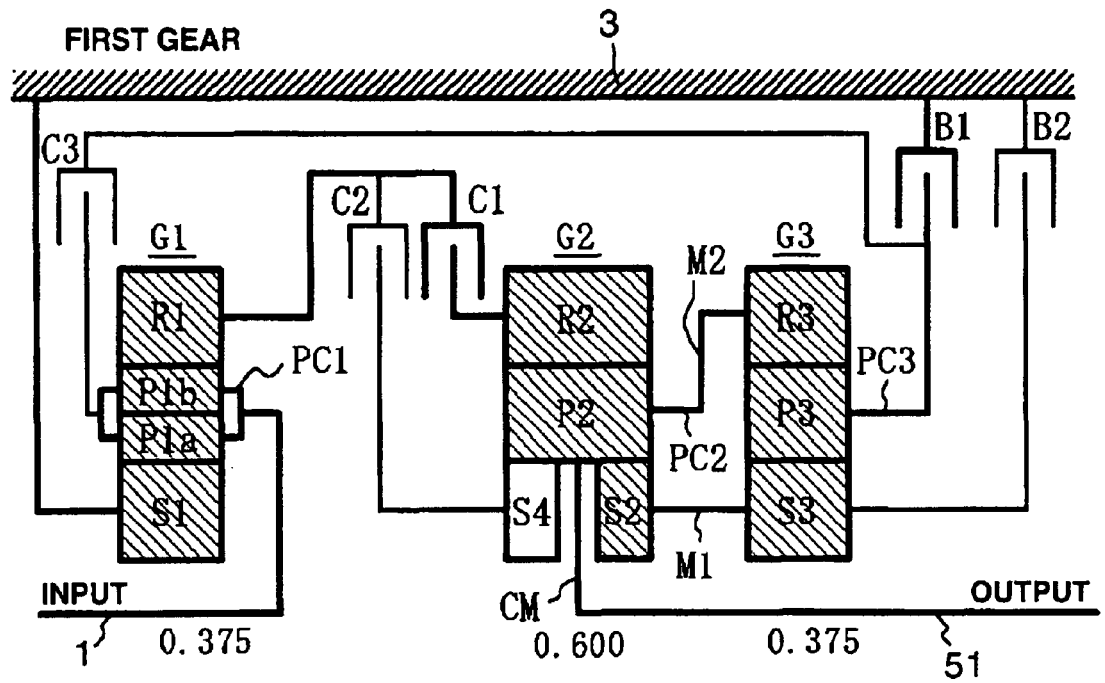
Figure 20B:
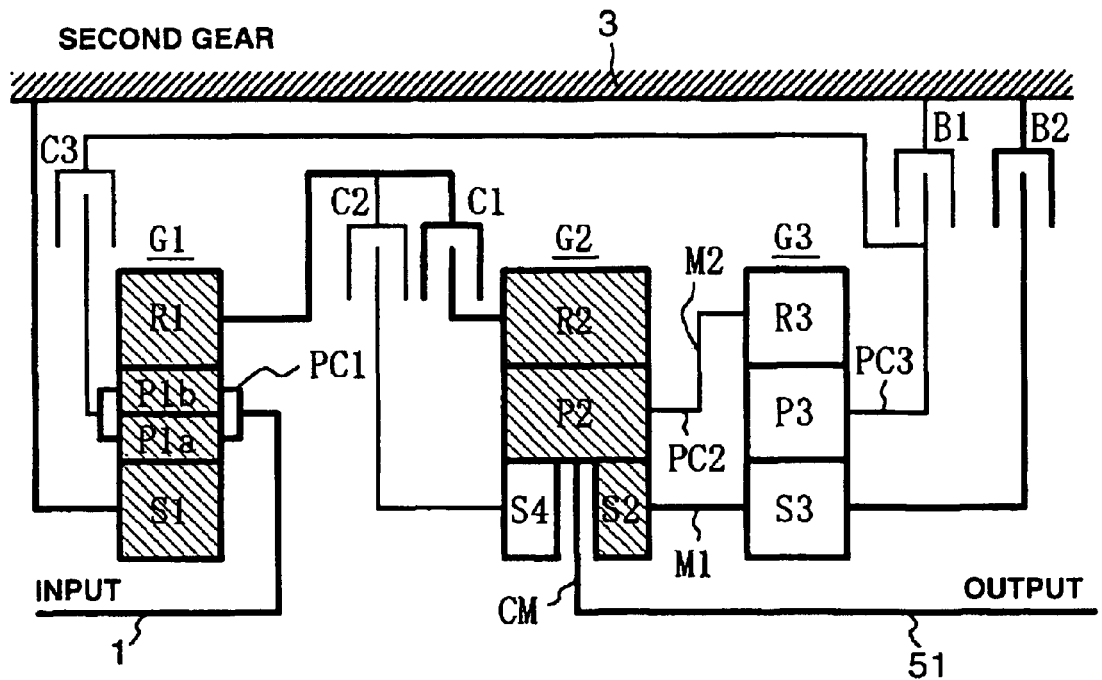

FIG. 20 shows torque flow paths at each gear shift of the speed change gear according to the third embodiment, in which:

FIG. 20(a) is a typical skeleton diagram similar to that in FIG. 19 at a first gear, and FIG. 20(b) is a typical skeleton diagram similar to that in FIG. 19 at a second gear.

Figure 21A:
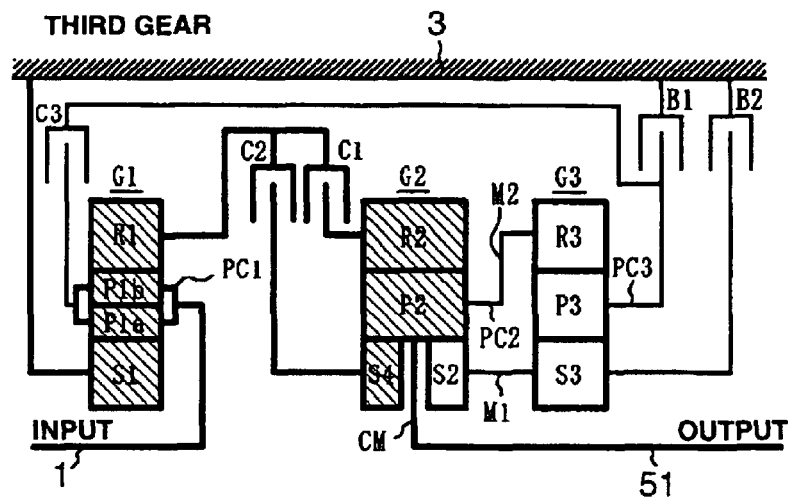
Figure 21B:
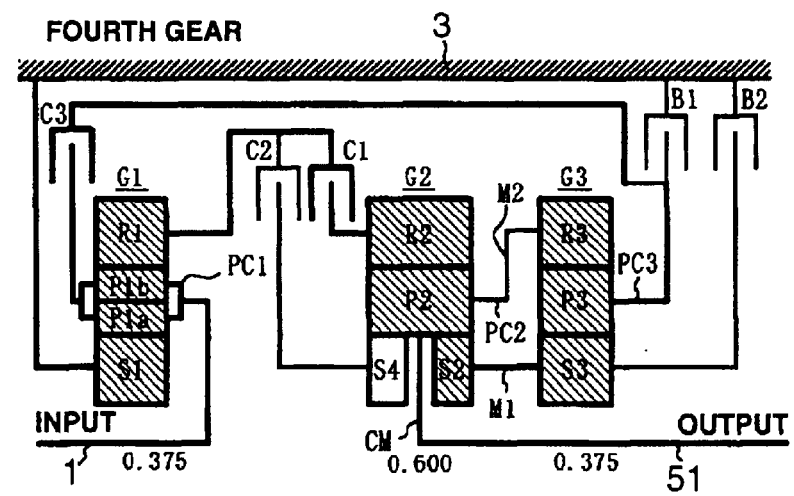
Figure 21C:
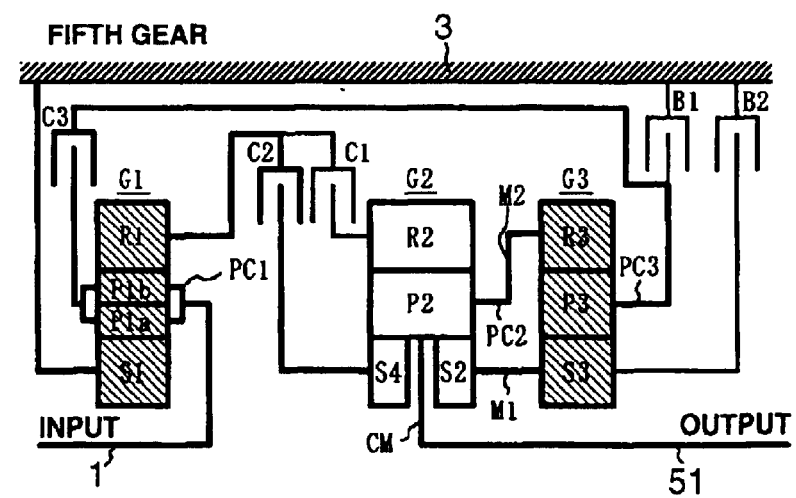

FIG. 21 shows torque flow paths at each gear shift of the speed change gear according to the third embodiment, in which:

FIG. 21(a) is a typical skeleton diagram similar to that in FIG. 19 at a third gear, FIG. 21(b) is a typical skeleton diagram similar to that in FIG. 19 at a fourth gear, and FIG. 21(c) is a typical skeleton diagram similar to that in FIG. 19 at a fifth gear.

Figure 22A:
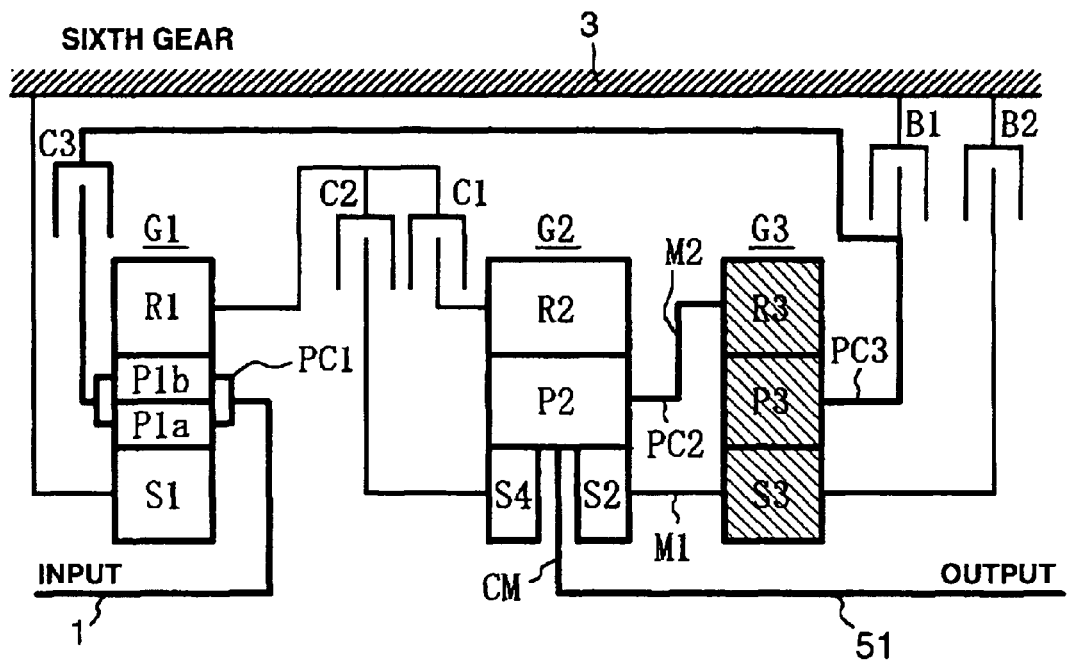
Figure 22B:
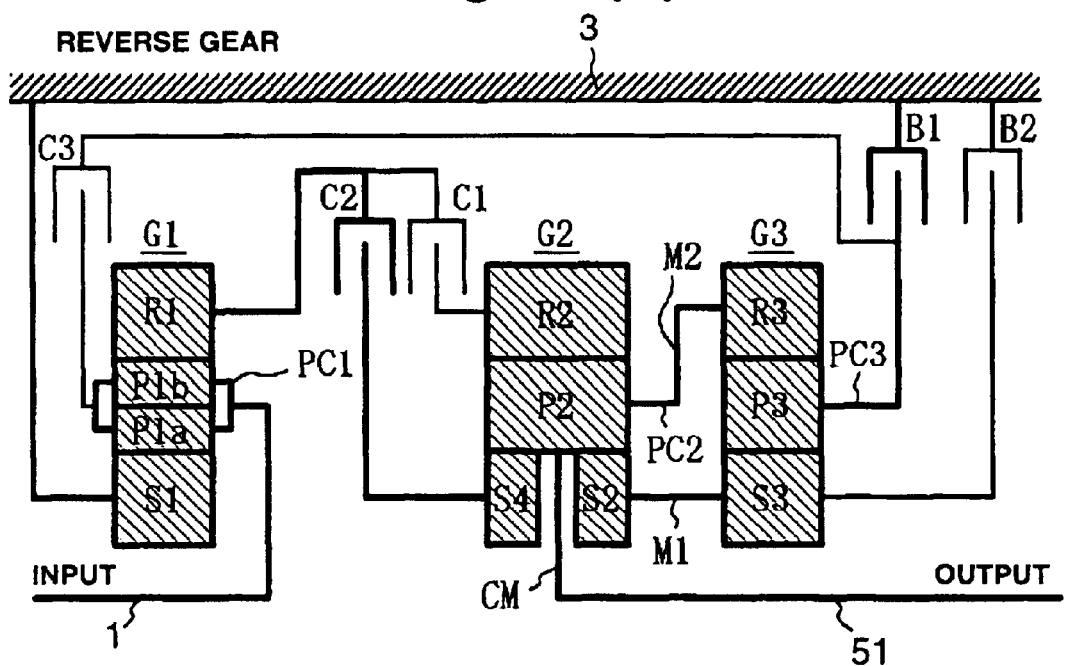

FIG. 22 shows torque flow paths at each gear shift of the speed change gear according to the third embodiment, in which:

FIG. 22(a) is a typical skeleton diagram similar to that in FIG. 19 at a sixth gear, and FIG. 22(b) is a typical skeleton diagram similar to that in FIG. 19 at a reverse gear.

Figure 23:
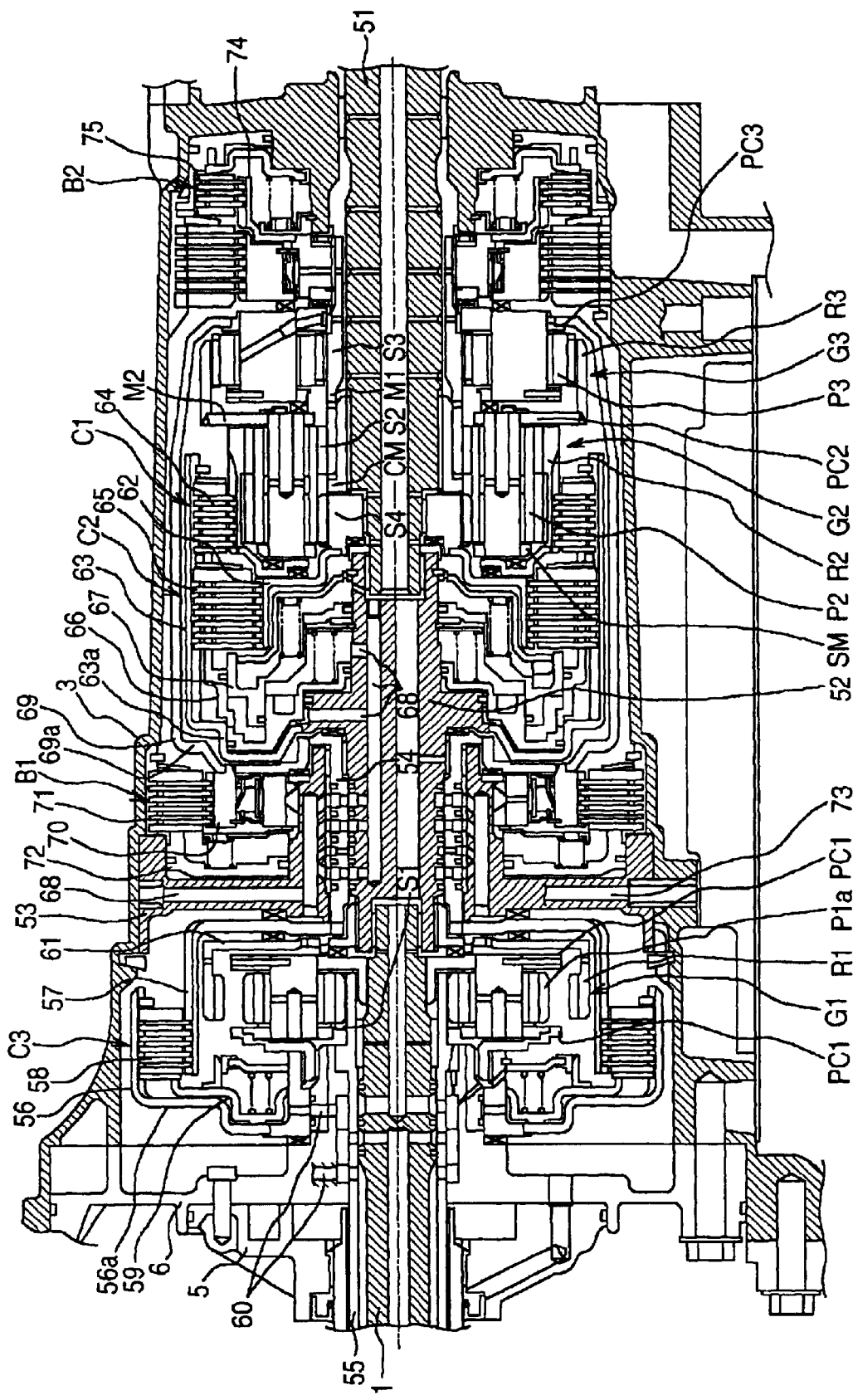

FIG. 23 is a view of a developed cross section showing an actual constitution of the speed change gear in FIG. 19 to FIG. 22, according to the third embodiment.

DETAILED DESCRIPTION OF THE EMBODIMENT

In the following, various embodiments of the present invention will be described in detail with reference to the accompanying drawings.

For ease of understanding, the following description will contain various directional terms, such as, left, right, upper, lower, forward, rearward and the like. However, such terms are to be understood with respect to only a drawing or drawings on which the corresponding part of element is illustrated.

First Embodiment

Figures 1, 2:
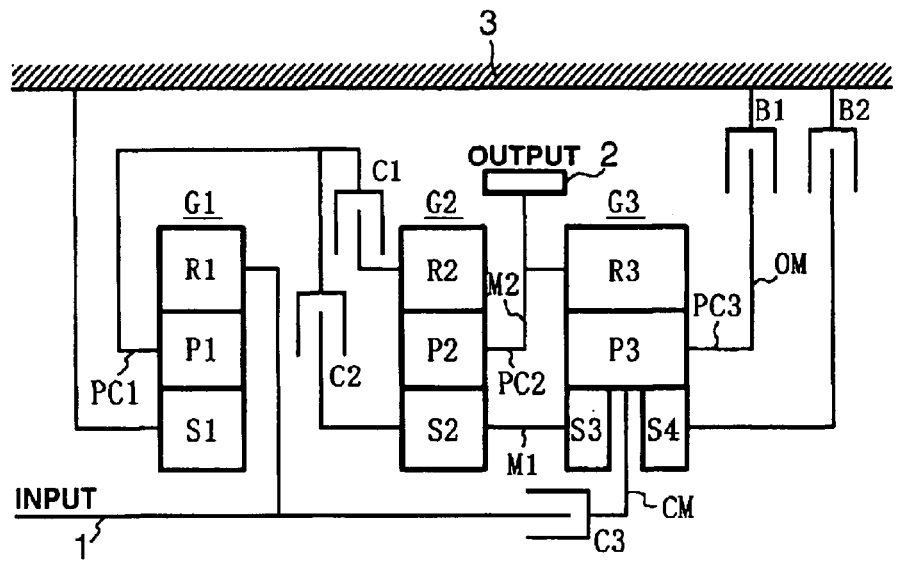
FIG. 1 is a typical skeleton diagram of a speed change gear for an automatic transmission, according to a first embodiment of the present invention.
FIG. 2 shows an engagement logic of a transmission friction element of the speed change gear, relative to a selected gear shift.

FIG. 1 shows a typical skeleton diagram of a speed change gear for an automatic transmission, according to a first embodiment of the present invention. There are provided a first planetary gear set G1, a second planetary gear set G2, a third planetary gear set G3, a first connector member M1, a second connector member M2, a first clutch C1, a second clutch C2, a first brake B1, a second brake B2, an input portion INPUT (input shaft 1), and an output portion OUTPUT (output gear 2).

The speed change gear (referred to as "speed reduction single pinion type") for the automatic transmission according to the first embodiment is so constituted that the first planetary gear set G1 (speed reduction, single pinion), the second planetary gear set G2 (single pinion), and the third planetary gear set G3 (double sun gear) are sequentially and substantially coaxially arranged from a left end (an end close to the input portion INPUT [input shaft 1]), as is seen in FIG. 1.

The first planetary gear set G1 constitutes a speed reduction planetary gear set, while the second planetary gear set G2 and the third planetary gear set G3 constitute a speed change planetary gear set (hereinafter referred to as "Ishimaru planetary gear train").

The first planetary gear set G1 has a first sun gear S1, a first ring gear R1, a first pinion P1 meshing with the first sun gear S1 and the first ring gear R1, and a first planetary carrier PC1 for carrying the first pinion P1 in such a manner that the first pinion P1 can rotate, thus constituting the single pinion planetary gear set (speed reduction planetary gear set).

The second planetary gear set G2 has a second sun gear S2, a second ring gear R2, a second pinion P2 meshing with the second sun gear S2 and the second ring gear R2, and a second planetary carrier PC2 for carrying the second pinion P2 in such a manner that the second pinion P2 can rotate, thus constituting the single pinion planetary gear set.

The third planetary gear set G3 has a third sun gear S3, a fourth sun gear S4, a third pinion P3 meshing with the third sun gear S3 and the fourth sun gear S4 in common, a third planetary carrier PC3 for carrying the third pinion P3 in such a manner that the third pinion P3 can rotate, and a third ring gear R3 (one in number) meshing with the third pinion P3, thus constituting the double sun gear planetary gear set. Hereinabove, the third sun gear S3 is disposed on a nearer side to the input portion INPUT, while the fourth sun gear S4 is disposed on a farther side from the input portion INPUT.

Although the third sun gear S3 and the fourth sun gear S4 are disposed substantially coaxially, the numbers of teeth thereof need not to be equal (in other words, the different numbers of teeth are allowed).

The third planetary carrier PC3 is provided with a center member CM extending radially inward from between the third sun gear S3 and the fourth sun gear S4, and is provided with an outer member OM extending radially outward from the third planetary carrier PC3. The outer member OM is disposed actually in a special manner (to be described in detail afterward).

Hereinabove, the center member CM is united with the third planetary carrier PC3. The center member CM is so disposed to as to pass through a space which is defined on a circle formed with pitches arranged on the third pinion P3 and which is defined between the adjacent third pinions P3. The center member CM is so disposed as to extend radially inward from between the third sun gear S3 and the fourth sun gear S4.

The input portion INPUT is constituted of the input shaft 1. Connecting the input shaft 1 to the first ring gear R1 and connecting the input shaft 1 to an engine (not shown) as power source via a torque converter (not shown) allow engine speed to be inputted to the first ring gear R1.

The output portion OUTPUT is constituted of an output gear 2. The output gear 2 substantially coaxially connects to the second connector member M2 (constituting a coupling body for coupling the second planetary carrier PC2 and the third ring gear R3), thus sending transmitted (changed speed) output rotation from the output gear 2 to a drive wheel of a vehicle via a final gear set (not shown) and a differential gear device (not shown).

Hereinabove, the first connector member M1 is a connector member for connecting the second sun gear S2 and the third sun gear S3 unitedly, thus constituting a coupling body for coupling the second sun gear S2 and the third sun gear S3.

Being connected to a transmission case 3, the first sun gear S1 of the speed reduction planetary gear set G1 is held continuously stationary. The first planetary carrier PC1 is adapted to be connected to the second ring gear R2 by the first clutch C1, and is adapted to be connected to the second sun gear S2 by the second clutch C2.

The center member CM of the third planetary carrier PC3 is adapted to be connected to the input shaft 1 by the third clutch C3.

The outer member OM of the third planetary carrier PC3 of the double sun gear planetary gear set G3 is adapted to be connected to the transmission case 3 by the first brake B1, and is adapted to hold stationary the third planetary carrier PC3. The fourth sun gear S4 is adapted to be connected to the transmission case 3 by the second brake B2, and thereby is adapted to be held stationary.

With the speed change gear having the above constitution according to the first embodiment, engaging and disengaging the first clutch C1, the second clutch C2, the third clutch C3, the first brake B1, and the second brake B2 referring to combinations shown in FIG. 2 (a circle stands for engagement while a blank stands for disengagement) can select corresponding gear shifts (six forward gears and one reverse gear). A control valve body (not shown) for transmission control achieving engagement logic for the applicable transmission is connected to the first clutch C1, the second clutch C2, the third clutch C3, the first brake B1, and the second brake B2.

The control valve body (not shown) for the transmission control is of a hydraulic pressure control type, an electronically control type, a combination of the former two, or the like.

Hereinafter described is transmission operation of the above speed change gear according to the first embodiment, referring to FIG. 2 to FIG. 6.

FIG. 2 shows an engagement logic of a transmission friction element of the speed change gear, relative to a selected gear shift.

Figure 3:
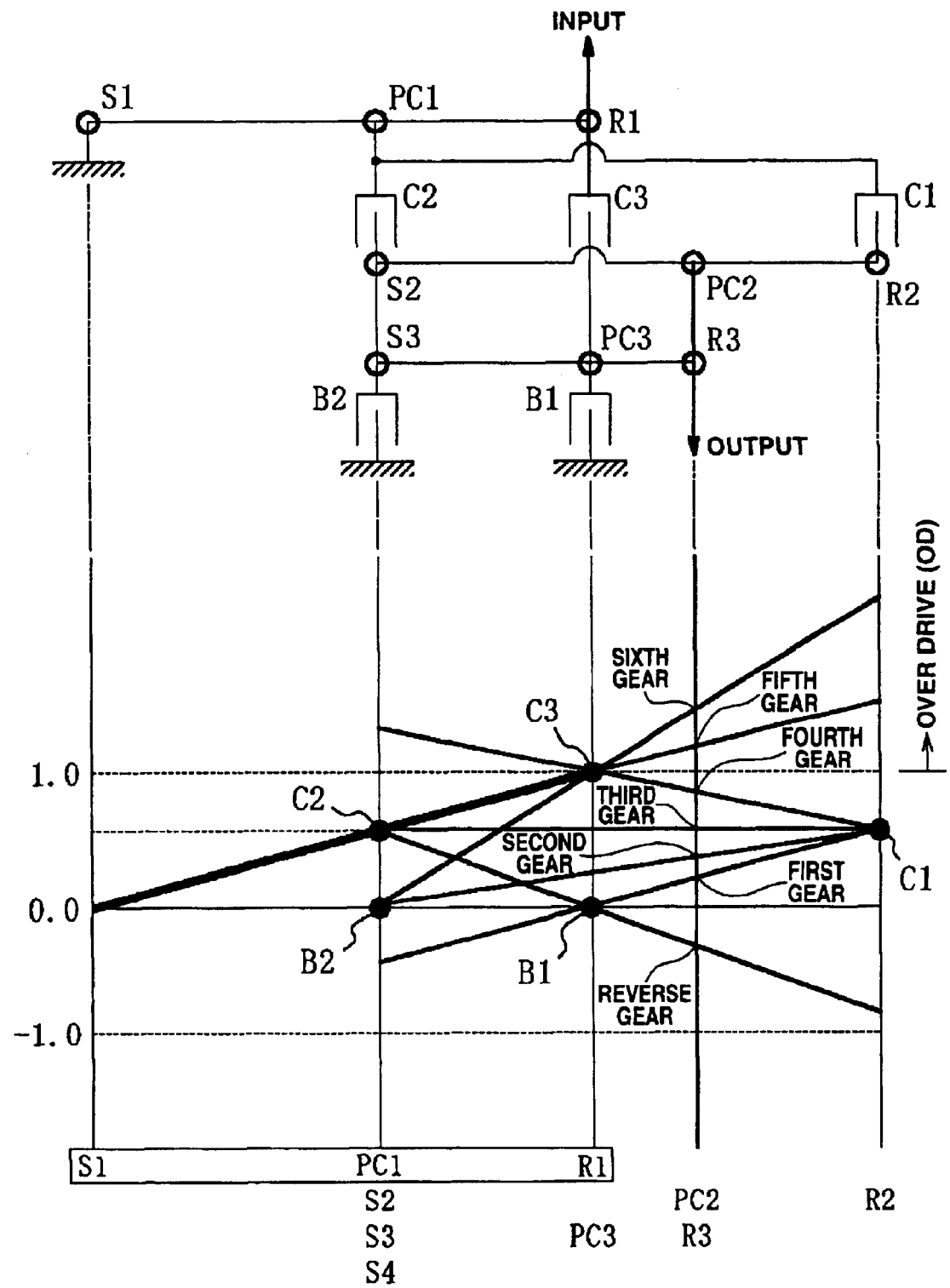
FIG. 3 is a common line diagram showing a rotation state at each gear shift of a rotation member of the speed change gear, according to the first embodiment.

FIG. 3 is a common line diagram showing a rotation state at each gear shift of the rotation member of the speed change gear, according to the first embodiment.

Figure 5A:
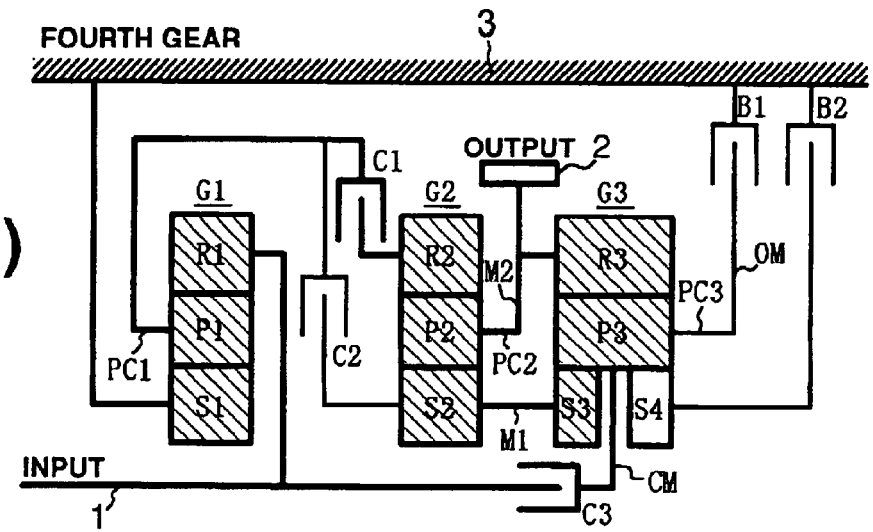
FIG. 5(a) is a typical skeleton diagram similar to that in FIG. 1 at a fourth gear.
Figure 5B:
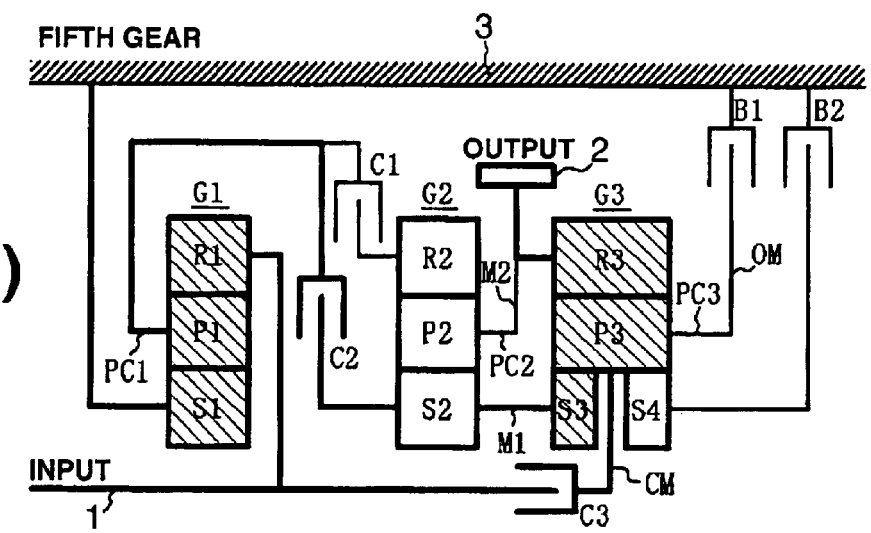
FIG. 5(b) is a typical skeleton diagram similar to that in FIG. 1 at a fifth gear.
Figure 5C:
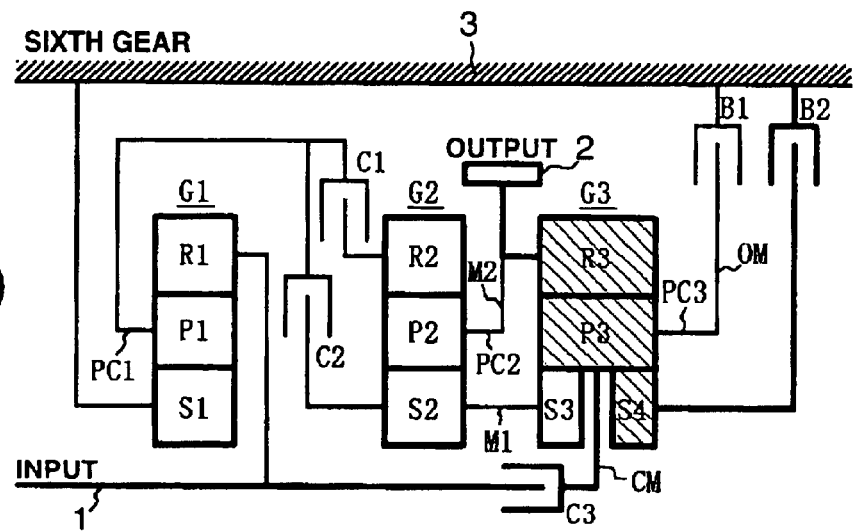
FIG. 5(c) is a typical skeleton diagram similar to that in FIG. 1 at a sixth gear.
Figure 6:
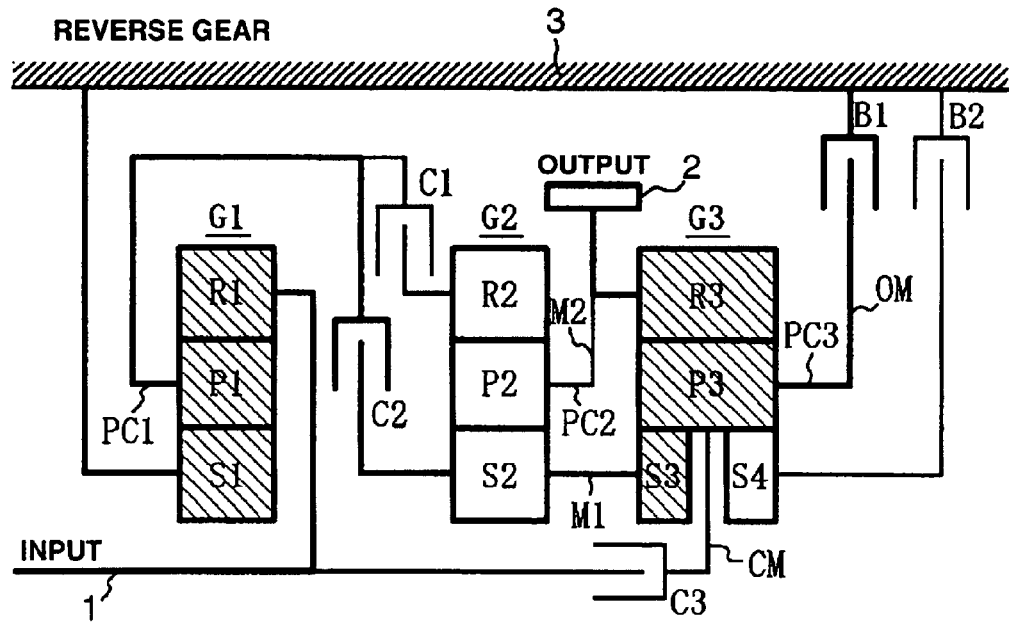
FIG. 6 shows torque flow paths at a reverse gear shift of the speed change gear according to the first embodiment, with a typical skeleton diagram similar to that in FIG. 1.

FIG. 4 to FIG. 6 show torque flow paths at each gear shift of the speed change gear, according to the first embodiment.

In FIG. 3, a boldest line is a common line diagram of the first planetary gear set G1, while a second boldest line is a common line diagram of the speed change planetary gear set including the second planetary gear set G2 and the third planetary gear set G3 (the Ishimaru planetary gear train).

In FIG. 4 to FIG. 6, the torque flow paths of the clutch, the brake and the member are shown with a bold line, and the gear used for the torque flow is hatched.

First Gear

As is seen in FIG. 2, engaging the first clutch C1 and the first brake B1 may achieve the forward first gear.

At the first gear, in view of the second planetary gear set G2, engaging the first clutch C1 may input a reduced rotation from the first planetary gear set G1 to the second ring gear R2.

On the other hand, in view of the third planetary gear set G3, engaging the first brake B1 may hold stationary the third planetary carrier PC3 to the transmission case 3, thus rotation of the third sun gear S3 is reversed and reduced relative to an output rotation from the third ring gear R3. The rotation of the third sun gear S3 is transmitted to the second sun gear S2 of the second planetary gear set G2 via the first connector member M1.

In view of the second planetary gear set G2, a forward reduced rotation is inputted from the second ring gear R2 while the reverse reduced rotation is inputted from the second sun gear S2, thus further reducing the rotation from the second ring gear R2. The thus further reduced rotation is to be outputted from the second planetary carrier PC2 to the output gear 2 via the second connector member M2.

Summarizing the above, at the first gear, the common line diagram in FIG. 3 defines a line connecting an engagement point of the first clutch C1 (rendering the reduced rotation from the first planetary gear set G1 as the input rotation to the second ring gear R2) and an engagement point of the first brake B1 (braking the rotation of the third planetary carrier PC3), thus reducing the rotation inputted from the input shaft 1 and thereafter outputting the thus reduced rotation from the output gear 2.

FIG. 4(a) shows the torque flow paths at the first gear, with the first clutch C1, the first brake B1 and each of the members indicated by the bold line and with the first planetary gear set G1, the second planetary gear set G2 and the third planetary gear set G3 (excluding the fourth sun gear S4) hatched. Hereinabove, the bold line and the hatching teach that the torque is operated.

In other words, at the first gear, the first planetary gear set G1 and the Ishimaru planetary gear train (including the second planetary gear set G2 and the third planetary gear set G3) may contribute to the torque flow.

Second Gear

As is seen in FIG. 2, disengaging the first brake B1 (which is engaged at the first gear) while engaging the second brake B2, namely, engaging the first clutch C1 and the second brake B2 may achieve the forward second gear.

At the second gear, in view of the second planetary gear set G2, engaging the first clutch C1 may input the reduced rotation from the first planetary gear set G1 to the second ring gear R2.

On the other hand, in view of the third planetary gear set G3, engaging the second brake B2 may hold stationary the fourth sun gear S4 to the transmission case 3, thus holding stationary the third sun gear S3 which is connected to the fourth sun gear S4 by the third pinion P3. Then, the second sun gear S2 connected to the third sun gear S3 via the first connector member M1 may be held stationary to the transmission case 3.

In view of the second planetary gear set G2, the forward reduced rotation is inputted from the second ring gear R2 while the second sun gear S2 is held stationary, thus further reducing the reduced rotation from the second ring gear R2. The thus further reduced rotation is to be outputted from the second planetary carrier PC2 to the output gear 2 via the second connector member M2.

Summarizing the above, at the second gear, the common line diagram in FIG. 3 defines a line connecting the engagement point of the first clutch C1 (rendering the reduced rotation from the first planetary gear set G1 as the input rotation to the second ring gear R2) and an engagement point of the second brake B2 (braking the rotation of the fourth sun gear S4), thus reducing the rotation inputted from the input shaft 1 (the second gear is, however, higher than the first gear) and thereafter outputting the thus reduced rotation from the output gear 2.

FIG. 4(b) shows the torque flow paths at the second gear, with the first clutch C1, the second brake B2 and each of the members indicated by the bold line and with the first planetary gear set G1 and the second planetary gear set G2 hatched. Hereinabove, the bold line and the hatching teach that the torque is operated.

In view of the third planetary gear set G3, the third pinion P3 free of constraint may revolve around the stationary sun gear S3 and the stationary sun gear S4 in accordance with the output rotation of the third ring gear R3. In sum, although acting as a rotation member, the third planetary gear set G3 may make substantially no contribution to the torque flow.

Third Gear

As is seen in FIG. 2, disengaging the second brake B2 (which is engaged at the second gear) while engaging the second clutch C2, namely, engaging the first clutch C1 and the second clutch C2 may achieve the forward third gear.

At the third gear, in view of the second planetary gear set G2, engaging the first clutch C1 may input the reduced rotation from the first planetary gear set G1 to the second ring gear R2. Substantially simultaneously with this, engaging the second clutch C2 may input the reduced rotation from the first planetary gear set G1 to the second sun gear S2 of the second planetary gear set G2.

In view of the second planetary gear set G2, substantially the same reduced rotation is inputted to the second ring gear R2 and the second sun gear S2, thus outputting the reduced rotation (substantially the same as the reduced rotation from the first planetary gear set G1) to the output gear 2 via the second planetary carrier PC2 (rotating integrally with the second ring gear R2 and the second sun gear S2) and the second connector member M2.

Summarizing the above, at the third gear, the common line diagram in FIG. 3 defines a line connecting the engagement point of the first clutch C1 (rendering the reduced rotation from the first planetary gear set G1 as the input rotation to the second ring gear R2) and an engagement point of the second clutch C2 (rendering the reduced rotation from the first planetary gear set G1 as the input rotation to the second sun gear S2), thus reducing the rotation inputted from the input shaft 1 (with a reduction ratio equal to that of the first planetary gear set G1) and thereafter outputting the thus reduced rotation from the output gear 2.

FIG. 4(c) shows the torque flow paths at the third gear, with the first clutch C1, the second clutch C2 and each of the members indicated by the bold line and with the first planetary gear set G1 and the second planetary gear set G2 hatched. Hereinabove, the bold line and the hatching teach that the torque is operated.

Hereinabove, the third planetary gear set G3 may make substantially no contribution to the torque flow.

Fourth Gear

As is seen in FIG. 2, disengaging the second clutch C2 (which is engaged at the third gear) while engaging the third clutch C3, namely, engaging the first clutch C1 and the third clutch C3 may achieve the forward fourth gear.

At the fourth gear, in view of the second planetary gear set G2, engaging the first clutch C1 may input the reduced rotation from the first planetary gear set G1 to the second ring gear R2.

On the other hand, in view of the third planetary gear set G3, engaging the third clutch C3 may input the input rotation from the input shaft 1 to the third planetary carrier PC3 via the center member CM. Thereby, the rotation of the third sun gear S3 is more increased than the output rotation of the third ring gear R3. The thus increased rotation of the third sun gear S3 may be transmitted to the second sun gear S2 via the first connector member M1.

In view of the second planetary gear set G2, the reduced rotation is inputted from the second ring gear R2 while the increased rotation is inputted from the second sun gear S2, thus increasing the reduced rotation from the second ring gear R2 (although lower than the input rotation). The thus increased rotation is to be outputted from the second planetary carrier PC2 to the output gear 2 via the second connector member M2.

Summarizing the above, at the fourth gear, the common line diagram in FIG. 3 defines a line connecting the engagement point of the first clutch C1 (rendering the reduced rotation from the first planetary gear set G1 as the input rotation to the second ring gear R2) and an engagement point of the third clutch C3 (rendering the rotation of the third planetary carrier PC3 as the input rotation), thus slightly reducing the rotation inputted from the input shaft 1 and thereafter outputting the thus slightly reduced rotation from the output gear 2.

FIG. 5(a) shows the torque flow paths at the fourth gear, with the first clutch C1, the third clutch C3 and each of the members indicated by the bold line and with the first planetary gear set G1, the second planetary gear set G2 and the third planetary gear set G3 (excluding the fourth sun gear S4) hatched. Hereinabove, the bold line and the hatching teach that the torque is operated.

Fifth Gear

As is seen in FIG. 2, disengaging the first clutch C1 (which is engaged at the fourth gear) while engaging the second clutch C2, namely, engaging the second clutch C2 and the third clutch C3 may achieve the forward fifth gear.

At the fifth gear, engaging the second clutch C2 may input the reduced rotation from the first planetary gear set G1 to the third sun gear S3 via the second sun gear S2 and the first connector member M1. Substantially simultaneously with this, engaging the third clutch C3 may input the input rotation from the input shaft 1 to the third planetary carrier PC3 via the center member CM.

In view of the third planetary gear set G3, the input rotation is inputted to the third planetary carrier PC3 while the reduced rotation from the first planetary gear set G1 is inputted to the third sun gear S3, thus increasing the input rotation. The thus increased rotation (higher than the input rotation) is to be outputted from the third ring gear R3 to the output gear 2 via the second connector member M2.

Summarizing the above, at the fifth gear, the common line diagram in FIG. 3 defines a line connecting the engagement point of the second clutch C2 (rendering the reduced rotation from the first planetary gear set G1 as the input rotation to the third sun gear S3) and an engagement point of the third clutch C3 (rendering the rotation of the third planetary carrier PC3 as the input rotation), thus slightly increasing the rotation inputted from the input shaft 1 and thereafter outputting the thus slightly increased rotation from the output gear 2.

FIG. 5(b) shows the torque flow paths at the fifth gear, with the second clutch C2, the third clutch C3 and each of the members indicated by the bold line and with the first planetary gear set G1 and the third planetary gear set G3 (excluding the fourth sun gear S4) hatched. Hereinabove, the bold line and the hatching teach that the torque is operated.

Sixth Gear

As is seen in FIG. 2, disengaging the second clutch C2 (which is engaged at the fifth gear) while engaging the second brake B2, namely, engaging the third clutch C3 and the second brake B2 may achieve the forward sixth gear.

At the sixth gear, engaging the third clutch C3 may input the input rotation from the input shaft 1 to the third planetary carrier PC3 via the center member CM of the third planetary gear set G3. Moreover, engaging the second brake B2 may hold stationary the fourth sun gear S4 of the third planetary gear set G3 to the transmission case 3.

In view of the third planetary gear set G3, the input rotation is inputted to the third planetary carrier PC3 while the fourth sun gear S4 is held stationary to the transmission case 3, thus increasing the input rotation. The thus increased rotation is to be outputted from the third ring gear R3 to the output gear 2 via the second connector member M2.

Summarizing the above, at the sixth gear, the common line diagram in FIG. 3 defines a line connecting the engagement point of the third clutch C3 (rendering the rotation of the third planetary carrier PC3 as the input rotation) and the engagement point of the second brake B2 (holding stationary the fourth sun gear S4 to the transmission case 3), thus increasing the rotation inputted from the input shaft 1 and thereafter outputting the thus increased rotation from the output gear 2.

FIG. 5(c) shows the torque flow paths at the sixth gear, with the third clutch C3, the second brake B2 and each of the members indicated by the bold line and with the third planetary gear set G3 (excluding the third sun gear S3) hatched. Hereinabove, the bold line and the hatching teach that the torque is operated.

Reverse Gear

As is seen in FIG. 2, engaging the second clutch C2 and the first brake B1 may achieve the reverse gear.

At the reverse gear, engaging the second clutch C2 may input the reduced rotation from the first planetary gear set G1 to third sun gear S3 via the second sun gear S2 and the first connector member M1. On the other hand, engaging the first brake B1 may hold stationary the planetary carrier PC3 to the transmission case 3.

In view of the third planetary gear set G3, the forward reduced rotation is inputted to the third sun gear S3 while the third planetary carrier PC3 may be held stationary to the transmission case 3, thus outputting the reverse reduced rotation from the third ring gear R3 to the output gear 2 via the second connector member M2.

Summarizing the above, at the reverse gear, the common line diagram in FIG. 3 defines a line connecting the engagement point of the second clutch C2 (rendering the reduced rotation from the first planetary gear set G1 as the input rotation to the third sun gear S3) and the engagement point of the first brake B1 (braking the rotation of the third planetary carrier PC3), thus reversely reducing the rotation inputted from the input shaft 1 and thereafter outputting the thus reversely reduced rotation from the output gear 2.

FIG. 6 shows the torque flow paths at the reverse gear, with the second clutch C2, the first brake B1 and each of the members indicated by the bold line and with the first planetary gear set G1 and the third planetary gear set G3 (excluding the fourth sun gear S4) hatched. Hereinabove, the bold line and the hatching teach that the torque is operated.

Improvement Over the Related Art

A basic concept of the speed change gear according to the first embodiment is to achieve the forward six speeds by the three clutches and the two brakes. Although the speed change gear according to the first embodiment is based on the combination of the speed reduction planetary gear set and the Simpson planetary gear train, the problem (3) and the problem (4) of the Simpson planetary gear train are solved.

Moreover, the basic concept of the speed change gear according to the first embodiment is to solve probable new problems which may be inevitably caused to the combination of the speed reduction planetary gear set and the Ravigneaux compound planetary gear train.

Hereinafter described is an exemplary feature of the speed change gear according to the first embodiment, as compared with the speed change gear using the Simpson planetary gear train or the Ravigneaux compound planetary gear train.

Figure 8A:
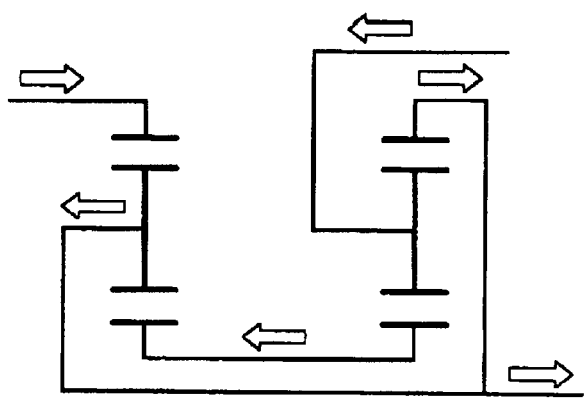
FIG. 8(a) is a schematic diagram of a Simpson planetary gear train, showing torque conductive paths at a first gear.

* Feature of Simpson Planetary Gear Train (α) In the Simpson planetary gear train, a torque flow at the first gear (causing a maximum torque) may be born via all members, as is seen in FIG. 8(a), which is advantageous in terms of strength.

Figure 9:
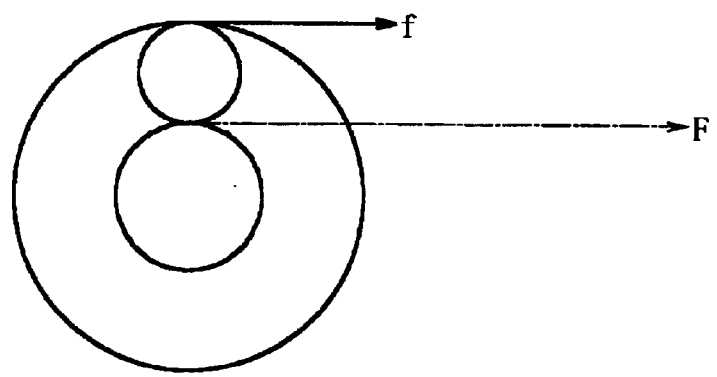
FIG. 9 shows a difference in tangent force of the planetary gear set between a sun gear input F and a ring gear input f.

(β) Simpson planetary gear train having a ring gear input may cause about half tangent force compared with a sun gear input, which is advantageous in terms of gear strength, gear life and carrier rigidity and the like. More specifically, as is seen in FIG. 9, substantially the same torque inputted to the planetary gear set may cause a ring gear input f having a tangent force ½ to ½.5 times that of a sun gear input F.

Figure 10A:
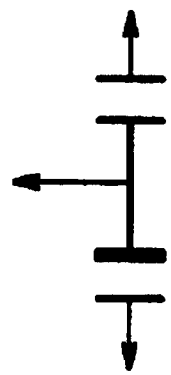
FIG. 10(a) is a schematic showing that the Simpson planetary gear train lacks rotation members, thus rendering the carrier input unachievable.
Figure 10B:
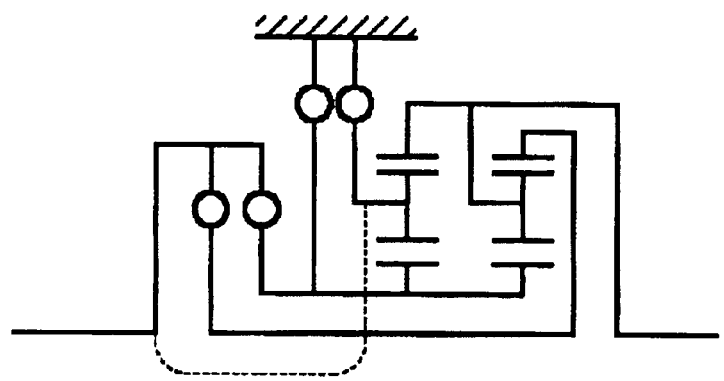
FIG. 10(b) is a schematic of the Simpson planetary gear train incapable of achieving the carrier input.

(γ) The Simpson planetary gear train is supposed to make a carrier input for achieving an over drive O/D gear shift. Disposing the input shaft and the output shaft substantially coaxially in the Simpson planetary gear train may limit the rotation members three in number, as is seen in FIG. 10(a), rendering the carrier input path {see a broken line in FIG. 10(b)} unobtainable.

Obtaining the carrier input path for achieving the over drive O/D needs to dispose the input shaft and the output shaft on different shafts (parallel disposition), thus making the automatic transmission radially enlarged.

\* Feature of Ravigneaux Compound Planetary Gear Train

Figure 8B:
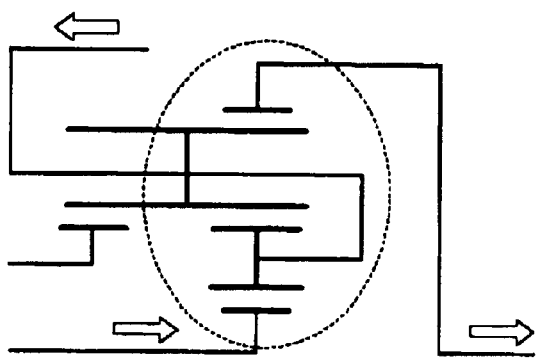
FIG. 8(b) is a schematic diagram of the Ravigneaux compound planetary gear train, showing torque conductive paths at a first gear.

For solving the feature (γ), the Ravigneaux compound planetary gear train replacing the Simpson planetary gear train is used for the speed change gear. The Ravigneaux compound planetary gear train can dispose the input shaft and the output shaft substantially coaxially, leaving the following problems though:

(δ) As is seen in FIG. 8(b), the maximum torque (at first gear) of the gear train may be born by the double pinion planetary gear set on one side of the Ravigneaux planetary gear train, which is disadvantageous in terms of strength.

Figure 7:
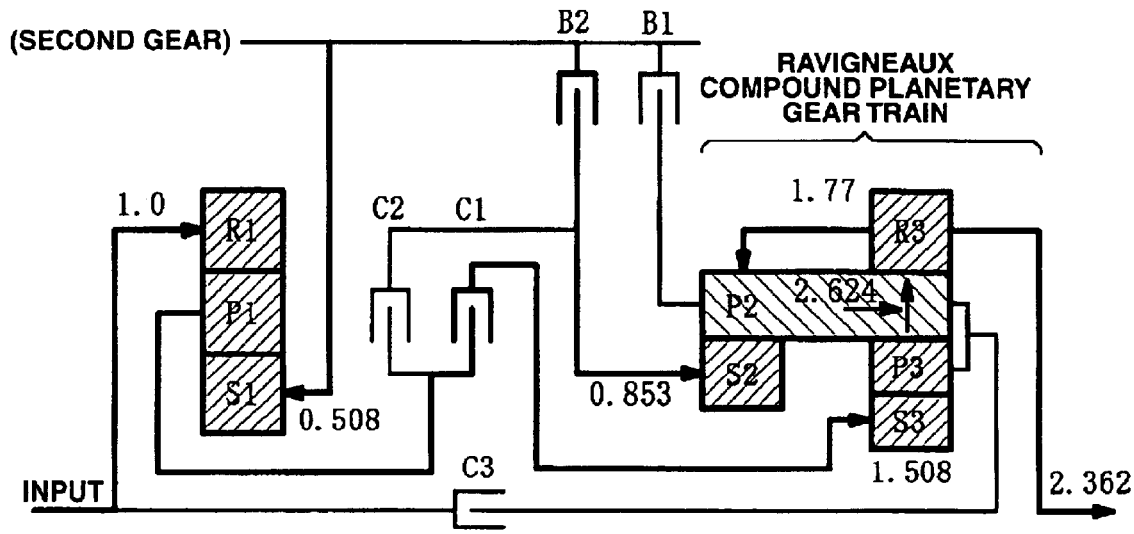
FIG. 7 is a typical skeleton diagram of a speed change gear for an automatic transmission, with a Ravigneaux compound planetary gear train causing a torque circulation at a second gear.

(ε) A torque increased with one single pinion planetary gear set (speed reduction planetary gear set) may be inputted to a sun gear of the Ravigneaux compound planetary gear train, as is seen in FIG. 7. The sun gear input may cause greater tangent force than the ring gear input {see problem (β) above}, which is disadvantageous in terms of gear strength, gear life, carrier rigidity and the like.

(ξ) At the first gear, securing strength (gear strength and gear life) of the Ravigneaux compound planetary gear train and improving the carrier rigidity and the like need to enlarge the Ravigneaux compound planetary gear train, thus making the automatic transmission enlarged.

(η) The second gear may cause the torque circulation to the Ravigneaux compound planetary gear train, as is seen in FIG. 7, thus lowering transmission efficiency leading to increase in the fuel consumption.

Herein, the above torque circulation is described referring to FIG. 7. An output torque (2.362) and a circulating torque (1.77) are caused dividedly from a third sun gear R3. The circulating torque (1.77) may circulate at the second gear in the third ring gear R3 and a second pinion P2.

Figure 10C:
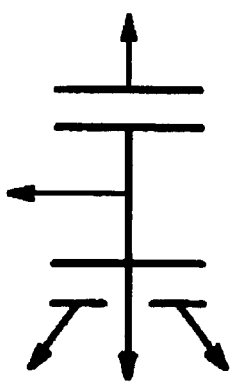
FIG. 10(c) is a schematic of a double sun gear planetary gear set under the present invention, achieving the carrier input.

Feature of the Planetary Gear Train According to the First Embodiment of the Present Invention The Ishimaru planetary gear train having the combination of the single pinion planetary gear set G2 and the double sun gear planetary gear set G3 according to the first embodiment has the following exemplary feature:

(a) Achieving the over drive O/D gear shift needs to make the carrier input. The Ishimaru planetary gear train achieving the carrier input can also achieve coaxial disposition (like the Ravigneaux compound planetary gear train) of the input portion and the output portion. More specifically, as is seen in FIG. 10(c), the double sun gear planetary gear set constituting the Ishimaru planetary gear train has increased members, namely five in number, including two members for the sun gear, one member for the ring gear, and two members (one extending axially and the other extending radially) for the planetary carrier. The thus increased members may allow the center member to take the input radially from between the two sun gears, thereby achieving the carrier input at the high gear shift (including the over drive O/D). Hereinabove, according to the first embodiment, the over drive O/D is defined as the fourth gear, the fifth gear and the sixth gear.

(b) The maximum torque (transmission torque at the first gear) of the gear train may be born, as is seen in FIG. 4(a), by the second planetary gear set G2 and the third planetary gear set G3 which constitute the Ishimaru planetary gear train, thus allowing the torque at the first gear to be born via all members, which is advantageous in terms of strength.

(c) The torque increased with the first planetary gear set G1 (one in number) as the speed reduction planetary gear set is inputted to the second ring gear R2 of the Ishimaru planetary gear train, for example, at the first gear and the second gear {see FIG. 4(a) and FIG. 4(b)} which may cause a great transmission torque. Compared with the sun gear input by the Ravigneaux compound planetary gear train, the above ring gear input of the Ishimaru planetary gear train may make the tangent force smaller, which is advantageous in terms of gear strength, gear life, carrier rigidity and the like (thus smaller dimension is achievable).

(d) As compared with the Ravigneaux compound planetary gear train, the Ishimaru planetary gear train may be more advantageous in terms of strength, and also more advantageous in terms of gear strength, gear life, carrier rigidity and the like. In addition, like the Ravigneaux compound planetary gear train, the Ishimaru planetary gear train can dispose the input portion and the output portion substantially coaxially, thus making the speed change gear smaller and further thus making the automatic transmission smaller.

(e) As is seen in FIG. 4(b), the Ishimaru planetary gear train at the second gear may cause substantially no torque circulation, thus improving the transmission efficiency leading to decrease in the fuel consumption, unlike the Ravigneaux compound planetary gear train causing the torque circulation at the second gear.

FIG. 11 is a table showing comparison between the Ravigneaux compound planetary gear train and the Ishimaru planetary gear train with generally applicable gear ratio α(=the number of teeth of sun gear/the number of teeth of ring gear) from 0.35 to 0.65 and in view of a preferable state causing an inter gear shift ratio to become smaller for higher gear shift. The transmission efficiency at the second gear reads 0.950 or 0.952 for the Ravigneaux compound planetary gear train, while reads 0.972 for the first planetary gear set G1 (single pinion) of the Ishimaru planetary gear train and 0.968 for the first planetary gear set G1 (double pinion) of the Ishimaru planetary gear train.

(f) The Ravigneaux compound planetary gear train has a regulation of fixing (constant) the number of teeth of the ring gear for setting the gear ratio α. Therefore, with the generally applicable gear ratio cc from 0.35 to 0.65 and in view of the preferable state causing the inter gear shift ratio to become smaller for higher gear shift, a ratio coverage (first gear ratio/sixth gear ratio) which is an applicable transmission ratio width is in a range from 4.81 (minimum) to 7.20 (maximum), as is seen in FIG. 11.

Compared with the Ravigneaux compound planetary gear train, the Ishimaru planetary gear train defining a gear ratio α2 of the second planetary gear set G2 independently from a gear ratio α3 of the third planetary gear set G3 can have more extensive applicable ratio coverage. More specifically, as is seen in FIG. 11, the first planetary gear set G1 (single pinion) defines the ratio coverage in a range from 4.81 (minimum) to 7.80 (maximum) while the first planetary gear set G1 (double pinion) defines the ratio coverage in a range from 5.08 (minimum) to 9.02 (maximum). For example, the numerical values in FIG. 2 show that selectivity of the gear ratio can be increased (5.5, 6.0, 6.5 and 7.0 are ratio coverage).

As described above, the speed change gear according to the first embodiment may bring about the following effect (A) {including effect (i) to effect (vi)} to effect (G):

(A) At first, the speed change gear according to the first embodiment has the following constitution:

1) an input portion INPUT (input shaft 1) for inputting a rotation from a power source (engine ENG);

2) an output portion OUTPUT (output gear 2) disposed substantially coaxially with the input portion INPUT;

3) three planetary gear sets G1, G2, G3 including a first planetary gear set G1, a second planetary gear set G2 and a third planetary gear set G3 for providing a plurality of power conductive paths to an area defined between the input portion INPUT and the output portion OUTPUT; and 4) a first clutch C1, a second clutch C2, a third clutch C3, a first brake B1 and a second brake B2 to be selectively connected and disconnected in such a manner that the three planetary gear sets G1, G2, G3 change a rotation from the input portion INPUT at a corresponding gear change ratio by selecting one of the plurality of the power conductive paths, thereby outputting the thus changed rotation to the output portion OUTPUT, the first clutch C1, the second clutch C2, the third clutch C3, the first brake B1 and the second brake B2 making a combination of engagement and disengagement, the combination making a selection from at least six forward gears 1ST, 2ND, 3RD, 4TH, 5TH, 6TH and one reverse gear REV.

One (namely, the first planetary gear set G1) of the three planetary gear sets G1, G2 G3 is a speed reduction planetary gear set G1 for continuously reducing the inputted rotation and outputting the thus reduced rotation. The speed reduction planetary gear set G1 includes a first sun gear S1 which is continuously held stationary, a first ring gear R1, a first pinion P1 meshing with the first sun gear S1 and the first ring gear R1, and a first planetary carrier PC1 for carrying the first pinion P1 in such a manner that the first pinion P1 rotates.

One of the remaining two planetary gear sets G2, G3 of the three planetary gear sets G1, G2, G3 is a single pinion planetary gear set G2, G2, G3 which includes;

a second sun gear S2, a second pinion P2 meshing with the second sun gear S2, a second ring gear R2 meshing with the second pinion P2, and a second planetary carrier PC2 for carrying the second pinion P2 in such a manner that the second pinion P2 rotates.

The other of the remaining two planetary gear sets G2, G3 of the three planetary gear sets G1, G2, G3 is a double sun gear planetary gear set G3 which includes;

two sun gears including a third sun gear S3 and a fourth sun gear S4, a third pinion P3 meshing with the third sun gear S3 and the fourth sun gear S4 in common, a third ring gear R3 meshing with the third pinion P3, a third planetary carrier PC3 for carrying the third pinion P3 in such a manner that the third pinion P3 rotates, and a center member CM connected to the third planetary carrier PC3 and extending radially inward from between the third sun gear S3 and the fourth sun gear S4.

Disposed sequentially from the input portion INPUT (input shaft 1)s' side are the speed reduction planetary gear set G1, the single pinion planetary gear set G2 of the other of the remaining two planetary gear sets G2, G3 of the three planetary gear sets G1, G2, G3, and the double sun gear planetary gear set G3.

The input portion INPUT (input shaft 1) is connected to the first ring gear R1 and is adapted to be made connectable to the center member CM by the third clutch C3.

The second sun gear S2 and the third sun gear S3 are connected mutually by a first connector member M1, and are adapted to be made connectable to the first planetary carrier PC1 by the second clutch C2.

The second planetary carrier PC2 and the third ring gear R3 are mutually connected by a second connector member M2, and are connected to the output portion OUTPUT (output gear 2).

The first planetary carrier PC1 and the second ring gear R2 are adapted to be connected by the first clutch C1.

The third planetary carrier PC3 is adapted to be held stationary by the first brake B1, while the fourth sun gear S4 is adapted to be held stationary by the second brake B2.

With the above constitution, the speed change gear according to the first embodiment may bring about the following effect (i) to effect (vi):

(i) The two planetary gear sets including the first planetary gear set G1 and the second planetary gear set G2 constitute the speed change planetary gear set (the Ishimaru planetary gear train), which is advantageous for the reasons described above in terms of strength including the gear strength, gear life and the like of the speed change planetary gear set.

(ii) Eliminating the torque circulation at the second gear may decrease the fuel consumption.

(iii) Disposing the input shaft 1 and the output gear 2 substantially coaxially may reduce the transmission in size radially.

(iv) The speed change planetary gear sets constituting the Ishimaru planetary gear train can make the strength requirement less stringent for the above reasons, thus making the speed change planetary gear sets smaller. In addition to the input shaft 1 and the output gear 2 disposed substantially coaxially, the smaller speed change planetary gear sets may contribute to making the automatic transmission smaller.

(v) Compared with the Ravigneaux compound planetary gear train, the Ishimaru planetary gear train can increase the selectivity of the gear ratio for the above reasons.

(vi) The first planetary gear set G1 (one in number) is the speed reduction planetary gear set for continuously reducing the input rotation with the first sun gear S1 held stationary and has the first ring gear R1 having the large diameter and acting as the input element, thus making the speed reduction planetary gear set smaller and further thus making the automatic transmission smaller.

(B) Hereinafter described is more about the effect of the speed change gear according to the first embodiment:

The combination of the speed reduction planetary gear set G1, the single pinion planetary gear set G2 and the double pinion planetary gear set G3 constituting the speed change gear according to the first embodiment may allow the torque to flow at the first gear (causing the maximum torque) from the speed reduction planetary gear set G1 via the single pinion planetary gear set G2 and the double pinion planetary gear set G3, namely, via all members, which is advantageous in terms of strength. Instead of the sun gear input, the rotation members inputting the torque from the speed reduction planetary gear set G1 are the second ring gear R2 (of the single pinion planetary gear set G2) and the third ring gear R3 (of the double sun gear planetary gear set G3), thus substantially halving the tangent force, which is advantageous in terms of gear strength, gear life, carrier rigidity and the like, in other words, which maintains the feature (1) and the feature (2) brought about by the Simpson planetary gear train.

(C) Moreover, the speed change gear according to the first embodiment has the following constitution:

The torque from the speed reduction planetary gear set G1 is inputted to the second planetary gear set G2 and the third planetary gear set G3 for transmission. Of the above two speed change planetary gear sets, the third planetary gear set G3 is the double sun gear planetary gear set with the two sun gears including the third sun gear S3 and the fourth sun gear S4. Moreover, the center member CM connected to the third planetary carrier PC3 extends radially inward from between the third sun gear S3 and the fourth sun gear S4. With the above constitution, an area between the third planetary carrier PC3 (of the double sun gear planetary gear set G3) and the third clutch C3 (for inputting and outputting the rotation to the third planetary carrier PC3) can be connected by the center member CM extending radially inward from the third planetary carrier PC3 via between the third sun gear S3 and the fourth sun gear S4.

Thereby, in a state of transmitting the input rotation to the third planetary carrier PC3 via the third clutch C3 for achieving the over drive O/D, the above input rotation can be transmitted to the third planetary carrier PC3 via the center member CM between the third sun gear S3 and the fourth sun gear S4, without the need for disposing the input portion 1 and the output portion 2 substantially in parallel. In other words, the over drive O/D can be achieved by disposing the input portion 1 and the output portion 2 substantially coaxially. In sum, the problem (3) and the problem (4) of the Simpson planetary gear train causing larger radial dimension can be solved.

(D) In addition, using the double sun gear planetary gear set G3 according to the first embodiment of the present invention, instead of the Ravigneaux compound planetary gear train, may solve the problem (3) and the problem (4), without causing the following disadvantage:

Disadvantage: The maximum torque of the gear train at the first gear may be born by the double pinion planetary gear set on one side of the Ravigneaux compound planetary gear train, which is disadvantageous in terms of strength.

(E) Using the Ravigneaux compound planetary gear train inputs the torque increased with the speed reduction planetary gear set to a small-diameter sun gear of the Ravigneaux compound planetary gear train, thus causing greater tangent force than those caused by the ring gear input or the carrier input, which is disadvantageous in terms of gear strength, gear life and carrier rigidity and the like. Contrary to the Ravigneaux compound planetary gear train, the double sun gear planetary gear set G3 according to the first embodiment of the present invention can be fee from the above disadvantages in terms of strength in solving the problem (3) and the problem (4).

(F) Moreover, using the Ravigneaux compound planetary gear train may cause the torque circulation at the second gear, thus lowering transmission efficiency leading to increase in fuel consumption. Contrary to this, the double sun gear planetary gear set G3 according to the first embodiment of the present invention may be free from the torque circulation, thus preventing the increase in fuel consumption.

(G) Moreover, according the first embodiment of the present invention, the first planetary gear set G1 which is the speed reduction planetary gear set is a single pinion planetary gear set G1, thus reducing gear noise and the number of component parts and improving the transmission efficiency leading to reduced fuel consumption.

In addition, the speed change gear using the double sun gear planetary gear set G3 according to the first embodiment can increase the selectivity of gear ratios, as compared with the Ravigneaux compound planetary gear train.

Figure 12:
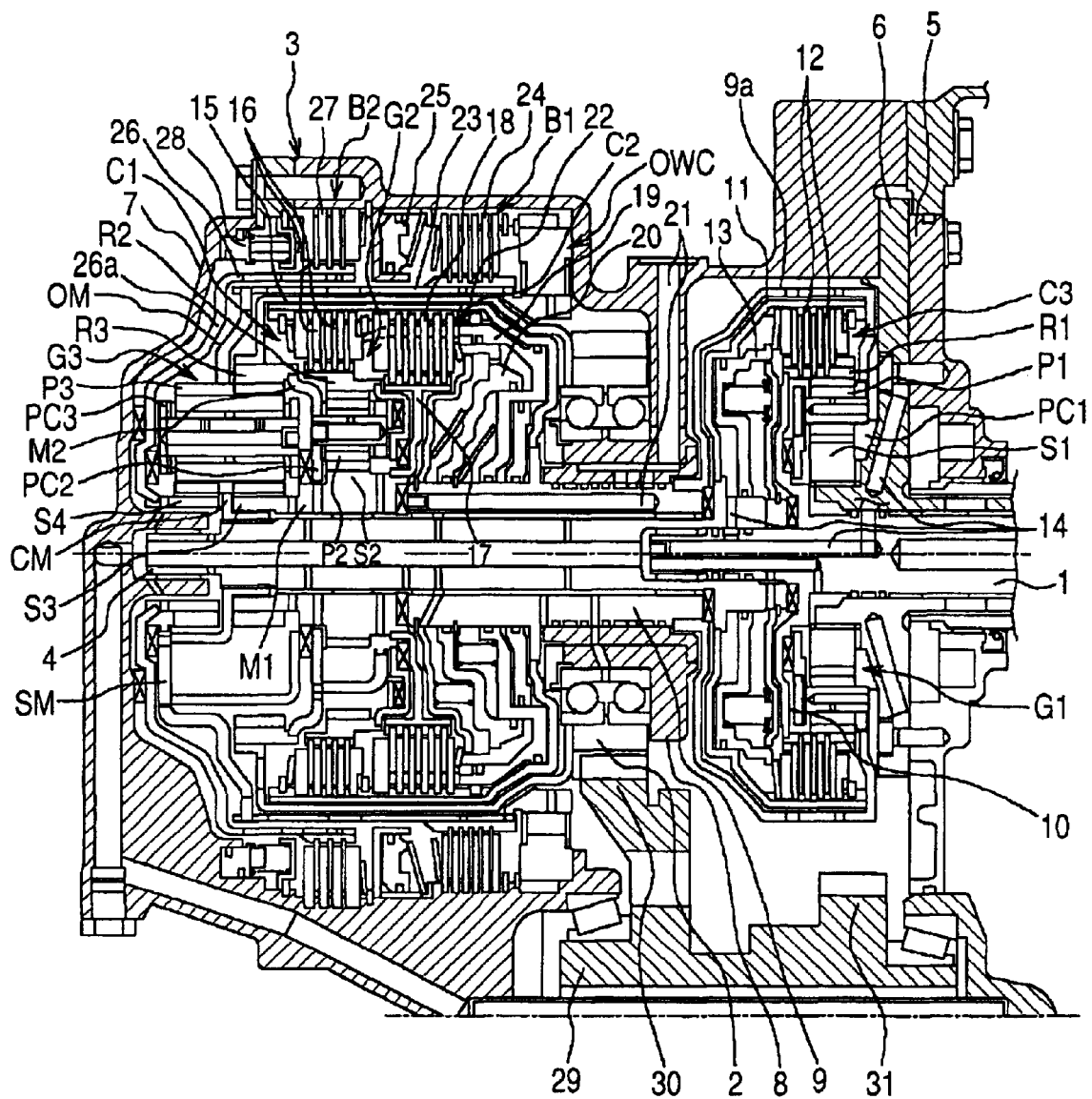

FIG. 12 is a view of a developed cross section showing an actual constitution of the speed change gear in FIG. 1 to FIG. 6, according to the first embodiment of the present invention. Hereinafter described is the actual constitution of the speed change gear referring to FIG. 12 showing the input portion 1 and the output portion 2 reversed relative to those shown by the skeleton diagrams in FIG. 1, FIG. 4, FIG. 5 and FIG. 6.

The input shaft 1 and a middle shaft 4 are disposed sidewise in FIG. 12 substantially coaxially in the transmission case 3, in such a manner as to mate and rotate relative to each other. In sum, the input shaft 1 and the middle shaft 4 are individually born in the transmission case 3 in such a manner as to rotate relative to the transmission case 3.

The transmission case 3 has a front end opening (right in FIG. 12) closer to the input shaft 1, which opening is blocked with a pump case having a pump housing 5 and a pump cover 6. The input shaft 1 is inserted to the pump case to be born by the pump case. An engine (not shown) is drivingly connected to a protrusion end of the input shaft 1 via a torque converter (not shown).

The middle shaft 4 has a rear end (farther side from the input shaft 1 in FIG. 12) which is rotatably born with an end cover 7 at a rear end (left in FIG. 12) of the transmission case 3.

There is provided a middle wall 8 substantially in the middle in an axial direction of the transmission case 3. The output gear 2 is rotatably born by the middle wall 8. The input shaft 1 and the middle shaft 4 define a mating portion which is rotatably born by a wall defining a center opening of the middle wall 8 via a hollow shaft 9.

Between the pump case (including the pump housing 5 and the pump cover 6) and the middle wall 8, there is defined a front space (right in FIG. 12). The first planetary gear set G1 is disposed in the front space (right in FIG. 12). The third clutch C3 is also disposed in the front space (right in FIG. 12) in such a manner as to wrap the first planetary gear set G1.

In view of the first planetary gear set G1, the first sun gear S1 held stationary to the pump cover 6 is continuously incapable of rotating. Moreover, in view of the first planetary gear set G1, the first ring gear R1 connects to a flange 10 extending radially outward from the input shaft 1.

There is provided a clutch drum 11 extending radially outward from a front end (right in FIG. 12, namely, closer to the input shaft 1) of the middle shaft 4 in such a manner as to wrap the first ring gear R1, moreover, there is provided a clutch pack 12 having clutch plates which are splined respectively with an inner periphery of the clutch drum 11 and an outer periphery of the first ring gear R1 in such a manner as to be disposed alternatingly, thus constituting the third clutch C3.

Hereinabove, the third clutch C3 has a clutch piston 13 which mates with an end wall (facing the first planetary gear set G1) of the clutch drum 11. Receiving an operation oil pressure applied from an operation oil duct 14 (formed in the pump cover 6, the input shaft 1 and the middle shaft 4) to the clutch piston 13, the clutch piston 13 may make a stroke, thus engaging the third clutch C3.

There is provided a connector member 9a extending radially outward from the front end (right in FIG. 12) of the hollow shaft 9, and then is shaped substantially into a drum in such a manner as to wrap the third clutch C3. Moreover, the connector member 9a has a front end (right in FIG. 12) connecting to the first planetary carrier PC1.

Between the middle wall 8 and the end cover 7, there is defined a rear space (left in FIG. 12). The second planetary gear set G2, the third planetary gear set G3, the first clutch C1, the second clutch C2, the first brake B1, and the second brake B2 are disposed in the rear space (left in FIG. 12) in the following manner:

The second planetary gear set G2 and the third planetary gear set G3 are disposed on the middle shaft 4. In this case, however, the second planetary gear set G2 is disposed nearer to the input shaft 1 than the third planetary gear set G3.

The first connector member M1 integrates the second sun gear S2 of the second planetary gear set G2 with the third sun gear S3 of the third planetary gear set G3. The thus integrated sun gear S2 and the third sun gear S3 are rotatably born on the middle shaft 4.

From substantially a center of the hollow shaft 9, there is provided a clutch drum 15 extending radially outward and then extending axially rearward (leftward in FIG. 12) to an outer periphery of the second ring gear R2, moreover, there is provided a clutch pack 16 having clutch plates which are splined respectively with an inner periphery of the clutch drum 15 and an outer periphery of the second ring gear R2 in such a manner as to be disposed alternatingly, thus constituting the first clutch C1.

As described above, the second clutch C2 is disposed nearer to the input shaft 1 than the first clutch C1 which is disposed on the outer periphery of the second planetary gear G2. With the above constitution, there is provided a clutch hub 17 fixed to the outer end of the second sun gear S2 (on the input shaft 1's side of the second sun gear S2) and extending radially outward, moreover, there is provided a clutch pack 18 having clutch plates which are splined respectively with an outer periphery of the clutch hub 17 and an inner periphery of the clutch drum 15 in such a manner as to be disposed alternatingly, thus constituting the second clutch C2.

Hereinabove, as a double piston with the clutch piston 20 sliding inside the clutch piston 19, the clutch piston 19 of the first clutch C1 and the clutch piston 20 of the second clutch C2 are in combination disposed on the second clutch C2's side away from the first clutch C1. With the above constitution, the clutch piston 20 may mate with the end wall (right in FIG. 12, and facing the second planetary gear set G2) of the clutch drum 15.

Receiving an operation oil pressure applied from operation oil ducts 21 formed individually in the middle wall 8 and the hollow shaft 9 (shown in FIG. 12 is one operation oil duct 21 only), the clutch piston 19 and the clutch piston 20 may make a stroke, thus engaging the first clutch C1 and the second clutch 20 individually.

As described above, the third planetary gear set G3 is the double sun gear planetary gear set. The third ring gear R3 is smaller in tooth width than the third pinion P3. With this, the third ring gear R3 may mesh with the third pinion P3 at an end portion near to the second planetary gear set G2, thus shortening the second connector member M2 for connecting the third ring gear R3 to the second planetary carrier PC2 of the second planetary gear set G2.

Around an outer periphery of the third ring gear R3, there is provided a tubular connector member 22 disposed in such a manner as to wrap the clutch drum 15 of the first clutch C1 and the second clutch C2. The tubular connector member 22 has a first end (left in FIG. 12) connecting to the outer periphery of the third ring gear R3 and a second end (right in FIG. 12) connecting to the output gear 2.

The third planetary carrier PC3 of the third planetary gear set G3 is fitted with the center member CM which connects to a side member SM bearing the third pinion P3 and which extends radially inward via between the third sun gear S3 and the fourth sun gear S4. Moreover, substantially in an axial center of the third pinion P3, the third planetary carrier PC3 of the third planetary gear set G3 is fitted with the outer member OM extending radially outward substantially along an end face (left in FIG. 12) of the third ring gear R3.

The center member CM is drivably connected to the middle shaft 4, thus connecting the third planetary carrier PC3 to the clutch drum 11 of the third clutch C3 via the center member CM and the middle shaft 4.

The outer member OM has an outer periphery connecting to a brake hub 23. Being disposed around an outer periphery of the tubular connector member 22, the brake hub 23 extends frontward (rightward in FIG. 12) toward the middle wall 8.

There is provided a brake pack 24 having brake plates which are splined respectively with an outer periphery at a front end (right in FIG. 12) of the brake hub 23 and an inner periphery of the transmission case 3 in such a manner as to be disposed alternatingly, thus constituting the first brake B1. The first brake B1 is adapted to be engaged by a brake piston 25 which mates in the transmission case 3 in a rearward position (left in FIG. 12) of the brake pack 24.

There is provided a brake hub 26 disposed in such a manner as to cover the rear end (left in FIG. 12) of the brake hub 23. The brake hub 26 has a rear end wall 26a extending circumferentially inward substantially along a back portion of the third planetary gear set G3, moreover, an inner periphery of the rear end wall 26a of the brake hub 26 connects to the fourth sun gear S4 of the third planetary gear set G3, thus constituting a first rotation member.

There is provided a brake pack 27 having brake plates which are splined respectively with an outer periphery of the brake hub 26 and the inner periphery of the transmission case 3, thus constituting the second brake B2. The second brake B2 is adapted to be engaged by a brake piston 28 which mates in the transmission case 3 in a rearward position (left in FIG. 12) of the brake pack 27.

The above summarizes that each of the first brake B1 and the second brake B2 is disposed outside the first clutch C1 and the second clutch C2. Moreover, the first brake B1 is disposed nearer to the input shaft 1 (or the first planetary gear set G1) than the second brake B2. The first brake B1 and the second brake B2 are, however, disposed nearer to the second planetary gear set G2 than the third planetary gear set G3.

Although being omitted from the skeleton diagrams in FIG. 1, FIG. 4, FIG. 5 and FIG. 6, a one way clutch OWC is disposed between the front end (of the brake hub 23 constituting the first brake B1) and the transmission case 3. In a disengagement state of the first brake B1, the one way clutch OWC may prevent one way rotation of the third planetary carrier PC3, thus achieving the first gear.

At the above first gear achieved by the one way clutch OWC, however, the OWC may allow a reverse rotation of the third planetary carrier PC3, thus rendering the engine brake unobtainable. Therefore, in case the engine brake is requested, the first brake B1 is engaged so as to prevent the reverse rotation of the third planetary carrier PC3.

Moreover, a counter shaft 29 extending substantially in parallel to the input shaft 1 and the middle shaft 4 is rotatably born in the transmission case 3. A counter gear 30 and a final drive pinion 31 are integrated with the counter shaft 29. The counter gear 30 may mesh with the output gear 2 while the final drive pinion 31 may mesh with the differential gear device (not shown in FIG. 12) between vehicle's drive wheels.

Other than the above first rotation member, there are provided the following rotation members, according to the first embodiment:

* A second rotation member including the second sun gear S2, the third sun gear S3, the first connector member M1 and the clutch hub 17.
* A third rotation member including the second connector member M2, the second planetary carrier PC2, the third ring gear R3 (which two are connected with each other via the second connector member M2), and the tubular connector member 22.
* A fourth rotation member including the third planetary carrier PC3, the center member CM, the middle shaft 4, the clutch drum 11, the outer member OM, and the brake hub 23.
* A fifth rotation member including the second ring gear R2.

With the above constitution shown in FIG. 12, the speed change gear according to the first embodiment of the present invention is the combination of three planetary gear sets (namely, the first planetary gear set G1, the second planetary gear set G2, and the third planetary gear set G3), the first rotation member, the second rotation member, the third rotation member, the fourth rotation member and the fifth rotation member, thus bringing about the following effects, in addition to the above effect (A) to effect (G):

Effect

Of the double sun gear planetary gear set G3 and the single pinion planetary gear set G2, it is the single pinion planetary gear set G2 that relates to both the second rotation member and the fifth rotation member. In other words, it is the single pinion planetary gear set G2 to which the reduced rotation is inputted from the speed reduction planetary gear set G1 via the first clutch C1 and the second clutch C2, and the single pinion planetary gear set G2 is disposed on the nearer side to the speed reduction planetary gear set G1 than the double sun gear planetary gear set G3. With the above constitution, the power conductive path can be shortened that includes the first clutch C1 and the second clutch C for transmitting the great torque rotation (reduced with the speed reduction planetary gear set G1) to the single pinion planetary gear set G2. The thus shortened power conductive path may contribute to smaller size of the component parts for the power transmission and may facilitate handling and mounting of the component parts, thus making the automatic transmission smaller.

The above effect can be more remarkable when the first clutch C1 and the second clutch C2 are disposed in the vicinity of the single pinion planetary gear set G2, especially, on the outer periphery of the single pinion planetary gear set G2, as is seen in FIG. 12. In addition, the clutch piston 19 of the first clutch C1 and the clutch piston 20 of the second clutch C2 can be made into the double piston constitution as is seen in FIG. 12, thus saving the space therefor and thus making the speed change gear still smaller.

Moreover, the speed reduction planetary gear set G1, the single pinion planetary gear set G2, and the double sun gear planetary gear set G3 which are disposed sequentially from the input shaft 1's side may bring about the following effect:

Effect

The double sun gear planetary gear set G3 disposed at the rear end (remotest from the input shaft 1) has the outer periphery with great layout freedom (or flexibility) in the axial direction of the third ring gear R3, thus allowing the third ring gear R3 to be disposed on the input shaft 1's side for meshing with the third pinion P3, as is seen in FIG. 12. Moreover, the outer member OM connecting the third planetary carrier PC3 (of the double sun gear planetary gear set G3) to the first brake B1 (brake hub 23) extends, substantially in the axial center of the third pinion P3, radially outward from the third planetary carrier PC3 in such a manner as to run substantially along the end face of the third ring gear R3 which is moved toward (forward, namely, rightward in FIG. 12) the single pinion planetary gear set G2 for meshing with the third pinion P3. With the above constitution, the third ring gear R3 and the outer member OM allow the end cover 7 for the transmission case 3 in the vicinity of the rear end outer periphery of the double sun gear planetary gear set G3 to be dented radially inward, as is seen in FIG. 12.

The speed change gear in FIG. 12 may occasionally be mounted sidewise in the engine room of the vehicle. In this case, the end outer periphery (the end cover 7) on the remote side from the input shaft 1 can be small in diameter, thus causing substantially no interference with body members protruding (bulging) in the engine room. In other words, in addition to the advantages described in connection with FIG. 1, FIG. 4, FIG. 5 and FIG. 6, the speed change gear in FIG. 12 is advantageous in terms of mounting and layout in the vehicle.

Moreover, the third ring gear R3 and the outer member OM disposed in the above manner can bring about an ample space in the vicinity of the rear end outer periphery of the third planetary gear set G3, thus allowing the rear end wall 26a (connecting the fourth sun gear S4 to the second brake B2 which holds stationary the fourth sun gear S4) of the brake hub 26 to be bendable into the space. The thus bent rear end wall 26a can allow the end cover 7 for the transmission case 3 in the vicinity of the rear end outer periphery of the double sun gear planetary gear set G3 to be assuredly dented radially inward, as is seen in FIG. 12.

Moreover, with the above disposition of the first clutch C1, the second clutch C2 and the third clutch C3 in FIG. 12, the first clutch C1 and the second clutch C2 can approach the input shaft 1, thus further (or more extensively) denting radially inward the end cover 7 for the transmission case 3 in the vicinity of the rear end outer periphery of the double sun gear planetary gear set G3. Thereby, the speed change gear disposed sidewise in the engine room can have more remarkable effect in terms of mounting and layout.

Moreover, having the above disposition in FIG. 12, the first clutch C1 and the second clutch C2 can approach the speed reduction planetary gear set G1, thus shortening the members (the middle shaft 9 and the clutch drum 15) connecting the first clutch C1 and the second clutch C2 with the speed reduction planetary gear set G1. In other words, the members (the middle shaft 9 and the clutch drum 15) can be made shorter, smaller, lighter and simpler.

Moreover, disposing the first clutch C1 and the second clutch C2 sidewise allows the double piston constitution, namely, the clutch piston 19 and the clutch piston 20, respectively. In addition to the double piston constitution, disposing the first clutch C1 and the second clutch C2 sidewise allows a return spring and a centrifugal pressure cancellation chamber to be used in common for the clutch piston 19 and the clutch piston 20, thus reducing the number of component parts and reducing size and cost of the speed change gear.

In addition to disposing the first clutch C1 and the second clutch C2 as described above, the respective clutch piston 19 and clutch piston 20 on the single pinion planetary gear set G2 are disposed on the farther side from the double sun gear planetary gear set G3. With the above constitution, the clutch piston 19 of the first clutch C1 and the clutch piston 20 of the second clutch C2 are free from being disposed on the outer periphery of the double sun gear planetary gear set G3. With this, the end cover 7 for the transmission case 3 in the vicinity of the rear end outer periphery of the double sun gear planetary gear set G3 may be dented radially inward, thus further improving the mounting and layout with the speed change gear disposed sidewise in the engine room.

Moreover, being disposed on the outer periphery of the speed reduction planetary gear set G1, the third clutch C3 for inputting the rotation of the input shaft 1 directly to the third planetary carrier PC3 of the double sun gear planetary gear set G3 is closer to the input shaft 1 than the first clutch C1 and the second clutch C2. With the above constitution, the end cover 7 for the transmission case 3 in the vicinity of the rear end outer periphery of the double sun gear planetary gear set G3 can be dented radially inward, thus securely improving the mounting and layout with the speed change gear disposed sidewise in the engine room. In addition, with the above constitution, the operation oil duct 14 and the operation oil duct 21 of the first clutch C1, the second clutch C2 and the third clutch C3 can be handled more easily and difference in length between the operation oil duct 14 and the operation oil duct 21 can be reduced, thus improving controllability of the first clutch C1, the second clutch C2 and the third clutch C3 and thus achieving substantially a uniform transmission response of the first clutch C1, the second clutch C2 and the third clutch C3.

Moreover, the clutch piston 13 (of the third clutch C3) disposed on the speed reduction planetary gear set G1 is on the closer side to the single pinion planetary gear set G2. With the above constitution, the clutch piston 13 of the third clutch C3 can be disposed in the vicinity of the clutch piston 19 of the first clutch C1 and the clutch piston 20 of the second piston C2 in such a manner as to turn the clutch piston 13's back to backs of the clutch piston 19 and the clutch piston 20. With the above constitution, the operation oil duct 14 and the operation oil duct 21 of the first clutch C1, the second clutch C2 and the third clutch C3 can be handled more easily and the difference in length between the operation oil duct 14 and the operation oil duct 21 can be reduced, thus improving the controllability of the first clutch C1, the second clutch C2, and the third clutch C3 and thus achieving substantially the uniform transmission response of the first clutch C1, the second clutch C2 and the third clutch C3 with greater assuredness.

Between the speed reduction planetary gear set G1 and the single pinion planetary gear set G2, the operation oil duct 21 of the first clutch C1 and the second clutch C2 is formed in the middle wall 8 which is an output gear bearing wall disposed in the transmission case 3. With the above constitution, the operation oil duct 21 can be shortened which is to extend between the first clutch C1 and the control valve body (not shown) and between the second clutch C2 and the control valve (not shown). Hereinabove, the control body (not shown) for transmission control is to be disposed in a given position in the circumferential direction of the transmission case 3. Moreover, with the above constitution, the operation oil duct 21 can be substantially equal in length, thus achieving substantially the uniform transmission response of the first clutch C1 and the second clutch C2. Even in a condition that a relatively high hydraulic pressure is requested due to a great transmission torque, the operation oil duct 21 of the first clutch C1 and the second clutch C2 can be free from a reinforcing sleeve and the like since the operation oil duct 21 is formed in the middle wall 8 that is relatively thick for bearing the output gear 2. In sum, forming the operation oil duct 21 directly in the middle wall 8 can prevent increase in the number of component parts and prevent higher cost.

The first brake B1 for holding stationary the third planetary carrier PC3 is connected to the third planetary carrier PC3 via the outer member OM which is taken out from the rear side (left in FIG. 12) of the double sun gear planetary gear set G3 which rear side (left in FIG. 12) is farthest away from the speed reduction planetary gear set G1, while the second brake B2 for holding stationary the fourth sun gear S4 is connected to the fourth sun gear S4 via the rear end wall 26a which is taken out from the rear side (left in FIG. 12) of the double sun gear planetary gear set G3 which rear side (left in FIG. 12) is farthest away from the speed reduction planetary gear set G1. With the above constitution, the brake force conductive path can be simplified and shortened in relation to the disposition of the first clutch C1 and the second clutch C2, thus preferably increasing braking efficiency and making the speed change gear smaller.

Moreover, as is seen in FIG. 12, the first brake B1 and the second brake 12 are preferably disposed on the outer periphery of the first clutch C1 and the second clutch C2. With the above constitution, the outer member OM and the rear end wall 26a can be disposed on the rear side (left in FIG. 12) of the double sun gear planetary gear set G3 which rear side (left in FIG. 12) is farthest away from the speed reduction planetary gear set G1, thus securing with ease the space for the outer member OM and the rear end wall 26a. In addition, the above constitution may bring about the following effect:

Effect: A brake disposed substantially along the inner periphery of the transmission case 3 ordinarily makes the transmission case 3 large in diameter. Contrary to the above, the first brake B1 and the second brake B2 in the above constitution with the first clutch C1 and the second clutch C2 disposed relatively forward (rightward in FIG. 12) in the transmission case 3 can be disposed relatively forward (rightward in FIG. 12) in the transmission case 3, thus making the rear end (left in FIG. 12) of the transmission case 3 smaller in diameter and improving the mounting and layout of the speed change gear (disposed sidewise in the engine room). Moreover, this can substantially equalize the operation oil ducts (of the first brake B1 and the second brake B2) in length, thus achieving substantially a uniform transmission response of the first brake B1 and the second brake B2.

The first brake B1 for holding stationary the third planetary carrier PC3 of the double sun gear planetary gear set G3 is disposed nearer to the speed reduction planetary gear set G1 than the second brake B2 for holding stationary the fourth sun gear S4 of the double sun gear planetary gear set G3. Hereinabove, the fourth sun gear S4 is disposed on the farther side from the single pinion planetary gear set G2. The third planetary carrier PC3 (of the double sun gear planetary gear set G3) to be held stationary by the first brake B1, the outer member OM (connector member) for connecting the third planetary carrier PC3 to the first brake B1, the fourth sun gear S4 (of the double sun gear planetary gear set G3) disposed on the farther side from the single pinion planetary gear set G2 and to be held stationary by the second brake B2, and the rear end wall 26a (connector member) for connecting the fourth sun gear S4 to the second brake B2 are to extend on the double sun bear planetary gear set G3 in such a manner as to be disposed away from the input shaft 1. With the above constitution, handling and mounting the outer member OM and the rear end wall 26a may be eased in relation to the disposition of the third planetary carrier PC3 and the fourth sun gear S4, moreover, the outer member OM (connector member) and the rear end wall 26a (connector member) shortened can contribute to cost reduction and improvement of rigidity and space efficiency.

The operation oil duct 21 of the first clutch C1 and the second clutch C2 is formed in the middle wall 8 for bearing the output gear 2, while the operation oil duct 14 of the third clutch C3 is formed in the pump cover 6. With the above constitution, all the operation oil duct 21 and the operation oil duct 14 can concentrate at the front portion (right in FIG. 12) of the transmission case 3 for a preferable (smooth) flow of the operation oil from the control valve body (not shown), thus eliminating redundant transmission control circuit.

Second Embodiment

FIG. 13 shows a typical skeleton diagram of the speed change gear for the automatic transmission, according to a second embodiment of the present invention. Parts and sections substantially the same as those in FIG. 1 according to the first embodiment are denoted by the same numerals, and repeated descriptions are to be omitted.

The speed change gear (referred to as "speed reduction double pinion type") for the automatic transmission according to the second embodiment is so constituted that the first planetary gear set G1 (speed reduction double pinion), the second planetary gear set G2 (single pinion), and the third planetary gear set G3 (double sun gear) are sequentially and substantially coaxially arranged from the left end (an end close to the input portion INPUT [input shaft 1]), as is seen in FIG. 13.

The second planetary gear set G2 and the third planetary gear set G3 in FIG. 13 according to the second embodiment are substantially the same as those in FIG. 1 according to the first embodiment, thus constituting the Ishimaru planetary gear train (speed change planetary gear set).

Replacing its counterpart (speed reduction, single pinion) in FIG. 1, the first planetary gear set G1 (speed reduction double pinion) in FIG. 13 has the first sun gear S1, the first ring gear R1, a first primary pinion P1a meshing with the first sun gear S1, a first secondary pinion P1b meshing with the first ring gear R1, and the first planetary carrier PC1 for carrying the first primary pinion P1a and the first secondary pinion P1b in such a manner that the first primary pinion P1a and the first secondary pinion P1b can rotate, thus constituting the double pinion planetary gear set.

With the above constitution of the speed change gear for the automatic transmission according to the second embodiment, the input shaft 1 is connected to the first planetary carrier PC1 for inputting the engine speed, the first sun gear S1 is held continuously stationary to the transmission case 3, the first ring gear R1 is adapted to be connected to the second ring gear R2 via the first clutch C1, and the first ring gear R1 is adapted to be connected to the second sun gear S2 via the second clutch C2.

Other than those described above, the speed change gear for the automatic transmission according to the second embodiment in FIG. 13 is substantially the same as its counterpart according to the first embodiment in FIG. 1. Therefore, the parts and sections substantially the same as those in FIG. 1 according to the first embodiment are denoted by the same numerals, and repeated descriptions are to be omitted.

With the speed change gear according to the second embodiment having the above constitution, engaging and disengaging the first clutch C1, the second clutch C2, the third clutch C3, the first brake B1, and the second brake B2 referring to combinations shown in FIG. 2 (the circle stands for engagement while the blank stands for disengagement) can select corresponding gear shifts (six forward gears and one reverse gear).

Hereinafter described is the transmission operation of the above speed change gear according to the second embodiment, referring to FIG. 14 to FIG. 17.

FIG. 14 is a common line diagram showing a rotation state at each gear shift of the rotation member of the speed change gear, according to the second embodiment.

FIG. 15 to FIG. 17 show torque flow paths at each gear shift of the speed change gear.

In FIG. 14, a boldest line is a common line diagram of the first planetary gear set G1, while a second boldest line is a common line diagram of the speed change planetary gear set including the second planetary gear set G2 and the third planetary gear set G3 (the Ishimaru planetary gear train).

In FIG. 15 to FIG. 17, the torque flow paths of the clutch, the brake and the member are shown with a bold line, and the gear used for the torque flow is hatched.

First Gear

As is seen in FIG. 2, engaging the first clutch C1 and the first brake B1 may achieve the forward first gear.

At the first gear, in view of the second planetary gear set G2, engaging the first clutch C1 may input a reduced rotation from the first planetary gear set G1 to the second ring gear R2.

On the other hand, in view of the third planetary gear set G3, engaging the first brake B1 may hold stationary the third planetary carrier PC3 to the transmission case 3, thus rotation of the third sun gear S3 is reversed and reduced relative to an output rotation from the third ring gear R3. The rotation of the third sun gear S3 is transmitted to the second sun gear S2 of the second planetary gear set G2 via the first connector member M1.

In view of the second planetary gear set G2, a forward reduced rotation is inputted from the second ring gear R2 while the reverse reduced rotation is inputted from the second sun gear S2, thus further reducing the rotation from the second ring gear R2. The thus further reduced rotation is to be outputted from the second planetary carrier PC2 to the output gear 2 via the second connector member M2.

Summarizing the above, at the first gear, the common line diagram in FIG. 14 defines a line connecting an engagement point of the first clutch C1 (rendering the reduced rotation from the first planetary gear set G1 as the input rotation to the second ring gear R2) and an engagement point of the first brake B1 (braking the rotation of the third planetary carrier PC3), thus reducing the rotation inputted from the input shaft 1 and thereafter outputting the thus reduced rotation from the output gear 2.

FIG. 15(a) shows the torque flow paths at the first gear, with the first clutch C1, the first brake B1 and each of the members indicated by the bold line and with the first planetary gear set G1, the second planetary gear set G2 and the third planetary gear set G3 (excluding the fourth sun gear S4) hatched. Hereinabove, the bold line and the hatching teach that the torque is operated.

In other words, at the first gear, the first planetary gear set G1 and the Ishimaru planetary gear train (including the second planetary gear set G2 and the third planetary gear set G3) may contribute to the torque flow.

Second Gear

As is seen in FIG. 2, disengaging the first brake B1 (which is engaged at the first gear) while engaging the second brake B2, namely, engaging the first clutch C1 and the second brake B2 may achieve the forward second gear.

At the second gear, in view of the second planetary gear set G2, engaging the first clutch C1 may input the reduced rotation from the first planetary gear set G1 to the second ring gear R2.

On the other hand, in view of the third planetary gear set G3, engaging the second brake B2 may hold stationary the fourth sun gear S4 to the transmission case 3, thus holding stationary the third sun gear S3 which is connected to the fourth sun gear S4 by the third pinion P3. Then, the second sun gear S2 connected to the third sun gear S3 via the first connector member M1 may be held stationary to the transmission case 3.

In view of the second planetary gear set G2, the forward reduced rotation is inputted from the second ring gear R2 while the second sun gear S2 is held stationary, thus further reducing the reduced rotation from the second ring gear R2. The thus further reduced rotation is to be outputted from the second planetary carrier PC2 to the output gear 2 via the second connector member M2.

Summarizing the above, at the second gear, the common line diagram in FIG. 14 defines a line connecting the engagement point of the first clutch C1 (rendering the reduced rotation from the first planetary gear set G1 as the input rotation to the second ring gear R2) and an engagement point of the second brake B2 (braking the rotation of the fourth sun gear S4), thus reducing the rotation inputted from the input shaft 1 (the second gear is, however, higher than the first gear) and thereafter outputting the thus reduced rotation from the output gear 2.

FIG. 15(b) shows the torque flow paths at the second gear, with the first clutch C1, the second brake B2 and each of the members indicated by the bold line and with the first planetary gear set G1 and the second planetary gear set G2 hatched. Hereinabove, the bold line and the hatching teach that the torque is operated.

In view of the third planetary gear set G3, the third pinion P3 free of constraint may revolve around the stationary sun gear S3 and the stationary sun gear S4 in accordance with the output rotation of the third ring gear R3. In sum, although acting as a rotation member, the third planetary gear set G3 may make substantially no contribution to the torque flow.

Third Gear

As is seen in FIG. 2, disengaging the second brake B2 (which is engaged at the second gear) while engaging the second clutch C2, namely, engaging the first clutch C1 and the second clutch C2 may achieve the forward third gear.

At the third gear, in view of the second planetary gear set G2, engaging the first clutch C1 may input the reduced rotation from the first planetary gear set G1 to the second ring gear R2. Substantially simultaneously with this, engaging the second clutch C2 may input the reduced rotation from the first planetary gear set G1 to the second sun gear S2 of the second planetary gear set G2.

In view of the second planetary gear set G2, substantially the same reduced rotation is inputted to the second ring gear R2 and the second sun gear S2, thus outputting the reduced rotation (substantially the same as the reduced rotation from the first planetary gear set G1) to the output gear 2 via the second planetary carrier PC2 (rotating integrally with the second ring gear R2 and the second sun gear S2) and the second connector member M2.

Summarizing the above, at the third gear, the common line diagram in FIG. 14 defines a line connecting the engagement point of the first clutch C1 (rendering the reduced rotation from the first planetary gear set G1 as the input rotation to the second ring gear R2) and an engagement point of the second clutch C2 (rendering the reduced rotation from the first planetary gear set G1 as the input rotation to the second sun gear S2), thus reducing the rotation inputted from the input shaft 1 (with a reduction ratio equal to that of the first planetary gear set G1) and thereafter outputting the thus reduced rotation from the output gear 2.

FIG. 15(c) shows the torque flow paths at the third gear, with the first clutch C1, the second clutch C2 and each of the members indicated by the bold line and with the first planetary gear set G1 and the second planetary gear set G2 hatched. Hereinabove, the bold line and the hatching teach that the torque is operated.

Hereinabove, the third planetary gear set G3 may make substantially no contribution to the torque flow.

Fourth Gear

As is seen in FIG. 2, disengaging the second clutch C2 (which is engaged at the third gear) while engaging the third clutch C3, namely, engaging the first clutch C1 and the third clutch C3 may achieve the forward fourth gear.

At the fourth gear, in view of the second planetary gear set G2, engaging the first clutch C1 may input the reduced rotation from the first planetary gear set G1 to the second ring gear R2.

On the other hand, in view of the third planetary gear set G3, engaging the third clutch C3 may input the input rotation from the input shaft 1 to the third planetary carrier PC3 via the center member CM. Thereby, the rotation of the third sun gear S3 is more increased than the output rotation of the third ring gear R3. The thus increased rotation of the third sun gear S3 may be transmitted to the second sun gear S2 via the first connector member M1.

In view of the second planetary gear set G2, the reduced rotation is inputted from the second ring gear R2 while the increased rotation is inputted from the second sun gear S2, thus increasing the reduced rotation from the second ring gear R2 (although lower than the input rotation). The thus increased rotation is to be outputted from the second planetary carrier PC2 to the output gear 2 via the second connector member M2.

Summarizing the above, at the fourth gear, the common line diagram in FIG. 14 defines a line connecting the engagement point of the first clutch C1 (rendering the reduced rotation from the first planetary gear set G1 as the input rotation to the second ring gear R2) and an engagement point of the third clutch C3 (rendering the rotation of the third planetary carrier PC3 as the input rotation), thus slightly reducing the rotation inputted from the input shaft 1 and thereafter outputting the thus slightly reduced rotation from the output gear 2.

FIG. 16(a) shows the torque flow paths at the fourth gear, with the first clutch C1, the third clutch C3 and each of the members indicated by the bold line and with the first planetary gear set G1, the second planetary gear set G2 and the third planetary gear set G3 (excluding the fourth sun gear S4) hatched. Hereinabove, the bold line and the hatching teach that the torque is operated.

Fifth Gear

As is seen in FIG. 2, disengaging the first clutch C1 (which is engaged at the fourth gear) while engaging the second clutch C2, namely, engaging the second clutch C2 and the third clutch C3 may achieve the forward fifth gear.

At the fifth gear, engaging the second clutch C2 may input the reduced rotation from the first planetary gear set G1 to the third sun gear S3 via the second sun gear S2 and the first connector member M1. Substantially simultaneously with this, engaging the third clutch C3 may input the input rotation from the input shaft 1 to the third planetary carrier PC3 via the center member CM.

In view of the third planetary gear set G3, the input rotation is inputted to the third planetary carrier PC3 while the reduced rotation from the first planetary gear set G1 is inputted to the third sun gear S3, thus increasing the input rotation. The thus increased rotation (higher than the input rotation) is to be outputted from the third ring gear R3 to the output gear 2 via the second connector member M2.

Summarizing the above, at the fifth gear, the common line diagram in FIG. 14 defines a line connecting the engagement point of the second clutch C2 (rendering the reduced rotation from the first planetary gear set G1 as the input rotation to the third sun gear S3) and an engagement point of the third clutch C3 (rendering the rotation of the third planetary carrier PC3 as the input rotation), thus slightly increasing the rotation inputted from the input shaft 1 and thereafter outputting the thus slightly increased rotation from the output gear 2.

FIG. 16(b) shows the torque flow paths at the fifth gear, with the second clutch C2, the third clutch C3 and each of the members indicated by the bold line and with the first planetary gear set G1 and the third planetary gear set G3 (excluding the fourth sun gear S4) hatched. Hereinabove, the bold line and the hatching teach that the torque is operated.

Sixth Gear

As is seen in FIG. 2, disengaging the second clutch C2 (which is engaged at the fifth gear) while engaging the second brake B2, namely, engaging the third clutch C3 and the second brake B2 may achieve the forward sixth gear.

At the sixth gear, engaging the third clutch C3 may input the input rotation from the input shaft 1 to the third planetary carrier PC3 via the center member CM of the third planetary gear set G3. Moreover, engaging the second brake B2 may hold stationary the fourth sun gear S4 of the third planetary gear set G3 to the transmission case 3.

In view of the third planetary gear set G3, the input rotation is inputted to the third planetary carrier PC3 while the fourth sun gear S4 is held stationary to the transmission case 3, thus increasing the input rotation. The thus increased rotation is to be outputted from the third ring gear R3 to the output gear 2 via the second connector member M2.

Summarizing the above, at the sixth gear, the common line diagram in FIG. 14 defines a line connecting the engagement point of the third clutch C3 (rendering the rotation of the third planetary carrier PC3 as the input rotation) and the engagement point of the second brake B2 (holding stationary the fourth sun gear S4 to the transmission case 3), thus increasing the rotation inputted from the input shaft 1 and thereafter outputting the thus increased rotation from the output gear 2.

FIG. 16(c) shows the torque flow paths at the sixth gear, with the third clutch C3, the second brake B2 and each of the members indicated by the bold line and with the third planetary gear set G3 (excluding the third sun gear S3) hatched. Hereinabove, the bold line and the hatching teach that the torque is operated.

Reverse Gear

As is seen in FIG. 2, engaging the second clutch C2 and the first brake B1 may achieve the reverse gear.

At the reverse gear, engaging the second clutch C2 may input the reduced rotation from the first planetary gear set G1 to third sun gear S3 via the second sun gear S2 and the first connector member M1. On the other hand, engaging the first brake B1 may hold stationary the planetary carrier PC3 to the transmission case 3.

In view of the third planetary gear set G3, the forward reduced rotation is inputted to the third sun gear S3 while the third planetary carrier PC3 may be held stationary to the transmission case 3, thus outputting the reverse reduced rotation from the third ring gear R3 to the output gear 2 via the second connector member M2.

Summarizing the above, at the reverse gear, the common line diagram in FIG. 14 defines a line connecting the engagement point of the second clutch C2 (rendering the reduced rotation from the first planetary gear set G1 as the input rotation to the third sun gear S3) and the engagement point of the first brake B1 (braking the rotation of the third planetary carrier PC3), thus reversely reducing the rotation inputted from the input shaft 1 and thereafter outputting the thus reversely reduced rotation from the output gear 2.

FIG. 17 shows the torque flow paths at the reverse gear, with the second clutch C2, the first brake B1 and each of the members indicated by the bold line and with the first planetary gear set G1 and the third planetary gear set G3 (excluding the fourth sun gear S4) hatched. Hereinabove, the bold line and the hatching teach that the torque is operated.

In addition to the effect (A) to the effect (G) brought about by the speed change gear according to the first embodiment in FIG. 1 to FIG. 6, the speed change gear according to the second embodiment may bring about the following effect (H) and effect (I):

(H) The first planetary gear set G1 which is the speed reduction planetary gear set is the double pinion planetary gear set, thus improving the layout freedom (or flexibility).

More Specifically Described as Below

The output portion OUTPUT is the output gear 2 which is disposed between the double sun gear planetary gear set G3 and the single pinion planetary gear set G2. Otherwise, the output portion OUTPUT can be an output shaft which is so disposed substantially coaxially with the input shaft 1 as to be positioned opposite to the input shaft 1. In sum, the layout is applicable not only to an automatic transmission for a front engine front drive (FF) vehicle but also to an automatic transmission for a front engine rear drive (FR) vehicle.

(I) The speed reduction planetary gear set G1 is a double pinion planetary gear G1 including a first sun gear S1 which is continuously held stationary, a first ring gear R1, a first primary pinion P1a meshing with the first sun gear S1, a first secondary pinion P1b meshing with the first ring gear R1, and a first planetary carrier PC1 for carrying the first primary pinion P1a and the first secondary pinion P1b in such a manner that the first primary pinion P1a and the first secondary pinion P1b rotate.

The single pinion planetary gear set G2 includes a second sun gear S2, a second pinion P2 meshing with the second sun gear S2, a second ring gear R2 meshing with the second pinion P2, and a second planetary carrier PC2 for carrying the second pinion P2 in such a manner that the second pinion P2 rotates.

The double sun gear planetary gear set G3 includes a third sun gear S3 and a fourth sun gear S4 which two sun gears S3, S4 constituting a double sun gear, a third pinion P3 meshing with the third sun gear S3 and the fourth sun gear S4 in common, a third ring gear R3 meshing with the third pinion P3, and a third planetary carrier PC3 for carrying the third pinion P3 in such a manner that the third pinion P3 rotates, and the center member CM extending from between the third sun gear S3 and the fourth sun gear S4.

Disposed sequentially from the input portion INPUT (input shaft 1)s' side are the speed reduction planetary gear set G1, the single pinion planetary gear set G2, and the double sun gear planetary gear set G3.

The input portion INPUT (input shaft 1) is connected to the first planetary carrier PC1 and is adapted to be made connectable to the center member CM by the third clutch C3.

The second sun gear S2 and the third sun gear S3 are connected mutually by a first connector member M1, and are adapted to be made connectable to the first ring gear R1 by the second clutch C2.

The second planetary carrier PC2 and the third ring gear R3 are mutually connected by a second connector member M2, and are connected to the output portion OUTPUT (output gear 2).

The first ring gear R1 and the second ring gear R2 are adapted to be connected by the first clutch C1.

The third planetary carrier PC3 is adapted to be held stationary by the first brake B1, while the fourth sun gear S4 is adapted to be held stationary by the second brake B2.

With the above constitution, the speed change gear for the automatic transmission according to the second embodiment may bring about the ring gear input to the Ishimaru planetary gear train (including the second planetary gear set G2 and the third planetary gear set G3) at the first gear and the second gear, thus making the automatic transmission further smaller.

In addition, the speed change gear for the automatic transmission according to the second embodiment may eliminate the torque circulation at the second gear, thus improving the transmission efficiency at the second gear leading to decrease in the fuel consumption.

FIG. 18 is a view of a developed cross section showing an actual constitution of the speed change gear in FIG. 13 to FIG. 17, according to the second embodiment of the present invention. Hereinafter described is the actual constitution of the speed change gear referring to FIG. 18 showing the input portion 1 and the output portion 2 reversed relative to those shown by the skeleton diagrams in FIG. 13, FIG. 15, FIG. 16 and FIG. 17.

The input shaft 1 and the middle shaft 4 are disposed sidewise in FIG. 18 substantially coaxially in the transmission case 3, in such a manner as to mate and rotate relative to each other. In sum, the input shaft 1 and the middle shaft 4 are individually born in the transmission case 3 in such a manner as to rotate relative to the transmission case 3.

The transmission case 3 has the front end opening (right in FIG. 18) closer to the input shaft 1, which opening is blocked with the pump case having the pump housing 5 and the pump cover 6. The input shaft 1 is inserted to the pump case to be born by the pump case. An engine ENG is drivingly connected to the protrusion end of the input shaft 1 via a torque converter T/C.

The middle shaft 4 has the rear end (farther side from the input shaft 1 in FIG. 18) which is rotatably born with the end cover 7 at the rear end (left in FIG. 18) of the transmission case 3.

There is provided the middle wall 8 substantially in the middle in the axial direction of the transmission case 3. The output gear 2 is rotatably born by the middle wall 8. The middle shaft 4 has a front end (right in FIG. 18) which is rotatably born by the wall defining the center opening of the middle wall 8 via the hollow shaft 9.

Between the pump case (including the pump housing 5 and the pump cover 6) and the middle wall 8, there is defined the front space (right in FIG. 18). The first planetary gear set G1 is disposed in the front space (right in FIG. 18). The third clutch C3 is also disposed in the front space (right in FIG. 18) in such a manner as to wrap the first planetary gear set G1.

In view of the first planetary gear set G1, the first sun gear S1 held stationary to the pump cover 6 is continuously incapable of rotating. Moreover, in view of the first planetary gear set G1, the first planetary carrier PC1 connects to the flange 10 extending radially outward from the input shaft 1, and a clutch hub 32 is disposed around the first planetary carrier PC1.

There is provided the clutch drum 11 extending radially outward from the front end (right in FIG. 18, namely, closer to the input shaft 1) of the middle shaft 4 in such a manner as to wrap the first ring gear R1 and the clutch hub 32, moreover, there is provided the clutch pack 12 having clutch plates which are splined respectively with the inner periphery of the clutch drum 11 and the outer periphery of the clutch hub 32 in such a manner as to be disposed alternatingly, thus constituting the third clutch C3.

Hereinabove, the third clutch C3 has the clutch piston 13 which mates with the end wall (facing the first planetary gear set G1) of the clutch drum 11. Receiving the operation oil pressure applied from the operation oil duct 14 (formed in the pump cover 6, the input shaft 1 and the middle shaft 4) to the clutch piston 13, the clutch piston 13 may make a stroke, thus engaging the third clutch C3.

There is provided the connector member 9a extending radially outward from the front end (right in FIG. 18) of the hollow shaft 9. The connector member 9a is shaped substantially into a drum in such a manner as to wrap the third clutch C3. Moreover, the connector member 9a has the front end (right in FIG. 18) connecting to the first ring gear R1.

Between the middle wall 8 and the end cover 7, there is defined the rear space (left in FIG. 18). The second planetary gear set G2, the third planetary gear set G3, the first clutch C1, the second clutch C2, the first brake B1, and the second brake B2 are disposed in the rear space (left in FIG. 18) in the following manner:

The second planetary gear set G2 and the third planetary gear set G3 are disposed on the middle shaft 4. In this case, however, the second planetary gear set G2 is disposed nearer to the input shaft 1 than the third planetary gear set G3.

The first connector member M1 integrates the second sun gear S2 of the second planetary gear set G2 with the third sun gear S3 of the third planetary gear set G3. The second sun gear S2 and the third sun gear S3 thus integrated are rotatably born on the middle shaft 4.

From substantially the center of the hollow shaft 9, there is provided the clutch drum 15 extending radially outward and then extending axially rearward (leftward in FIG. 18) to the outer periphery of the second ring gear R2, moreover, there is provided the clutch pack 16 having clutch plates which are splined respectively with the inner periphery of the clutch drum 15 and the outer periphery of the second ring gear R2 in such a manner as to be disposed alternatingly, thus constituting the first clutch C1.

As described above, the second clutch C2 is disposed nearer to the input shaft 1 than the first clutch C1 which is disposed on the outer periphery of the second planetary gear G2. With the above constitution, there is provided the clutch hub 17 fixed to the outer end of the second sun gear S2 (namely, on the input shaft 1's side of the second sun gear S2) and extending radially outward, moreover, there is provided the clutch pack 18 having clutch plates which are splined respectively with the outer periphery of the clutch hub 17 and the inner periphery of the clutch drum 15 in such a manner as to be disposed alternatingly, thus constituting the second clutch C2.

Hereinabove, as the double piston with the clutch piston 20 sliding inside the clutch piston 19, the clutch piston 19 of the first clutch C1 and the clutch piston 20 of the second clutch C2 are in combination disposed on the second clutch C2's side away from the first clutch C1. With the above constitution, the clutch piston 20 may mate with the end wall (right in FIG. 18, and facing the second planetary gear set G2) of the clutch drum 15.

Receiving the operation oil pressure applied from the operation oil ducts 21 formed individually in the middle wall 8 and the hollow shaft 9 (shown in FIG. 18 is one operation oil duct 21 only), the clutch piston 19 and the clutch piston 20 may make a stroke, thus engaging the first clutch C1 and the second clutch 20 individually.

As described above, the third planetary gear set G3 is the double sun gear planetary gear set. The third ring gear R3 is smaller in tooth width than the third pinion P3. With this, the third ring gear R3 may mesh with the third pinion P3 at the end portion near to the second planetary gear set G2, thus shortening the second connector member M2 for connecting the third ring gear R3 to the second planetary carrier PC2 of the second planetary gear set G2.

Around the outer periphery of the third ring gear R3, there is provided the tubular connector member 22 disposed in such a manner as to wrap the clutch drum 15 of the first clutch C1 and the second clutch C2. The tubular connector member 22 has the first end (left in FIG. 18) connecting to the outer periphery of the third ring gear R3 and the second end (right in FIG. 18) connecting to the output gear 2.

Like the third planetary carrier PC3 of the third planetary gear set G3 according to the first embodiment, the third planetary carrier PC3 of the third planetary gear set G3 according to the second embodiment is fitted with the center member CM which connects to the side member SM bearing the third pinion P3 and which extends radially inward via between the third sun gear S3 and the fourth sun gear S4. Moreover, substantially in the axial center of the third pinion P3, the third planetary carrier PC3 of the third planetary gear set G3 is fitted with the outer member OM extending radially outward substantially along the end face (left in FIG. 18) of the third ring gear R3.

The center member CM is drivably connected to the middle shaft 4, thus connecting the third planetary carrier PC3 to the clutch drum 11 of the third clutch C3 via the center member CM and the middle shaft 4.

The outer member OM has the outer periphery connecting to the brake hub 23. Being disposed around the outer periphery of the tubular connector member 22, the brake hub 23 extends frontward (rightward in FIG. 18) toward the middle wall 8.

There is provided the brake pack 24 having brake plates which are splined respectively with the outer periphery at the front end (right in FIG. 18) of the brake hub 23 and the inner periphery of the transmission case 3 in such a manner as to be disposed alternatingly, thus constituting the first brake B1. The first brake B1 is adapted to be engaged by the brake piston 25 which mates in the middle wall 8 in a forward position (right in FIG. 18) of the brake pack 24.

There is provided the brake hub 26 disposed in such a manner as to cover the rear end (left in FIG. 18) of the brake hub 23. The brake hub 26 has the rear end wall 26a extending circumferentially inward substantially along the back portion of the third planetary gear set G3, moreover, the inner periphery of the rear end wall 26a of the brake hub 26 connects to the fourth sun gear S4 of the third planetary gear set G3, thus constituting the first rotation member.

There is provided the brake pack 27 having brake plates which are splined respectively with the outer periphery of the brake hub 26 and the inner periphery of the transmission case 3, thus constituting the second brake B2. The second brake B2 is adapted to be engaged by the brake piston 28 which mates in the transmission case 3 in the rearward position (left in FIG. 18) of the brake pack 27.

The above summarizes that the first brake B1 is disposed outside the first clutch C1 and the second clutch C2 while the second brake B2 is disposed outside the third planetary gear set G3. Moreover, the first brake B1 is disposed nearer to the input shaft 1 (or the first planetary gear set G1) than the second brake B2.

Although being omitted from the skeleton diagrams in FIG. 13, FIG. 15, FIG. 16 and FIG. 17, the one way clutch OWC is disposed between substantially an axial middle (of the brake hub 23 constituting the first brake B1) and the transmission case 3. In the disengagement state of the first brake B1, the one way clutch OWC may prevent the one way rotation of the third planetary carrier PC3, thus achieving the first gear.

At the above first gear achieved by the one way clutch OWC, however, the OWC may allow the reverse rotation of the third planetary carrier PC3, thus rendering the engine brake unobtainable. Therefore, in case the engine brake is requested, the first brake B1 is engaged so as to prevent the reverse rotation of the third planetary carrier PC3.

Moreover, according to the second embedment, there is provided a counter shaft (not shown in FIG. 18).

Hereinabove, the counter shaft (not shown in FIG. 18) according to the second embedment is like the counter shaft 29 which is integrated with the counter gear 30 and the final drive pinion 31 according to the first embodiment in FIG. 12. Via the counter shaft (not shown in FIG. 18), the output rotation of the speed change gear is sent to the differential gear device (not shown in FIG. 18) between the vehicle's drive wheels.

Other than the above first rotation member, there are provided the following rotation members, according to the second embodiment:

* The second rotation member including the second sun gear S2, the third sun gear S3, the first connector member M1 and the clutch hub 17.
* The third rotation member including the second connector member M2, the second planetary carrier PC2 and the third ring gear R3 (which two are connected with each other via the second connector member M2), and the tubular connector member 22.
* The fourth rotation member including the third planetary carrier PC3, the center member CM, the middle shaft 4, the clutch drum 11, the outer member OM, and the brake hub 23.
* The fifth rotation member including the second ring gear R2.

With the above constitution shown in FIG. 18, the speed change gear according to the second embodiment of the present invention is, like the speed change gear according to the first embodiment in FIG. 12, the combination of three planetary gear sets (namely, the first planetary gear set G1, the second planetary gear set G2, and the third planetary gear set G3), the first rotation member, the second rotation member, the third rotation member, the fourth rotation member and the fifth rotation member, thus bringing about the above effect (A) to effect (G). In addition to the effect (A) to the effect (G), the speed change gear according to the second embodiment may bring about the following effects:

Effect

Of the double sun gear planetary gear set G3 and the single pinion planetary gear set G2, it is the single pinion planetary gear set G2 that relates to both the second rotation member and the fifth rotation member. In other words, it is the single pinion planetary gear set G2 to which the reduced rotation is inputted from the speed reduction planetary gear set G1 via the first clutch C1 and the second clutch C2, and the single pinion planetary gear set G2 is disposed on the nearer side to the speed reduction planetary gear set G1 than the double sun gear planetary gear set G3. With the above constitution, the power conductive path can be shortened that includes the first clutch C1 and the second clutch C for transmitting the great torque rotation (reduced with the speed reduction planetary gear set G1) to the single pinion planetary gear set G2. The thus shortened power conductive path may contribute to smaller size of the component parts for the power transmission and may facilitate handling and mounting of the component parts, thus making the automatic transmission smaller.

The above effect can be more remarkable when the first clutch C1 and the second clutch C2 are disposed in the vicinity of the single pinion planetary gear set G2, especially, on the outer periphery of the single pinion planetary gear set G2, as is seen in FIG. 18. In addition, the clutch piston 19 of the first clutch C1 and the clutch piston 20 of the second clutch C2 can be made into the double piston constitution as is seen in FIG. 18, thus saving the space therefor and thus making the speed change gear still smaller.

Moreover, the speed reduction planetary gear set G1, the single pinion planetary gear set G2, and the double sun gear planetary gear set G3 which are disposed sequentially from the input shaft 1's side may bring about the following effect: Effect The double sun gear planetary gear set G3 disposed at the rear end (remotest from the input shaft 1) has the outer periphery with great layout freedom (or flexibility) in the axial direction of the third ring gear R3, thus allowing the third ring gear R3 to be disposed on the input shaft 1's side for meshing with the third pinion P3, as is seen in FIG. 18. Moreover, the outer member OM connecting the third planetary carrier PC3 (of the double sun gear planetary gear set G3) to the first brake B1 (brake hub 23) extends, substantially in the axial center of the third pinion P3, radially outward from the third planetary carrier PC3 in such a manner as to run substantially along the end face of the third ring gear R3 which is moved toward (forward, namely, rightward in FIG. 18) the single pinion planetary gear set G2 for meshing with the third pinion P3. With the above constitution, the third ring gear R3 and the outer member OM allow the end cover 7 for the transmission case 3 in the vicinity of the rear end outer periphery of the double sun gear planetary gear set G3 to be dented radially inward, as is seen in FIG. 18.

The speed change gear in FIG. 18 may occasionally be mounted sidewise in the engine room of the vehicle. In this case, the end outer periphery (the end cover 7) on the remote side from the input shaft 1 can be small in diameter, thus causing substantially no interference with the body members protruding (bulging) in the engine room. In other words, in addition to the advantages described in connection with FIG. 1, FIG. 4, FIG. 5 and FIG. 6, the speed change gear in FIG. 18 is advantageous in terms of mounting and layout.

Moreover, the third ring gear R3 and the outer member OM disposed in the above manner can bring about the ample space in the vicinity of the rear end outer periphery of the third planetary gear set G3, thus allowing the rear end wall 26a (connecting the fourth sun gear S4 to the second brake B2 which holds stationary the fourth sun gear S4) of the brake hub 26 to be bendable into the space. The thus bent rear end wall 26a can allow the end cover 7 for the transmission case 3 in the vicinity of the rear end outer periphery of the double sun gear planetary gear set G3 to be assuredly dented radially inward, as is seen in FIG. 18.

The above effect is more remarkable with the outer member OM bent in such a manner as to cover the outer periphery of the third ring gear R3 and to run substantially along the second connector member M2, as is seen in FIG. 18. With this, even disposing the second brake B2 on the outer periphery of the double sun gear planetary gear set G3 still allows the end cover 7 for the transmission case 3 in the vicinity of the rear end outer periphery of the double sun gear planetary gear set G3 to be dented radially inward, as is seen in FIG. 18.

Moreover, with the above disposition of the first clutch C1, the second clutch C2 and the third clutch C3 in FIG. 18, the first clutch C1 and the second clutch C2 can approach the input shaft 1, thus further (or more extensively) denting radially inward the end cover 7 for the transmission case 3 in the vicinity of the rear end outer periphery of the double sun gear planetary gear set G3. Thereby, the speed change gear disposed sidewise in the engine room can have more remarkable effect in terms of mounting and layout.

Moreover, having the above disposition in FIG. 18, the first clutch C1 and the second clutch C2 can approach the speed reduction planetary gear set G1, thus shortening the members (the middle shaft 9 and the clutch drum 15) connecting the first clutch C1 and the second clutch C2 with the speed reduction planetary gear set G1. In other words, the members (the middle shaft 9 and the clutch drum 15) can be made shorter, smaller, lighter and simpler.

Moreover, disposing the first clutch C1 and the second clutch C2 sidewise allows the double piston constitution, namely, the clutch piston 19 and the clutch piston 20, respectively. In addition to the double piston constitution, disposing the first clutch C1 and the second clutch C2 sidewise allows the return spring and the centrifugal pressure cancellation chamber to be used in common for the clutch piston 19 and the clutch piston 20, thus reducing the number of component parts and reducing size and cost of the speed change gear.

In addition to disposing the first clutch C1 and the second clutch C2 as described above, the respective clutch piston 19 and clutch piston 20 on the single pinion planetary gear set G2 are disposed on the farther side from the double sun gear planetary gear set G3. With the above constitution, the clutch piston 19 of the first clutch C1 and the clutch piston 20 of the second clutch C2 are free from being disposed on the outer periphery of the double sun gear planetary gear set G3. With this, the end cover 7 for the transmission case 3 in the vicinity of the rear end outer periphery of the double sun gear planetary gear set G3 may be dented radially inward, thus further improving the mounting and layout with the speed change gear disposed sidewise in the engine room.

Moreover, being disposed on the outer periphery of the speed reduction planetary gear set G1, the third clutch C3 for inputting the rotation of the input shaft 1 directly to the third planetary carrier PC3 of the double sun gear planetary gear set G3 is closer to the input shaft 1 than the first clutch C1 and the second clutch C2. With the above constitution, the end cover 7 for the transmission case 3 in the vicinity of the rear end outer periphery of the double sun gear planetary gear set G3 can be dented radially inward, thus securely improving the mounting and layout with the speed change gear disposed sidewise in the engine room. In addition, with the above constitution, the operation oil duct 14 and the operation oil duct 21 of the first clutch C1, the second clutch C2 and the third clutch C3 can be handled more easily and difference in length between the operation oil duct 14 and the operation oil duct 21 can be reduced, thus improving controllability of the first clutch C1, the second clutch C2 and the third clutch C3 and thus achieving substantially a uniform transmission response of the first clutch C1, the second clutch C2 and the third clutch C3.

Moreover, the clutch piston 13 (of the third clutch C3) disposed on the speed reduction planetary gear set G1 is on the closer side to the single pinion planetary gear set G2. With the above constitution, the clutch piston 13 of the third clutch C3 can be disposed in the vicinity of the clutch piston 19 of the first clutch C1 and the clutch piston 20 of the second piston C2 in such a manner as to turn the clutch piston 13's back to backs of the clutch piston 19 and the clutch piston 20). With the above constitution, the operation oil duct 14 and the operation oil duct 21 of the first clutch C1, the second clutch C2 and the third clutch C3 can be handled more easily and the difference in length between the operation oil duct 14 and the operation oil duct 21 can be reduced, thus improving the controllability of the first clutch C1, the second clutch C2, and the third clutch C3 and thus achieving substantially the uniform transmission response of the first clutch C1, the second clutch C2 and the third clutch C3 with greater assuredness.

Between the speed reduction planetary gear set G1 and the single pinion planetary gear set G2, the operation oil duct 21 of the first clutch C1 and the second clutch C2 is formed in the middle wall 8 which is the output gear bearing wall disposed in the transmission case 3. With the above constitution, the operation oil duct 21 can be shortened which is to extend between the first clutch C1 and the control valve body (not shown) and between the second clutch C2 and the control valve (not shown). Hereinabove, the control body (not shown) for transmission control is to be disposed in the given position in the circumferential direction of the transmission case 3. Moreover, with the above constitution, the operation oil duct 21 can be substantially equal in length, thus achieving substantially the uniform transmission response of the first clutch C1 and the second clutch C2. Even in the condition that the relatively high hydraulic pressure is requested due to the great transmission torque, the operation oil duct 21 of the first clutch C1 and the second clutch C2 can be free from the reinforcing sleeve and the like since the operation oil duct 21 is formed in the middle wall 8 that is relatively thick for bearing the output gear 2. In sum, forming the operation oil duct 21 directly in the middle wall 8 can prevent increase in the number of component parts and prevent higher cost.

The first brake B1 for holding stationary the third planetary carrier PC3 is connected to the third planetary carrier PC3 via the outer member OM which is taken out from the rear side (left in FIG. 18) of the double sun gear planetary gear set G3 which rear side (left in FIG. 18) is farthest away from the speed reduction planetary gear set G1, while the second brake B2 for holding stationary the fourth sun gear S4 is connected to the fourth sun gear S4 via the rear end wall 26a which is taken out from the rear side (left in FIG. 18) of the double sun gear planetary gear set G3 which rear side (left in FIG. 18) is farthest away from the speed reduction planetary gear set G1. With the above constitution, the brake force conductive path can be simplified and shortened in relation to the disposition of the first clutch C1 and the second clutch C2, thus preferably increasing braking efficiency and making the speed change gear smaller.

The first brake B1 for holding stationary the third planetary carrier PC3 of the double sun gear planetary gear set G3 is disposed nearer to the speed reduction planetary gear set G1 than the second brake B2 for holding stationary the fourth sun gear S4 of the double sun gear planetary gear set G3. Hereinabove, the fourth sun gear S4 is disposed on the farther side from the single pinion planetary gear set G2. The third planetary carrier PC3 (of the double sun gear planetary gear set G3) to be held stationary by the first brake B1, the outer member OM (connector member) for connecting the third planetary carrier PC3 to the first brake B1, the fourth sun gear S4 (of the double sun gear planetary gear set G3) disposed on the farther side from the single pinion planetary gear set G2 and to be held stationary by the second brake B2, and the rear end wall 26a (connector member) for connecting the fourth sun gear S4 to the second brake B2 are to extend on the double sun bear planetary gear set G3 in such a manner as to be disposed away from the input shaft 1. With the above constitution, handling and mounting the outer member OM and the rear end wall 26a may be eased in relation to the disposition of the third planetary carrier PC3 and the fourth sun gear S4, moreover, the outer member OM (connector member) and the rear end wall 26a (connector member) shortened can contribute to cost reduction and improvement of rigidity and space efficiency.

The operation oil duct 21 of the first clutch C1 and the second clutch C2 is formed in the middle wall 8 for bearing the output gear 2, while the operation oil duct 14 of the third clutch C3 is formed in the pump cover 6. With the above constitution, all the operation oil duct 21 and the operation oil duct 14 can concentrate at the front portion (right in FIG. 18) of the transmission case 3 for the preferable (smooth) flow of the operation oil from the control valve body (not shown), thus eliminating redundant transmission control circuit.

Third Embodiment

FIG. 19 shows a typical skeleton diagram of the speed change gear for the automatic transmission, according to a third embodiment of the present invention. Parts and sections substantially the same as those in FIG. 1 according to the first embodiment are denoted by the same numerals, and repeated descriptions are to be omitted.

The speed change gear (referred to as "speed reduction double pinion type") for the automatic transmission according to the third embodiment is so constituted that the first planetary gear set G1 (speed reduction double pinion), the second planetary gear set G2 (double sun gear), and the third planetary gear set G3 (single pinion) are sequentially and substantially coaxially arranged from the left end (an end close to the input portion INPUT [input shaft 1]), as is seen in FIG. 19.

The first planetary gear set G1 (speed reduction planetary gear set) in FIG. 19 according to the third embodiment is substantially the same as that in FIG. 13 according to the second embodiment. The first planetary gear set G1 (speed reduction planetary gear set) in FIG. 19 has the first sun gear S1, the first ring gear R1, the first primary pinion P1a meshing with the first sun gear S1, the first secondary pinion P1b meshing with the first ring gear R1, and the first planetary carrier PC1 for carrying the first primary pinion P1a and the first secondary pinion P1b in such a manner that the first primary pinion P1a and the first secondary pinion P1b can rotate, thus constituting the double pinion planetary gear set.

On the other hand, the second planetary gear set G2 has the second sun gear S2, the fourth sun gear S4, the second pinion P2 meshing with the second sun gear S2 and the fourth sun gear S4 in common, the second planetary carrier PC2 for carrying the second pinion P2 in such a manner that the second pinion P2 can rotate, and the second ring gear R2 (one in number) meshing with the second pinion P2, thus constituting the double sun gear planetary gear set. Hereinabove, the second sun gear S2 is disposed on the farther side from the input portion INPUT, while the fourth sun gear S4 is disposed on the nearer side to the input portion INPUT.

The third planetary gear set G3 has the third sun gear S3, the third ring gear R3, the third pinion P3 meshing with the third sun gear S3 and the third ring gear R3, and the third planetary carrier PC3 for carrying the third pinion P3 in such a manner that the third pinion P3 can rotate, thus constituting the single pinion planetary gear set.

Like the third planetary carrier PC3 in FIG. 1 (first embodiment) and FIG. 13 (second embodiment), the second planetary carrier PC2 in FIG. 19 according to the third embodiment is provided with the center member CM extending radially inward from between the second sun gear S2 and the fourth sun gear S4.

Hereinabove, the center member CM is so disposed to as to pass through a space which is defined on a circle formed with pitches arranged on the second pinion P2 and which is defined between the adjacent second pinions P2. The center member CM is so disposed as to extend radially inward from between the second sun gear S2 and the fourth sun gear S4.

The input portion INPUT (input shaft 1) connecting to the first planetary carrier PC1 also connects to the engine (not shown) as the power source via the torque converter (not shown) allows the engine speed to be inputted to the first planetary carrier PC1 from the input shaft 1.

The output portion OUTPUT is constituted of an output shaft 51. Being disposed substantially coaxially with the input shaft 1, the output shaft 51 connects to the center member CM (the second planetary carrier PC2), thus transmitting the output rotation of the transmission from the output shaft 51 to the drive wheel of the vehicle via the final gear set (not shown) and the differential gear device (not shown).

The first ring gear R1 is adapted to be connected to the second ring gear R2 by the first clutch C1, and is adapted to be connected to the fourth sun gear S4 by the second clutch C2.

The second sun gear S2 is connected to the third sun gear S3 by the first connector member M1. The second sun gear S2 and the third sun gear S3 thus connected are adapted to be held stationary by the second brake B2, while the second connector member M2 connects the second planetary carrier PC2 to the third ring gear R3.

The first sun gear S1 (of the speed reduction planetary gear set G1) connecting to the transmission case 3 is held continuously stationary. The first planetary carrier PC1 is adapted to be connected to the third planetary carrier PC3 by the third clutch C3. The third planetary carrier PC3 is adapted to be held stationary by the first brake B1.

The above summarizes that second planetary gear set G2 (double sun gear planetary gear set) and the third planetary gear set G3 (single pinion planetary gear set) constitute the Ishimaru planetary gear train (speed change planetary gear set).

With the speed change gear having the above constitution according to the third embodiment, engaging and disengaging the first clutch C1, the second clutch C2, the third clutch C3, the first brake B1, and the second brake B2 referring to combinations shown in FIG. 2 (the circle stands for engagement while the blank stands for disengagement) can select corresponding gear shifts (six forward gears and one reverse gear). The control valve body (not shown) for transmission control achieving engagement logic for the applicable transmission is connected to the first clutch C1, the second clutch C2, the third clutch C3, the first brake B1, and the second brake B2.

The speed change gear for the automatic transmission according to the third embodiment may also has a common line diagram substantially similar to that in FIG. 14 according to the second embodiment. Therefore, showing the common line diagram according to the third embodiment is to be omitted.

Hereinafter described referring to FIG. 20, FIG. 21 and FIG. 22 is the transmission operation of the speed change gear for each gear shift, with the conductive path for each gear shift shown with the bold line and hatching.

First Gear

As is seen in FIG. 2, engaging the first clutch C1 and the first brake B1 may achieve the forward first gear.

FIG. 20(a) shows the torque flow paths at the first gear, with the first clutch C1, the first brake B1 and each of the members indicated by the bold line and with the first planetary gear set G1, the second planetary gear set G2 and the third planetary gear set G3 (excluding the fourth sun gear S4) hatched. Hereinabove, the bold line and the hatching teach that the torque is operated.

In other words, at the first gear, the first planetary gear set G1 and the Ishimaru planetary gear train (including the second planetary gear set G2 and the third planetary gear set G3) may contribute to the torque flow.

Second Gear

As is seen in FIG. 2, disengaging the first brake B1 (which is engaged at the first gear) while engaging the second brake B2, namely, engaging the first clutch C1 and the second brake B2 may achieve the forward second gear.

FIG. 20(b) shows the torque flow paths at the second gear, with the first clutch C1, the second brake B2 and each of the members indicated by the bold line and with the first planetary gear set G1 and the second planetary gear set G2 (excluding the fourth sun gear S4) hatched. Hereinabove, the bold line and the hatching teach that the torque is operated.

Third Gear

As is seen in FIG. 2, disengaging the second brake B2 (which is engaged at the second gear) while engaging the second clutch C2, namely, engaging the first clutch C1 and the second clutch C2 may achieve the forward third gear.

FIG. 21(a) shows the torque flow paths at the third gear, with the first clutch C1, the second clutch C2 and each of the members indicated by the bold line and with the first planetary gear set G1 and the second planetary gear set G2 (excluding the second sun gear S2) hatched. Hereinabove, the bold line and the hatching teach that the torque is operated. Hereinabove, the third planetary gear set G3 may make substantially no contribution to the torque flow.

Fourth Gear

As is seen in FIG. 2, disengaging the second clutch C2 (which is engaged at the third gear) while engaging the third clutch C3, namely, engaging the first clutch C1 and the third clutch C3 may achieve the forward fourth gear.

FIG. 21(b) shows the torque flow paths at the fourth gear, with the first clutch C1, the third clutch C3 and each of the members indicated by the bold line and with the first planetary gear set G1, the second planetary gear set G2 (excluding the fourth sun gear S4) and the third planetary gear set G3 hatched. Hereinabove, the bold line and the hatching teach that the torque is operated.

Fifth Gear

As is seen in FIG. 2, disengaging the first clutch C1 (which is engaged at the fourth gear) while engaging the second clutch C2, namely, engaging the second clutch C2 and the third clutch C3 may achieve the forward fifth gear.

FIG. 21(c) shows the torque flow paths at the fifth gear, with the second clutch C2, the third clutch C3 and each of the members indicated by the bold line and with the first planetary gear set G1 and the third planetary gear set G3 hatched. Hereinabove, the bold line and the hatching teach that the torque is operated. Hereinabove, the second planetary gear set G2 may make substantially no contribution to the torque flow.

Sixth Gear

As is seen in FIG. 2, disengaging the second clutch C2 (which is engaged at the fifth gear) while engaging the second brake B2, namely, engaging the third clutch C3 and the second brake B2 may achieve the forward sixth gear.

FIG. 22(a) shows the torque flow paths at the sixth gear, with the third clutch C3, the second brake B2 and each of the members indicated by the bold line and with the third planetary gear set G3 hatched. Hereinabove, the bold line and the hatching teach that the torque is operated.

Reverse Gear

As is seen in FIG. 2, engaging the second clutch C2 and the first brake B1 may achieve the reverse gear.

FIG. 22(b) shows the torque flow paths at the reverse gear, with the second clutch C2, the first brake B1 and each of the members indicated by the bold line and with the first planetary gear set G1, the second planetary gear set G2 and the third planetary gear set G3 hatched. Hereinabove, the bold line and the hatching teach that the torque is operated.

In addition to the effects brought about by the speed change gear according to the first embodiment and the speed change gear according to the second embodiment, the speed change gear according to the third embodiment may bring about the following effect:

The input rotation inputted to the first planetary carrier PC1 (large diameter) of the speed reduction planetary gear set G1 can make the tangent force small, thus making the speed reduction planetary gear set G1 small and further thus making the speed change gear of the automatic transmission small.

At the first gear causing the maximum torque, the torque from the speed reduction planetary gear set G1 flows via all members including the double sun gear planetary gear set G2 and the single pinion planetary gear set G3, which is advantageous in terms of strength.

The rotation member receiving the torque via the speed reduction planetary gear set G1 and the first clutch C1 at the first gear is not the sun gear of the double sun gear planetary gear set G2 or the single pinion planetary gear set G3. It is the second ring gear R1 (of the double sun gear planetary gear set G2) that acts as the above rotation member receiving (inputting) the torque at the first gear, thus substantially halving the tangent force, which is advantageous in terms of gear strength, gear life, and carrier rigidity.

Of the two planetary gear sets constituting the speed change planetary gear set with the torque inputted thereto from the speed reduction planetary gear set G1, it is the second planetary gear set G2 that is the double sun gear planetary gear set including the second sun gear S2 and the fourth sun gear S4. The second planetary gear set G2 is provided with the center member CM extending radially inward from between the second sun gear S2 and the fourth sun gear S4.

The center member CM extending radially inward from between the second sun gear S2 and the fourth sun gear S4 can connect the second planetary carrier PC2 of the double sun gear planetary gear set G2 to the output portion OUTPUT (output shaft 51) for outputting the rotation from the second planetary carrier PC2.

With the above constitution, taking out the transmission rotation from the second planetary carrier PC2 of the double sun gear planetary gear set G2 (which is disposed between the speed reduction planetary gear set G1 and the single pinion planetary gear set G3) to the output portion OUTPUT (output shaft 51) axially rearward (namely, for use of the front engine rear drive vehicle) is achievable in the following manner:

* The transmission rotation can be outputted from the second planetary carrier PC2 via the center member CM (extending from between the second sun gear S2 and the fourth sun gear S4 of the double sun gear planetary gear set G2) to the output portion OUTPUT (out put shaft 51) which is disposed in the axial rear portion in such a manner as to extend substantially coaxially with the input shaft 1.

In sum, for achieving the power to be taken out from the rear portion, the input shaft 1 and the output shaft 51 can be free from being disposed in parallel, in other words, without forming a large diameter of the speed change gear.

Instead of the Ravigneaux compound planetary gear train, it is the double sun gear planetary gear set G2 that can prevent the speed change gear from becoming large in dimension radially. With this, the disadvantages in terms of strength which may be caused by the Ravigneaux compound gear train can be avoided. More specifically, the maximum torque caused to the gear train at the first gear is ordinarily born by the double pinion planetary gear set on one side of the Ravigneaux compound planetary gear train, thus causing the disadvantage in terms of strength. The double sun gear planetary gear set G2 according to the third embodiment, however, can prevent the above disadvantage.

In the Ravigneaux compound planetary gear train, the torque increased by the speed reduction planetary gear set is inputted to the sun gear of the Ravigneaux compound planetary gear train. As compared with the ring gear input and the carrier input, the above sun gear input may cause greater tangent force, which is disadvantageous in terms of gear strength, gear life, carrier rigidity and the like. Contrary to this, the double sun gear planetary gear set G2 according to the third embodiment can, without causing the above disadvantage, achieve the coaxial disposition of the input portion INPUT and the output portion OUTPUT, in other words, avoiding the parallel shaft disposition of the input portion INPUT and the output portion OUTPUT.

Some gear shift(s) may cause the torque circulation in the Ravigneaux compound planetary gear train, thus lowering the transmission efficiency leading to increase in the fuel consumption. The speed change gear using the double sun gear planetary gear set according to the third embodiment, however, can prevent the torque circulation, thus preventing the increase in the fuel consumption.

The speed change gear using the double sun gear planetary gear set can increase the selectivity of the gear ratios, as compared with the speed change gear using the Ravigneaux compound planetary gear train.

The third planetary gear set G3 (single pinion) may transmit the torque at the sixth gear, thus improving gear meshing efficiency and further thus leading to reduced vibration and gear noise.

FIG. 23 is a view of a developed cross section showing an actual constitution of the speed change gear in FIG. 19 to FIG. 22, according to the third embodiment of the present invention.

As is seen in FIG. 23, the input shaft 1, a middle shaft 52, and the output shaft 51 are disposed sidewise substantially coaxially in the transmission case 3, in such a manner as to mate and rotate relative to each other. In sum, the input shaft 1, the middle shaft 52, and the output shaft 51 are individually born in such a manner as to rotate relative to the transmission case 3.

The transmission case 3 has the front end opening (left in FIG. 23) closer to the input shaft 1, which opening is blocked with the pump case having the pump housing 5 and the pump cover 6. The input shaft 1 is inserted to the pump case to be born by the pump case. The engine (not shown) is drivingly connected to the protrusion end of the input shaft 1 via the torque converter (not shown).

The middle shaft 52 has the rear end (farther side from the input shaft 1 in FIG. 23) which is rotatably born with an end cover (not shown in FIG. 23) at the rear end (right in FIG. 23) of the transmission case 3.

There is provided a middle wall 53 extending in a direction substantially crossing the axial line of the transmission case 3. Via a hollow shaft 54, the middle shaft 52 is rotatably born by a wall defining substantially a center opening of the middle wall 53.

Between the pump case (including the pump housing 5 and the pump cover 6) and the middle wall 53, there is defined the front space (left in FIG. 23). The first planetary gear set G1 is disposed in the front space (left in FIG. 23). The third clutch C3 is also disposed in the front space (left in FIG. 23) in such a manner as to wrap the first planetary gear set G1.

In view of the first planetary gear set G1, the first sun gear S1 held stationary to a hollow stationary shaft 55 of the pump cover 6 is continuously incapable of rotating. Moreover, in view of the first planetary gear set G1, the first planetary carrier PC1 serratedly connects with an inner end of the input shaft 1, and connects to a clutch drum 56.

The clutch drum 56 has an end wall 56a which is so disposed in the vicinity of the pump cover 6 as to face the pump cover 6. The clutch drum 56 extends in such a manner as to wrap the first planetary gear set G1. Moreover, there is provided a clutch hub 57 inside the clutch drum 56.

The clutch hub 57 connects to the hollow shaft 54, moreover, there is provided a clutch pack 58 having clutch plates which are splined respectively with an outer periphery of the clutch hub 57 and an inner periphery of the clutch drum 56 in such a manner as to be disposed alternatingly, thus constituting the third clutch C3 which is to be disposed on the outer periphery of the first planetary gear set G1.

Hereinabove, the third clutch C3 has a clutch piston 59 which mates with the end wall 56a (facing the first planetary gear set G1) of the clutch drum 56. Receiving the operation oil pressure applied from an operation oil duct 60 (formed in the pump cover 6) to the clutch piston 13, the clutch piston 13 may make a stroke, thus engaging the third clutch C3.

There is provided a connector member 61 extending radially outward from the front end (left in FIG. 23) of the hollow shaft 52. The connector member 61 has an outer periphery connecting to the first ring gear R1.

Between the middle wall 53 and the rear end wall of the transmission case 3, there is defined a rear space (right in FIG. 23). The second planetary gear set G2, the third planetary gear set G3, the first clutch C1, the second clutch C2, the first brake B1, and the second brake B2 are disposed in the rear space (right in FIG. 23) in the following manner:

The second planetary gear set G2 and the third planetary gear set G3 are disposed on the output shaft 51. In this case, however, the second planetary gear set G2 is disposed nearer to the input shaft 1 than the third planetary gear set G3.

The first connector member M1 integrates the second sun gear S2 of the second planetary gear set G2 with the third sun gear S3 of the third planetary gear set G3. The second sun gear S2 and the third sun gear S3 thus integrated are rotatably born on the output shaft 51.

The fourth sun gear S4 is also rotatably born on the output shaft 51. There is provided a clutch hub 62 connecting to the fourth sun gear S4. Moreover, a clutch drum 63 is so disposed as to wrap the clutch hub 62 and the second ring gear R2.

The clutch drum 63 has an end wall 63a which is close to the input shaft 1 and is drivably connected to the middle shaft 52, moreover, there is provided a clutch pack 64 having clutch plates which are splined respectively with an inner periphery of the clutch drum 63 and an outer periphery of the second ring gear R2 in such a manner as to be disposed alternatingly, thus constituting the first clutch C1.

There is provided a clutch pack 65 having clutch plates which are splined respectively with an inner periphery of the clutch drum 63 and an outer periphery of the clutch hub 62 in such a manner as to be disposed alternatingly, thus constituting the second clutch C2.

With this, the first clutch C1 and the second clutch C2 are arranged on the outer periphery of the second planetary gear set G2, with the second clutch C2 disposed nearer to the input shaft 1 than the first clutch C1.

A clutch piston 66 of the first clutch C1 and a clutch piston 67 of the second clutch C2 constitute a double piston, with the clutch piston 67 mating in the clutch piston 66. The outside clutch piston 66 mates with the end wall 63a (facing the second planetary gear set G2) of the clutch drum 63.

Receiving the operation oil pressure applied from operation oil ducts 68 formed individually in the middle wall 53, the hollow shaft 54, and the middle shaft 52 (shown in FIG. 23 is one operation oil duct 68 only), the clutch piston 66 of the first clutch C1 and the clutch piston 67 of the second clutch C2 may make a stroke, thus engaging the first clutch C1 and the second clutch 20 respectively.

There is provided a tubular connector member 69 disposed in such a manner as to wrap the clutch drum 63. The tubular connector member 22 has an end wall 69a which is close to the input shaft 1 and which is drivably connected to the hollow shaft 54 (thereby, the clutch hub 57). Moreover, the end wall 69a of the tubular connector member 69 is provided with a brake hub 70 extending axially in the direction of the input shaft 1.

There is provided a brake pack 71 having brake plates which are splined respectively with an outer periphery of the brake hub 70 and the inner periphery of the transmission case 3 in such a manner as to be disposed alternatingly, thus constituting the first brake B1.

A brake piston 72 of the first brake B1 slidingly mates with the middle wall 53. Receiving the operation oil pressure applied from an operation oil duct 73 (formed in the middle wall 53) to the brake piston 72, the brake piston 72 may make a stroke, thus engaging the first brake B1.

The tubular connector member 69 has the rear end (right in FIG. 23) which is disposed on a farther side from the input shaft 1 connects to the third planetary carrier PC3, while the second connector member M2 connects the first ring gear R3 to the second planetary carrier PC2.

The center member CM extending from the side member SM of the second planetary carrier PC2 via between the second sun gear S2 and the fourth sun gear S4 connects to the output shaft 51, thus connecting the second planetary carrier PC2 to the output shaft 51.

The combination of the second sun gear S2 and the third sun gear S3 via the first connector member M1 is rotatably born on the output shaft 51 in such a manner as to extend in a direction away from the input shaft 1. Connecting a brake hub 74 to the combination of the second sun gear S2 and the third sun gear S3 can constitute the first rotation member.

There is provided a brake pack 75 having brake plates which are splined respectively with an outer periphery of the brake hub 74 and the inner periphery of the transmission case 3 in such a manner as to be disposed alternatingly, thus constituting the second brake B2.

Other than the above first rotation member, there are provided the following rotation members, according to the third embodiment:
* The second rotation member including the fourth sun gear S4 and the clutch hub 62.
* The third rotation member including second planetary carrier PC2, the third ring gear R3, and the second connector member M2.
* The fourth rotation member including the third planetary carrier PC3, the tubular connector member 69, and the brake hub 70.
* The fifth rotation member including the second ring gear R2.

With the above constitution shown in FIG. 23, the speed change gear according to the third embodiment of the present invention is, like the speed change gear according to the first embodiment in FIG. 12 and the speed change gear according to the second embodiment in FIG. 18, the combination of three planetary gear sets (namely, the first planetary gear set G1, the second planetary gear set G2, and the third planetary gear set G3), the first rotation member, the second rotation member, the third rotation member, the fourth rotation member and the fifth rotation member, thus bringing about the above effect (A) to effect (G). In addition to the effect (A) to the effect (G), the speed change gear according to the third embodiment may bring about the following effects:

Effect

Of the double sun gear planetary gear set G2 and the single pinion planetary gear set G3, it is the double sun gear planetary gear set G2 that relates to both the second rotation member and the fifth rotation member. In other words, it is the double sun gear planetary gear set G2 to which the reduced rotation is inputted from the speed reduction planetary gear set G1 via the first clutch C1 and the second clutch C2, and the double sun gear planetary gear set G2 is disposed on the nearer side to the speed reduction planetary gear set G1 than the single pinion planetary gear set G3. With the above constitution, the power conductive path can be shortened that includes the first clutch C1 and the second clutch C for transmitting the great torque rotation (reduced with the speed reduction planetary gear set G1) to the double sun gear planetary gear set G2. The thus shortened power conductive path may contribute to smaller size of the component parts for the power transmission and may facilitate handling and mounting of the component parts, thus making the automatic transmission smaller.

The above effect can be more remarkable when the first clutch C1 and the second clutch C2 are disposed in the vicinity of the double sun gear planetary gear set G2, especially, on the outer periphery of the double sun gear planetary gear set G2, as is seen in FIG. 23. In addition, the clutch piston 66 of the first clutch C1 and the clutch piston 67 of the second clutch C2 can be made into the double piston constitution as is seen in FIG. 23, thus saving the space therefor and thus making the speed change gear still smaller.

Moreover, having the above disposition in FIG. 23, the first clutch C1 and the second clutch C2 can approach the speed reduction planetary gear set G1, thus shortening the members (the middle shaft 52, the hollow shaft 54 and the clutch hub 57) connecting the first clutch C1 and the second clutch C2 to the speed reduction planetary gear set G1. In other words, the members (the middle shaft 52, the hollow shaft 54 and the clutch hub 57) can be made shorter, smaller, lighter and simpler.

Moreover, disposing the first clutch C1 and the second clutch C2 sidewise allows the double piston constitution, namely, the clutch piston 66 and the clutch piston 67, respectively. In addition to the double piston constitution, disposing the first clutch C1 and the second clutch C2 sidewise allows the return spring and the centrifugal pressure cancellation chamber to be used in common for the clutch piston 66 and the clutch piston 67, thus reducing the number of component parts and reducing size and cost of the speed change gear.

In addition to disposing the first clutch C1 and the second clutch C2 as described above, the respective clutch piston 66 and clutch piston 67 on the double sun gear planetary gear set G2 are disposed on the farther side from the single pinion planetary gear set G3, while the operation oil duct 68 for the first clutch C1 and the second clutch C2 is formed in the middle wall 53 (of the transmission case 3) between the speed reduction planetary gear set G1 and the double sun gear planetary gear set G2.

With the above constitution, the operation oil duct 68 can be shortened which extends between the first clutch C1 and the control valve body (not shown) and between the second clutch C2 and the control valve body (not shown). Herein, the above control valve body (not shown) for transmission control is to be disposed on a given circumferential position of the transmission case 3. In addition, the operation oil ducts 68 can be substantially uniform in length, thus achieving substantially a uniform transmission response of the first clutch C1 and the second clutch C2. Even in the condition that the relatively high hydraulic pressure is requested due to the great transmission torque, the operation oil duct 68 of the first clutch C1 and the second clutch C2 can be free from the reinforcing sleeve and the like since the operation oil duct 68 is formed in the middle wall 53 that is relatively thick. In sum, forming the operation oil duct 68 directly in the middle wall 53 can prevent increase in the number of component parts and prevent higher cost.

Moreover, being disposed on the outer periphery of the speed reduction planetary gear set G1, the third clutch C3 for inputting the rotation of the input shaft 1 directly to the third planetary carrier PC3 of the single pinion planetary gear set G3 can shorten the operation oil duct 60 which extends between the control valve body (not shown) and the third clutch C3. Herein, the above control valve body (not shown) for transmission control is to be disposed on the given circumferential position of the transmission case 3. Moreover, the thus disposed third clutch C3 can contribute to allowing the operation oil duct 60 to become substantially equal in length to the operation oil duct 68 of the first clutch C1 and the second clutch C2, thus achieving substantially a uniform transmission response of the first clutch C1, the second clutch C2 and the third clutch C3.

Being formed in the pump cover 6 that is relatively thick, the operation oil duct 60 of the third clutch C3 can be free from the reinforcing sleeve and the like. Thereby, the operation oil duct 60 can be formed directly in the pump cover 6, thus preventing increase in the number of component parts and prevent higher cost.

For a preferable (smooth) flow of the operation oil from the control valve body (not shown), the operation oil duct 68 (of the first clutch C1 and the second clutch C2) formed in the middle wall 53 and the operation oil duct 60 formed in the pump cover 6 can concentrate at the front portion (left in FIG. 23) of the transmission case 3, thus eliminating redundant transmission control circuit.

Although the present invention has been described above by reference to three embodiments, the present invention is not limited to the three embodiments described above. Modifications and variations of the three embodiments described above will occur to those skilled in the art, in light of the above teachings.

This application is based on a prior Japanese Patent Application No. P2002-207285 (filed on Jul. 16, 2002 in Japan). The entire contents of the Japanese Patent Application No. P2002-207285 from which priority is claimed is incorporated herein by reference, in order to take some protection against mis-translation or omitted portions.

The scope of the present invention is defined with reference to the following claims.

What is claimed is:

1. A speed change gear for an automatic transmission, comprising:
  1) an input portion for inputting a rotation from a power source;
  2) an output portion disposed substantially coaxially with the input portion;
  3) three planetary gear sets including a first planetary gear set, a second planetary gear set and a third planetary gear set for providing a plurality of power conductive paths to an area defined between the input portion and the output portion; and 4) a first clutch, a second clutch, a third clutch, a first brake and a second brake to be selectively connected and disconnected in such a manner that the three planetary gear sets change a rotation from the input portion at a corresponding gear change ratio by selecting one of the plurality of the power conductive paths, thereby outputting the thus changed rotation to the output portion, the first clutch, the second clutch, the third clutch, the first brake and the second brake making a combination of engagement and disengagement, the combination making a selection from at least six forward gears and one reverse gear, one of the three planetary gear sets being a speed reduction planetary gear set for continuously reducing the inputted rotation and outputting the thus reduced rotation, one of the remaining two planetary gear sets of the three planetary gear sets being a double sun gear planetary gear set which includes;

two sun gears, a common pinion meshing with the two sun gears in common, one ring gear meshing with the common pinion, and a planetary carrier for carrying the common pinion in such a manner that the common pinion rotates, the planetary carrier being adapted to input and output a rotation from between the two sun gears via a center member connected to a side member, the other of the remaining two planetary gear sets of the three planetary gear sets being a single pinion planetary gear set which includes;

one sun gear, a pinion meshing with the one sun gear, one ring gear meshing with the pinion, and a planetary carrier for carrying the pinion in such a manner that the pinion rotates, the speed change gear for the automatic transmission including:

i) a first rotation member including one of the two sun gears of the double sun gear planetary gear set, and being adapted to be held stationary by the second brake;

ii) a second rotation member including the other of the two sun gears of the double sun gear planetary gear set, and receiving via the second clutch the reduced rotation from the speed reduction planetary gear set;

iii) a third rotation member including an element connected mutually to the double sun gear planetary gear set and the single pinion planetary gear set, and outputting the changed rotation to the output portion;

iv) a fourth rotation member receiving via the third clutch the inputted rotation, being adapted to be held stationary by the first brake and including an element in the double sun gear planetary gear set and the single pinion planetary gear set; and v) a fifth rotation member receiving via the first clutch the outputted rotation from the speed reduction planetary gear set, and including an element in the corresponding one of the double sun gear planetary gear set and the single pinion planetary gear set, one of the double sun gear planetary gear set and the single pinion planetary gear set which relates to the second rotation member and the fifth rotation member being disposed nearer to the speed reduction planetary gear set than the other of the double sun gear planetary gear set and the single pinion planetary gear set.

2. The speed change gear for the automatic transmission as claimed in claim 1, wherein the speed reduction planetary gear set is a single pinion planetary gear set including a first sun gear which is continuously held stationary, a first ring gear (R1), a first pinion meshing with the first sun gear and the first ring gear, and a first planetary carrier for carrying the first pinion in such a manner that the first pinion rotates, the single pinion planetary gear set of the other of the remaining two planetary gear sets of the three planetary gear sets includes a second sun gear, a second pinion meshing with the second sun gear, a second ring gear meshing with the second pinion, and a second planetary carrier for carrying the second pinion in such a manner that the second pinion rotates, the double sun gear planetary gear set includes a third sun gear and a fourth sun gear which two sun gears constituting a double sun gear, a third pinion meshing with the third sun gear and the fourth sun gear in common, a third ring gear meshing with the third pinion, and a third planetary carrier for carrying the third pinion in such a manner that the third pinion rotates, the third planetary carrier being adapted to input and output a rotation from between the third sun gear and the fourth sun gear via the center member connected to the side member, disposed sequentially from the input portions' side are the speed reduction planetary gear set, the single pinion planetary gear set of the other of the remaining two planetary gear sets of the three planetary gear sets, and the double sun gear planetary gear set, the input portion is connected to the first ring gear and is adapted to be made connectable to the center member by the third clutch, the second sun gear and the third sun gear are connected mutually by a first connector member, and are adapted to be made connectable to the first planetary carrier by the second clutch, the second planetary carrier and the third ring gear are mutually connected by a second connector member, and are connected to the output portion, the first planetary carrier and the second ring gear are adapted to be connected by the first clutch, the third planetary carrier is adapted to be held stationary by the first brake, while the fourth sun gear is adapted to be held stationary by the second brake, and the first clutch and the second clutch are disposed close to the single pinion planetary gear set of the other of the remaining two planetary gear sets of the three planetary gear sets.

3. The speed change gear for the automatic transmission as claimed in claim 2, wherein engaging the first clutch and the first brake brings about a first gear, engaging the first clutch and the second brake brings about a second gear, engaging the first clutch and the second clutch brings about a third gear, engaging the first clutch and the third clutch brings about a fourth gear, engaging the second clutch and the third clutch brings about a fifth gear, engaging the third clutch and the second brake brings about a sixth gear, and engaging the second clutch and the first brake brings about the reverse gear.

4. The speed change gear for the automatic transmission as claimed in claim 2, wherein the first rotation member includes a brake hub, a rear end wall, and the fourth sun gear, the second rotation member includes the second sun gear, the third sun gear, the first connector member, and a clutch hub, the third rotation member includes the second connector member, the second planetary carrier, the third ring gear, and a tubular connector member, the second planetary carrier and the third ring gear being connected with each other by the second connector member, the fourth rotation member includes the third planetary carrier, the center member, a middle shaft, a clutch drum, an outer member, and a brake hub, and the fifth rotation member includes the second ring gear.

5. The speed change gear for the automatic transmission as claimed in claim 1, wherein the speed reduction planetary gear set is a double pinion planetary gear including a first sun gear which is continuously held stationary, a first ring gear, a first primary pinion meshing with the first sun gear, a first secondary pinion meshing with the first ring gear, and a first planetary carrier for carrying the first primary pinion and the first secondary pinion in such a manner that the first primary pinion and the first secondary pinion rotate, the single pinion planetary gear set of the other of the remaining two planetary gear sets of the three planetary gear sets includes a second sun gear, a second pinion meshing with the second sun gear (S2), a second ring gear (R2) meshing with the second pinion, and a second planetary carrier for carrying the second pinion in such a manner that the second pinion rotates, the double sun gear planetary gear set includes a third sun gear and a fourth sun gear which two sun gears constituting a double sun gear, a third pinion (P3) meshing with the third sun gear and the fourth sun gear in common, a third ring gear meshing with the third pinion, and a third planetary carrier for carrying the third pinion in such a manner that the third pinion rotates, the third planetary carrier being adapted to input and output a rotation from between the third sun gear and the fourth sun gear via the center member connected to the side member, disposed sequentially from the input portions' side are the speed reduction planetary gear set, the single pinion planetary gear set of the other of the remaining two planetary gear sets of the three planetary gear sets, and the double sun gear planetary gear set, the input portion is connected to the first planetary carrier and is adapted to be made connectable to the center member by the third clutch, the second sun gear and the third sun gear are connected mutually by a first connector member, and are adapted to be made connectable to the first ring gear by the second clutch, the second planetary carrier and the third ring gear are mutually connected by a second connector member, and are connected to the output portion, the first ring gear and the second ring gear are adapted to be connected by the first clutch, the third planetary carrier is adapted to be held stationary by the first brake, while the fourth sun gear is adapted to be held stationary by the second brake, and the first clutch and the second clutch are disposed close to the single pinion planetary gear set of the other of the remaining two planetary gear sets of the three planetary gear sets.

6. The speed change gear for the automatic transmission as claimed in claim 5, wherein engaging the first clutch and the first brake brings about a first gear, engaging the first clutch and the second brake brings about a second gear, engaging the first clutch and the second clutch brings about a third gear, engaging the first clutch and the third clutch brings about a fourth gear, engaging the second clutch and the third clutch brings about a fifth gear, engaging the third clutch and the second brake brings about a sixth gear, and engaging the second clutch and the first brake brings about the reverse gear.

7. The speed change gear for the automatic transmission as claimed in claim 5, wherein the first rotation member includes a brake hub, a rear end wall, and the fourth sun gear, the second rotation member includes the second sun gear, the third sun gear, the first connector member, and a clutch hub, the third rotation member includes the second connector member, the second planetary carrier, the third ring gear, and a tubular connector member, the second planetary carrier and the third ring gear being connected with each other by the second connector member, the fourth rotation member includes the third planetary carrier, the center member, a middle shaft, a clutch drum, an outer member, and a brake hub, and the fifth rotation member includes the second ring gear.

8. The speed change gear for the automatic transmission as claimed in claim 1, wherein the speed reduction planetary gear set is a double pinion planetary gear set including a first sun gear which is continuously held stationary, a first ring gear, a first primary pinion meshing with the first sun gear, a first secondary pinion meshing with the first ring gear, and a first planetary carrier for carrying the first primary pinion and the first secondary pinion in such a manner that the first primary pinion and the first secondary pinion rotate, the double sun gear planetary gear set includes a second sun gear and a fourth sun gear which two sun gears constituting a double sun gear, a second pinion meshing with the second sun gear and the fourth sun gear in common, a second ring gear meshing with the second pinion, and a second planetary carrier for carrying the second pinion in such a manner that the second pinion rotates, the second planetary carrier being adapted to input and output a rotation from between the second sun gear and the fourth sun gear via the center member connected to the side member, the single pinion planetary gear set of the other of the remaining two planetary gear sets of the three planetary gear sets includes a third sun gear, a third pinion meshing with the third sun gear, a third ring gear meshing with the third pinion, and a third planetary carrier for carrying the third pinion in such a manner that the third pinion rotates, disposed sequentially from the input portions' side are the speed reduction planetary gear set, the double sun gear planetary gear set, and the single pinion planetary gear set of the other of the remaining two planetary gear sets of the three planetary gear sets, the input portion is connected to the first planetary carrier and is adapted to be made connectable to the third planetary carrier by the third clutch, the third planetary carrier is adapted to be held stationary by the first brake, the second sun gear and the third sun gear are connected mutually by a first connector member, and are adapted to be held stationary by the second brake, the second planetary carrier and the third ring gear are mutually connected by a second connector member, and the center member extends from the second planetary carrier radially inward via between the second sun gear and the fourth sun gear to be connected to the output portion, the first ring gear is adapted to be connected to the second ring gear (R2) by the first clutch, and is adapted to be connected to the fourth sun gear by the second clutch, and the first clutch and the second clutch are disposed close to the double sun gear planetary gear set of the one of the remaining two planetary gear sets of the three planetary gear sets.

9. The speed change gear for the automatic transmission as claimed in claim 8, wherein engaging the first clutch and the first brake brings about a first gear, engaging the first clutch and the second brake brings about a second gear, engaging the first clutch and the second clutch brings about a third gear, engaging the first clutch and the third clutch brings about a fourth gear, engaging the second clutch and the third clutch brings about a fifth gear, engaging the third clutch and the second brake brings about a sixth gear, and engaging the second clutch and the first brake brings about the reverse gear.

10. The speed change gear for the automatic transmission as claimed in claim 8, wherein the first rotation member includes the first connector member, the second sun gear, the third sun gear, and a brake hub, the second rotation member includes the fourth sun gear and a clutch hub, the third rotation member includes the second planetary carrier, the third ring gear, and the second connector member, the fourth rotation member includes the third planetary carrier, a tubular connector member, and a brake hub, and the fifth rotation member includes the second ring gear.

11. The speed change gear for the automatic transmission as claimed in claim 1, wherein at least one of the first clutch and the second clutch is disposed on an outer periphery of the planetary gear set which is nearer to the speed reduction planetary gear set.

12. The speed change gear for the automatic transmission as claimed in claim 11, wherein the third clutch is disposed on a side same as a side of the first clutch and the second clutch disposed on the planetary gear set which is nearer to the speed reduction planetary gear set.

13. The speed change gear for the automatic transmission as claimed in claim 1, wherein the first brake and an element of the planetary gear set are connected by a connector member which is taken out from a rear side of the planetary gear set, the element connected to the first brake being adapted to be held stationary by the first brake, the rear side of the planetary gear set being farthest away from the speed reduction planetary gear set, and the second brake and an element of the planetary gear set are connected by a connector member which is taken out from the rear side of the planetary gear set, the element connected to the second brake being adapted to be held stationary by the second brake, the rear side of the planetary gear set being farthest away from the speed reduction planetary gear set.

14. The speed change gear for the automatic transmission as claimed in claim 13, wherein the first brake and the second brake are disposed on an outer periphery of the first clutch and an outer periphery of the second clutch.

* * * * *